US011015081B2

(12) United States Patent
Freeman et al.

(10) Patent No.: US 11,015,081 B2
(45) Date of Patent: May 25, 2021

(54) FINE PARTICLE SIZE BORIC ACID/UREA DISPERSION, METHOD OF USE IN ENGINEERED WOOD PRODUCT MANUFACTURE, METHOD OF COATING WOOD PRODUCTS AND PRODUCT THEREFROM

(71) Applicant: Polymer Solutions Group, Cleveland, OH (US)

(72) Inventors: Gary M. Freeman, Macon, GA (US); Quang T. Do, Kathleen, GA (US); Joshua D. Sparks, Macon, GA (US)

(73) Assignee: Polymer Solutions Group, Cleveland, OH (US)

( * ) Notice: Subject to any disclaimer, the term of this patent is extended or adjusted under 35 U.S.C. 154(b) by 0 days.

(21) Appl. No.: 16/794,810

(22) Filed: Feb. 19, 2020

(65) Prior Publication Data

US 2020/0181448 A1 Jun. 11, 2020

Related U.S. Application Data

(63) Continuation-in-part of application No. 16/108,325, filed on Aug. 22, 2018, now Pat. No. 10,703,009.

(51) Int. Cl.
*C09D 175/02* (2006.01)
*B27K 5/00* (2006.01)
(Continued)

(52) U.S. Cl.
CPC .............. *C09D 175/02* (2013.01); *B27K 5/00* (2013.01); *C08K 5/17* (2013.01); *B27K 2200/10* (2013.01);
(Continued)

(58) Field of Classification Search
None
See application file for complete search history.

(56) References Cited

U.S. PATENT DOCUMENTS

| 4,801,404 A | 1/1989 | Dietrich et al. |
| 6,273,928 B1 | 8/2001 | Hayati et al. |

(Continued)

FOREIGN PATENT DOCUMENTS

| CN | 109370288 | 2/2019 |
| JP | 48023399 | 7/1973 |

(Continued)

OTHER PUBLICATIONS

Pedieu et al., "Fire-retardant properties . . . with boric acid", Eur. J. Wood. Prod. (2012) 70: 191-197.

(Continued)

*Primary Examiner* — Katie L. Hammer
(74) *Attorney, Agent, or Firm* — Clark & Brody LP

(57) ABSTRACT

An aqueous boric acid/urea dispersion includes insoluble boric acid particles having a median particle size range of less than 44 microns and having a % actives content of boric acid plus urea of 60 wt. % or greater. The boric acid/urea dispersion includes an effective amount of at least one viscosity reducing agent such that the boric acid/urea dispersion has an initial Brookfield 2 rpm viscosity of about 5,000 to about 25,000 centipoise and a three week aged Brookfield 2 rpm viscosity of less than 250,000 centipoise, an optional amount of an alkali metal base, the alkali metal base/boric acid mole ratio in the dispersion ranging up to about 0.01; and the balance water. The boric acid/urea dispersion can be used in the manufacture of engineered wood products like oriented strand board as well as be a part of a waterborne coating formulation to coat wood products to improve fire retardancy.

36 Claims, 5 Drawing Sheets

(51) Int. Cl.
*C08K 5/17* (2006.01)
*C08K 3/38* (2006.01)
*B27K 3/16* (2006.01)

(52) U.S. Cl.
CPC ............ *B27K 2240/30* (2013.01); *C08K 3/38* (2013.01); *C08K 2201/005* (2013.01)

(56) References Cited

U.S. PATENT DOCUMENTS

| | | |
|---|---|---|
| 6,306,317 B1 | 10/2001 | Richards et al. |
| 6,423,251 B1 | 7/2002 | Blount |
| 6,425,947 B1 | 7/2002 | Berlin et al. |
| 6,426,095 B2 | 7/2002 | Palmere et al. |
| 7,354,503 B2 | 4/2008 | Hume |
| 7,553,538 B2 | 6/2009 | Hume |
| 7,651,591 B1 | 1/2010 | Hume |
| 8,308,997 B2 | 11/2012 | Schubert |
| 9,669,564 B2 | 6/2017 | Zhang et al. |
| 10,072,163 B2 | 9/2018 | Peskens |
| 2003/0113514 A1 | 6/2003 | Saito |
| 2007/0037714 A1 | 2/2007 | Olliges |
| 2007/0278463 A1 | 12/2007 | Ratzsch et al. |
| 2011/0015104 A1 | 1/2011 | Olliges |
| 2014/0295164 A1 | 10/2014 | Parker et al. |
| 2016/0257801 A1 | 9/2016 | Wiklund |
| 2016/0304725 A1 | 10/2016 | Tadych |

FOREIGN PATENT DOCUMENTS

| | | |
|---|---|---|
| JP | 4014480 | 11/2007 |
| RU | 2198193 | 2/2003 |
| WO | 91/00327 | 1/1991 |
| WO | 2016/173743 | 11/2016 |

OTHER PUBLICATIONS

Wang et al., "Chemical mechanism of . . . acid on wood", Wood Sci Technol (2004) 38: 375-389.

Skvortsov, V. G. et al., "Equilibrium in aqueous solutions of urea and boric acid at 25, 60, and 75.deg C", Uchenye Zapiski, Chuvashskii Gosudarstvennyi Pedagogicheskii Institute, No. 29, 1969.

Skvortsov, V. G. et al., "Urea-boric acid-water system at 25, 52, 60, and 75. Deg." Zhurnal Neorganicheskoi Khimii, vol. 13, 1698.

Orszagh, I. et al., "Study of the boric acid-urea interaction in aqueous solution" Magyar Kemiai Folyoirat, vol. 91, pp. 494-498, 1985.

S. Mondal et al., "Polycondensation of Urea and Boric Acid to give Polyborate Ester, A Precursor for Boron Nitride", Advanced Materials Research, vols. 29-30, 2007.

FINE PARTICLE SIZE BORIC ACID/UREA DISPERSION, METHOD OF USE IN ENGINEERED WOOD PRODUCT MANUFACTURE, METHOD OF COATING WOOD PRODUCTS AND PRODUCT THEREFROM

This application is a continuation-in-part of application Ser. No. 16/108,325 filed on Aug. 22, 2018, which is hereby incorporated in its entirety into this application.

FIELD OF THE INVENTION

The present invention relates to a fine particle size boric acid/urea dispersion that includes a viscosity reducing agent and optionally an alkali base, and in particular to a fine particle boric acid/urea dispersion of high total actives content that is stable, pumpable, and easily transported for use as a fire retardant additive in the manufacture of engineered wood products like oriented strand board, particle board, and medium density fiberboard and in coating applications of wood products to improve their flame spread performance.

BACKGROUND ART

In the prior art, it is known to use borates and boric acid (abbreviated as BA) as a fire retardant when manufacturing wood products like oriented strand board (hereinafter OSB), particle board (hereinafter PB), and medium density fiberboard (hereinafter MDF). It should be noted that boric acid is also known in the art as orthoboric acid. Boric acid is a weak acid whereby room temperature, saturated solutions of boric acid exhibit a pH of 4.

Flame spreadability or flame spread index performance is often used as a quantifiable efficacy measurement of the fire retardancy of a given product. There are a number of different kinds of surface flammability tests used to assess the fire retardancy of materials and a description of these is found in a treatise on Analytical Chemistry, Part 3, Volume 4 edited by I. M. Kolthoff, Philip J. Elving, Fred H. Stross, published by John Wiley & Sons, Inc., Copyright 1977, Section D-1: Thermal and Chemical testing, Part in, Section D-1, Surface flammability measurements for building materials and related products by Herbert W. Eickner, Forest Products Laboratory, US Dept. of Agriculture, Madison, Wis., which is hereby incorporated by reference in its entirety. One of the flame spreading tests is the Steiner tunnel or 25-ft tunnel furnace method (ASTM Standard E84-70), as developed by the Underwriters' Laboratories, as a rating method for measuring surface flammability of building materials. In this test, a flame spread index (FSI) is calculated based on the distance of the flame travel and the rate at which the flame front advances during a specified time of exposure. To have a class A fire rating, which is the best rating, the FSI should be in the range of 0-25. Class B has an FSI range of 30-75, and a Class C fire rating has an FSI range of 80-200. Typically, engineered wood products can only attain a Class C rating whereas pressure treated plywood would have a Class A rating using this test.

Another surface flame spread test is the radiant-panel method, which was developed as a result of seeking a faster laboratory scale testing method than the Steiner tunnel furnace method that would have some predictive correlation with E84 test results. This radiant-panel test method is ASTM Standard E162 (17).

An example of a boric acid dispersion for use as a fire retardant for wood products is found in U.S. Pat. No. 4,801,404 to Dietrich et al. (Dietrich). This patent discloses the use of a granular boric acid in a low-shear mixing process to yield a dispersion of boric acid particulates having an average particle size of about 800 μm. The process uses some alkali base to facilitate the dispersion of the boric acid granules. The preferred molar ratio of boric acid to alkaline agent (namely NaOH) used to form a small amount of borate salt is claimed as being 1.0:0.01 to 1.0:0.20 (or 100:1 to 5:1) and in the one illustrative example, the molar ratio of boric acid/NaOH is 1.0:0.02 (or 50:1).

Dietrich teaches that the use of ground boric acid powders is disadvantageous in producing boric acid dispersions as it indicates that non-uniform particle size distributions are produced and that high viscosities are encountered such that dispersions of lower solids contents are only possible. Dietrich also suggests that the boric acid can be combined with a dispersant but provides no disclosure of any specific dispersant chemistries showing utility. However, experimentation conducted by the inventors has shown that the kinds of dispersions being produced by Dietrich are not stable over long time periods; they will hard pack settle and must be kept continuously agitated or be re-agitated at the time of use. Such dispersions would not be suitable for longer term storage in totes or tank trucks for subsequent transport to engineered wood board mills.

Another problem with the use of borates and boric acid is the homogeneity of the fire retardant additive in the wood product. That is, the boric acid or borate particles, as they are dense and large in size, can segregate in the wood product and not be dispersed within the engineered wood product in a homogenous way. This lack of homogeneity can affect the flame spread index (FSI) rating of the wood product such that it cannot achieve a Class A rating in E84 testing. This segregation problem can exist when applying coarse particle size dispersions of borates and boric acid but is particularly problematic when blending in the borates and boric acid in their dry powder or dry granular forms.

Further, even in instances of having a fairly good mix of the boric acid or borate particles with the wood fiber, particles or flakes, utilizing manufacturing processes where a pressing step is used, the fire retardants can subsequently segregate as a result of the pressing step and adequate fire retardancy may only exist on one side of the wood product.

To have maximum flame spread performance, pressure treated plywoods are preferred materials for building use. However, these kinds of plywoods are not without their disadvantages due to cost and due to the additives used during their manufacture that can cause some environmental concerns. Engineered wood products like OSB, particle board, and MDF do not have the same environmental concerns as pressure treated plywoods as the chemicals used in the plywoods are not used in the engineered wood products. However, current engineered wood products for construction applications are inferior in their fire retardancy as compared to pressure treated plywoods. For example, many engineered wood products would only have a Class C fire rating for flame spread performance.

With respect to fire retardant formulations being targeted for use on wood and cellulosic products to make the finished product more resistant to fire and flame spread, it is known to use combinations of boron containing compounds, such as boric acid and/or various borates, together with various nitrogen containing compounds (such as urea, thiourea, dicyandiamide, guanidine, or cyanamide) to achieve the desired fire retardant effect. In many instances, the combinations of boric acid and/or borates with urea are employed along with a wide array of other fire retardant additives such as phosphorus containing compounds like APP (ammonium polyphosphate) and phosphoric acid.

Furthermore, combinations of boric acid and urea are known in the literature to produce a variety of different boron-nitrogen compositions or compounds depending on how they are combined or the reaction conditions employed. The resultant boron-nitrogen composition that is produced will depend on whether the boric acid and urea are combined with one another under aqueous, non-aqueous, or molten neat conditions and will accordingly depend on the stoichiometry and processing temperature that is employed under the aforementioned conditions. Some illustrative examples of various boron-nitrogen compounds are discussed below.

JP 4014480 B2 discloses fire retardant compositions that contain (A) water-based agents, which are the reaction products at 90-160° C. of 1 mole part boric acid with 1-5 mole parts urea and 0.05-1 mole parts $H_3PO_4$, and (B) silane couplers at a B/Si molar ratio of 2.5-20:1. The application is then carried out by coating or impregnation of the wood substrate. On an active weight basis, the aqueous B—N—P fire retardant compositions therefore range in boric acid/urea w/w ratio from about 1.03:1 to 0.206:1. Given the process temperatures employed, the resultant reaction compounds disclosed in this prior art likely arise from condensation reactions.

JP 48023399 B discloses fire retardants for use on textiles and wood products which are prepared by treating boric acid with a nitrogen-containing compound (e.g., urea, thiourea dicyandiamide, guanidine, or cyanamide) at 60-155° C. using a boric acid/nitrogen compound molar ratio of 1:0.5 to 1:3. The incorporation of 5-50% by wt. of the reaction products in fibrous materials, e.g. textiles, paper, and wood products, resulted in forming a noncombustible product. When urea is employed as the nitrogen compound, the fire retardant compositions would therefore range in boric acid/urea active basis w/w ratio from about 2.06:1 to 0.34:1. The process conditions disclosed in JP 48023399 B (non-aqueous at 60-155° C.) suggest that the boric acid and the nitrogen compound are undergoing a condensation reaction. Condensation reactions between boric acid and urea result in the elimination of water and will yield a polyborate ester (see reaction details in S. Mondal, et. al.; Advanced Materials Research, Vol. 29-30, pp. 199-202, 2007).

Possible boric acid/urea reaction species that can be formed in water are disclosed in the following technical publications. In broad compositional terms, the reaction species can be described as 1:x boric acid/urea compounds whereby x=1-3 or alternatively expressed as the molecular formula $H_3BO_3:xCO(NH_2)_2$.

In the Russian technical publication entitled "Equilibrium in Aqueous Solutions of Urea and Boric Acid at 25, 60, and 75 deg. C.," Skvortsov, V. G., et. al., *Uchenye Zapiski, Chuvashskii Gosudarstvennyi Pedagogicheskii Institute*, Volume: No. 29, Pages 139-49, Journal, 1969, the solubility in the $H_3BO_3$—$CO(NH_2)_2$—$H_2O$ system was studied at 25, 60, and 75° C. At 60 and 75° C., the formation of a 1:3 boric acid:urea compound, $H_3BO_3:3CO(NH_2)_2$, was observed which forms orthorhombic crystals differing greatly from the forms of the initial components. The 1:3 BA/urea compound (CAS Reg. #31754-59-3) was reported to be incongruently soluble in $H_2O$ at 60° C.

In the Hungarian technical publication entitled "Study of the Boric Acid-Urea Interaction in Aqueous Solution," Orszagh, Istvan, et. al., *Magyar Kemiai Folyoirat*, Volume 91, Issue 11, Pages 494-498, 1985, a 1:1 molar reaction complex of boric acid:urea, $H_3BO_3:CO(NH_2)_2$, was postulated to be formed in water at 25° C. and is a water soluble species. In accordance with their findings, a chemical interaction between boric acid and urea was studied in aqueous solution by equilibrium solubility measurements and by IR-spectroscopy. The product of the $H_3BO_3$— urea interaction was postulated to be a hydrogen-bond based complex with a 1:1 molar ratio at pH 4.24. The stability constant of the 1:1 reaction complex was reported to be 0.057 mol$^{-1}$ dm$^3$ at 25° C. The noted considerable increase in solubility of the $H_3BO_3$ was explained by a chemical interaction between urea and the boric acid to form the proposed soluble 1:1 boric acid:urea reaction complex (CAS Reg. #68072-56-0).

U.S. Pat. No. 9,669,564 B2 discloses a method of treating plywood or oriented strand board (OSB) which comprises applying an aqueous fire-retardant impregnate to the plywood or OSB with a thickness such that the impregnate penetrates the wood product, and then subsequently applying a coating to the wood product's surface, wherein said treatment confers fire retardancy properties to the treated wood product. The fire retardant impregnate solution is applied by pressure or vacuum treatment, or microwave treatment. While many different aqueous fire retardant impregnate solutions are disclosed for use, in one embodiment, the fire retardant impregnate comprises a nitrogen-containing compound (e.g., urea) and a boron-containing compound (e.g., boric acid). The weight concentration of the fire-retardant chemicals in the aqueous treating solutions can vary from between about 1.0% to 50.0%, depending upon the applications and treating processes. In a preferred embodiment, the weight concentration of the fire-retardant chemicals can range from between about 2.0% to 20.0%. In the most preferred embodiment, the weight concentration of the fire-retardant chemicals can range from between about 5.0% to 15.0%. However, in this prior art, no optimum boric acid/urea w/w ratio range is specified. This prior art focuses on fire retardant solutions having a total actives content of 1.0-50.0% but more commonly 5.0-15.0% which can be used to impregnate the wood products to confer fire retardancy properties to it.

U.S. Pat. No. 6,423,251 B1 discloses aqueous urea condensate-borate compositions useful as fire retardants for flammable organic materials by applying it to these materials. The urea condensate-borate compositions may also contain carbonization auxiliaries, such as phosphorus-containing compounds, metal-containing compounds that will accelerate carbonization, heat reflectors, surfactants, and fillers. The urea condensate-borate composition is produced by mixing, heating and/or reacting urea, boron oxyacids and alkali metal hydroxide or alkaline earth metal hydroxide or oxide or the boron oxyacids may be first reacted with the alkali metal hydroxide or the alkaline earth metal oxide or hydroxide to form an alkali metal or alkaline-earth metal borate. Any suitable boron oxyacids, such as boric acid, can be employed in the process to produce the resultant borate composition. The relative weight amounts of boric acid: urea:akali or alkaline earth metal hydroxide fall into the w/w/w ranges from 1-4:4-8:1-3 so the corresponding boric acid/urea w/w ratio falls into the range of 0.125:1 to 1:1. This prior art discloses urea condensate-borate compositions.

U.S. Pat. No. 6,306,317 B1 discloses a phosphate and ammonia free composition for treating wood products. The treatment solution may be applied to the wood product by dipping, soaking, brushing, spraying, etc., however, vacuum and/or pressure techniques may be used to impregnate the material according to the method of this invention, including both the empty-cell process and the full-cell process. The composition achieves fire retardant qualities without degrading the wood product when the treated material is subjected to heat and humidity over time. The liquid fire retardant composition of this invention is essentially of an aqueous solution having nitrogen- and boron-containing compounds dissolved therein and having a ratio of boron to nitrogen ranging from 1:1.25 to 1:1.75 by weight and the treatment solution is also free of phosphates, ammonia and salts thereof. On the basis of employing an aqueous solution of boric acid and urea in accordance with this art, it means the preferred boric acid/urea w/w ratio is about 2.13:1 to 1.52:1 whereby the total actives content of boric acid plus urea composition ranges from 4.0-25.0% by weight in water. This prior art discloses aqueous formulations of boric acid and urea that are phosphate free but the resultant compositions are in soluble form and the solutions are limited in total actives content to 4.0-25.0% range.

U.S. Pat. No. 8,308,997 B2 discloses a fire resistant composition and a method of making fire resistant cellulosic materials comprising the fire resistant composition. More specifically, the invention relates to soluble aqueous compositions comprising urea and a boron-containing compound for imparting fire resistance to cellulosic products. The boron-containing compound typically comprises borates with particular emphasis per the claims being on the borate compound commonly known as disodium octoborate tetrahydrate (DOT), $Na_2B_8O_{13} \cdot 4H_2O$, Mw=412.527. So, the sodium borate DOT contains about 20.96% B in its composition. Per claim 1, the aqueous composition comprises from about 1.5 wt. % boron (or 7.155% DOT) to about 3.0 wt. % boron (or 14.311% DOT), and at least about 10 wt. % urea. On this basis, this translates to a DOT/urea w/w ratio of about 0.715:1 to about 1.431:1 in the aqueous solution. If the urea content is further increased to 15 wt. % or to about 30 wt. % (per claims 2 and 3) then the corresponding DOT/urea w/w ratio is further lowered. In summary these claimed compositions are aqueous solutions of DOT and urea having a relatively low total % actives content (<50%) and in general they utilize amounts of DOT and urea at DOT/urea w/w ratios of 1.431:1 or less. In contrast, the liquid, waterborne boric acid/urea dispersions disclosed in this invention employ boric acid/urea w/w ratios of at least 1.5:1 or higher and the total actives content of boric acid plus urea is at least 60% by weight or higher.

There is a need to further improve the fire retardancy of engineered wood products so that they can better compete with pressure treated plywoods in the building and construction industry. In addition, efficient and economical methods are needed to meet the fire retardancy needs in other wood related applications such as furniture. Further yet, there is a need to improve the viscosity of boric acid-containing dispersions so as to permit higher actives content dispersions that are stable so that they can be shipped over long distances and still have pumpability for use at the shipping destination. The present invention responds to these needs by providing a boric acid/urea dispersion that has a high total actives content whereby a portion of the boric acid therein is in a fine particle, particulate form that is ideally adapted for transport and pumpability when used in engineered wood products.

SUMMARY OF THE INVENTION

In one embodiment, the invention relates to an improved boric acid/urea dispersion that is designed to be used in methods of making engineered wood products like OSB, particle board, and MDF.

Another aspect of the invention is the use of the boric acid/urea dispersion as the pigment master batch component in a waterborne coating product that is applied to the surface of a wood product to improve the wood product's flame spread performance. This use also produces an improved wood product by reason of the applied coating containing the boric acid/urea dispersion on the wood product. A further aspect of the invention with regard to waterborne coatings is the ability to use either a boric acid dispersion as described below or the boric acid/urea dispersion in a intumescent coating formulation. In this application, the boric acid can in either dispersion can act as the acid donor in the intumescent coating formulation and the urea in the boric acid/urea dispersion can act as the blowing agent for such a waterborne intumescent coating formulation.

More particularly, the boric acid/urea dispersion embodiment of the invention comprises an aqueous boric acid dispersion having boric acid particles with a median particle size range of less than 44 microns whereby the total actives content of boric acid plus urea in the dispersion is 60% or greater by weight and it further comprises a w/w ratio of boric acid to urea in a range of 19:1 to 1.5:1. While the total actives content of the aqueous boric acid/urea dispersion is at least 60% by weight it can be as high as 85% whereby the amount of boric acid therein would range from about 60-95% of the total actives content or more preferably range from about 70-80% of the total actives content. For example, in a highly preferred case where the boric acid/urea dispersion is 3:1 w/w boric acid to urea at a total actives content of 78% then the amount of boric acid in the dispersion equates to 58.5% of the formula's total weight and the urea equates to 19.5% of the formula's total weight. However, it is important to understand that the boric acid content in such boric acid/urea dispersions is present in two forms whereby a significant fraction of the total boric acid content is insoluble consisting of a fine particle, particulate dispersion while another fraction of the boric acid is solubilized given the likely formation of a water soluble 1:1 molar reaction complex of boric acid:urea as previously described in the above referenced technical literature (see Orszagh). The inventive boric acid/urea dispersions are therefore heterogeneous systems since they have both insoluble and water soluble components. Given the heterogeneous nature of the aqueous boric acid/urea dispersions, it is appropriate to define the total concentration of all boric acid and urea related species therein in terms of the dispersion's % actives content. For definitional purposes, the % total actives content of the boric acid/urea dispersion is the sum of all the boric acid and urea components therein independent of whether these components are solubilized, insoluble particulates or formed into a soluble 1:1 molar complex of boric acid:urea. It should be noted that the relative amounts of these components in a given dispersion will vary as a function of the boric acid/urea w/w ratio and the % total actives content to which the dispersion is produced. Furthermore, the relative distribution of the components for a given boric acid/urea w/w ratio will change depending on the % total actives content that is targeted and on the temperature of the dispersion since the aforementioned components are in equilibrium with one another. Temperature, for example, affects the solubility properties of the boric acid which consequently changes the amount of boric acid that is in solution and available to complex with solubilized urea.

The boric acid/urea dispersion further comprises an effective amount of at least one viscosity reducing agent such that the boric acid/urea dispersion has an initial Brookfield 2 rpm static viscosity of 5,000 to 25,000 centipoise and a three week aged Brookfield 2 rpm static viscosity of less than 250,000 centipoise, an optional amount of an alkali metal base, wherein the alkali metal base/boric acid mole ratio in the boric acid/urea dispersion ranges from zero to about 0.01; and the balance water. The initial and aged static viscosity values are measured using a Brookfield RVDVE Heliopath viscometer unit equipped with the appropriate T-spindle (spindle number selection depending on the viscosity range being measured) and run at 2 rpm at 25° C. The reason that these viscosity measurements are characterized as static viscosity values is that they are measurements of the dispersion in a static condition, including when initially made and then after a three week aging period. Brookfield measurements run at 2 rpm with a T-spindle are indicative of the overall stability and pumpability of the boric acid/urea dispersion. The boric acid/urea dispersions of this invention exhibit thixotropic rheological behavior and are consequently shear-thinning fluids. An initial Brookfield 2 rpm static viscosity of 5,000-25,000 centipoise is needed in order to keep the dispersed boric acid particles well suspended in the dispersion over time. An aged Brookfield 2 rpm static viscosity that is less than 250,000 centipoise is needed in order to insure that the thixotropic gel that forms on standing can be readily broken down by the applied suction from a positive displacement transfer pump and consequently transformed into a flowable fluid that can be pumped out from storage totes or tanker trucks. The applied force needed to breakdown thixotropic gels into a flowable fluid is commonly referred to as the Yield Point. Therefore, the Yield Point of the aged boric acid/urea dispersion should be low enough that pumpability after storage is still good and an aged Brookfield 2 rpm static viscosity that is less than 250,000 centipoise insures this pumpability requirement.

It should be noted that Brookfield measurements on the boric acid/urea dispersions can also be conducted at 20 rpm. Measuring the boric acid/urea dispersion at 20 rpm is more indicative of a dynamic viscosity value for the boric acid/urea dispersion. Because the Brookfield 20 rpm viscosity measurement represents the flowability or flowable nature of the boric acid/urea dispersion, this measure of viscosity is called a dynamic viscosity and it is useful information in discerning the potential flow rate of a boric acid/urea dispersion as it is being pumped.

The Brookfield 2 rpm measurement is being made to determine the viscosity of the dispersion under essentially "static conditions" where a very low shear force is being applied. This low 2 rpm reading is particularly important when measuring the viscosity of the gels formed from aging under static conditions as it is essentially a measure of the gel's viscosity. In rheology terminology, the term kinematic viscosity is also used to define the measurement of a fluid's inherent resistance to flow when no external force, other than gravity, is acting on it. In contrast, the higher shear Brookfield 20 rpm measurement is measuring essentially a dynamic viscosity value. Dynamic viscosity is defined as the measurement of a fluid's resistance to flow when an external force is being applied. In the case when 20 rpm is used, the dynamic viscosity of the dispersion product is being measured in its flowable state as opposed to the viscosity reading at 2 rpm whereby the product is being measured in its non-flowing "static" gel state.

Therefore and besides having the initial and aged static viscosities as described above, it is preferred that the boric acid/urea dispersion also exhibit a Brookfield at 20 rpm dynamic viscosity of less than 5,000 centipoise when initially made or after the boric acid/urea dispersion has been stored for a period of time and then re-agitated. For purposes of clarity, re-agitation of an aged boric acid/urea dispersion can take place as a result of the aged dispersion being mechanically stirred with some type of mixing system or can also occur as a consequence of the mechanical shear that is imparted by certain types of pumps during the act of pumping the aged dispersion. With the boric acid/urea dispersion having this dynamic viscosity, it can be readily injected into wood fiber streams or spray applied onto wood raw material substrates such as chips or flakes. Therefore, another object of the invention is having a stable, high actives content dispersion of boric acid/urea that can be readily applied via injection or by spray application. The thixotropic behavior of the inventive boric acid/urea dispersions helps to insure they meet both the stability and suspension requirements associated with storage and transport of the product as well as its subsequent ability to be injected or spray applied at the time of use at a wood panel manufacturing facility. The aged inventive boric acid/urea dispersions when re-agitated or pumped will revert back to their initial viscosity values and upon standing will gradually increase in viscosity again in a similar manner and to a similar maximum viscosity.

The boric acid/urea dispersion can also be characterized in terms of a thixotropic index (TI) value. The inventive boric acid/urea dispersions exhibit thixotropic rheology properties which are unique and important characteristics of the dispersions. Their thixotropic properties are critical to their ability to be supplied in a stable form where good pigment suspension is achieved. In addition, the ability of the thixotropic gel produced under static aging conditions to be easily reverted back to a flowable fluid when exposed to shear forces (such as those applied from mechanical stirrers or through the mechanical action of pumps) is also equally important to its end-use utility. Thixotropic behavior can be easily quantified by means of determining a fluid's Thixotropic Index (TI) value. One way a TI value can be determined is by dividing two Brookfield viscosity readings that are recorded at least a factor of 10× apart in shear rate. So, for a given dispersion, dividing its Brookfield 2 rpm viscosity value by its Brookfield 20 rpm viscosity value yields a representative TI value that can be compared with the calculated TI value of another dispersion to assess their comparative thixotropic nature on a relative basis. The greater the calculated TI value is the more thixotropic the dispersion is; hence the observance of a high TI value is typically associated with the formation of gels. Thus, it is preferred that after aging, the boric acid/urea dispersions having a Brookfield 2 rpm viscosity less than 250,000 centipoise should also be gels having a TI value less than or equal to about 8.0.

While the total actives content of the aqueous boric acid/urea dispersion is at least 60% by weight and up to 85% by weight, the total actives content range is preferably between 70% and 80%, and more preferably between about 75 to 78% whereby the amount of boric acid therein would comprise about 60-95% of the total actives content or more preferably comprise about 70-80% of the total actives content. The ability to supply a high actives content dispersion (which is also stable and easily pumped) is advantageous from the standpoint of minimizing the amount of water being back added to the wood source in the engineered wood panel manufacturing facility. The moisture content of the wood fiber, chips or flakes has to be carefully controlled within certain limits during the wood panel manufacturing process otherwise panels with defects or performance deficiencies are produced.

The median particle size of the boric acid particles in the aqueous boric acid/urea dispersion is preferably less than about 21 microns. In terms of a size range, a preferred median particle size range would be about 10-30 microns. The ability to supply a very fine particle size dispersion of boric acid particles is advantageous from the standpoint that the resultant surface area of the finer boric acid particles yields improved coverage of the starting wood raw materials and accordingly provides improved fire retardancy properties in the finished wood panels.

The viscosity reducing agent can be one or a combination of a number of different kinds of surfactants that provide the target initial and aged static viscosities and dynamic viscosity. These particular surfactants include those selected from the group consisting of cationic type surfactants, ethoxylated amine surfactants, polymeric anionic or nonionic pigment dispersants, nonionic, anionic, or amphoteric surfactants, and ethoxylated phosphate ester surfactants. Examples of these surfactants are listed in the examples provided below.

For the cationic surfactant, preferred surfactants include coco poly (15) oxyethylene methyl ammonium chloride, isodecyloxypropyl bis-(2-hydroxy-ethyl) methyl ammonium chloride, isotridecyloxypropyl bis-(2-hydroxyethyl) methyl ammonium chloride, and dicocoalkyldimethyl ammonium chloride.

For the ethoxylated amine surfactant, preferred surfactants include poly (2) oxyethylene isodecyloxypropylamine, poly (5) oxyethylene isodecyloxypropylamine, poly (2) oxyethylene isotridecyloxypropylamine, and poly (5) oxyethylene isotridecyloxypropylamine.

For the anionic or nonionic pigment dispersant, preferred dispersants include a blend of polyglycol esters, a copolymer with pigment affinic groups, an electrosteric dispersant and grind aid like Zetasperse 3600, a dynamic wetter plus anionic dispersant polymer, a blend of ethoxylated $C_6$-$C_{12}$ alcohols+polyoxyalkylene amine derivative, a carboxylate/sulfonate/nonionic functional terpolymer, sodium polyacrylate, sodium naphthalene sulfonate, and the proprietary dispersing agent E-Sperse 100.

For the nonionic, anionic or amphoteric surfactants preferred surfactants include poly (6) oxyethylene $C_9$-$C_{11}$ aliphatic alcohol, poly (5) oxyethylene iso-$C_{13}$ alcohol, ethylene oxide/propylene oxide copolymer, polyethylene glycol 200, sodium octyliminodipropionate, and butanedioic acid, 2-sulfo-, 1,4-bis(2-ethylhexyl) ester, sodium salt.

For the phosphate ester surfactants, preferred surfactants include oleyl 4(EO) phosphate ester and oleyl 6(EO) phosphate ester.

Even more preferred viscosity reducing agents from the listing above include coco poly (15) oxyethylene methyl ammonium chloride, isodecyloxypropyl bis-(2-hydroxyethyl) methyl ammonium chloride, dicocoalkyldimethyl ammonium chloride, poly (2) oxyethylene isodecyloxypropylamine, and an electrosteric anionic dispersant and grind aid like Zetasperse 3600, with a most preferred viscosity reducing agent being dicocoalkyldimethyl ammonium chloride.

An especially preferred surfactant for the boric acid/urea dispersion is the quaternary amine based chemistry dicocoalkyldimethyl ammonium chloride. Interestingly, it should be noted here that most of the preferred viscosity reducing agents for the inventive boric acid/urea dispersion are surfactant-based chemistries and are not polymeric dispersants.

When used, the alkali metal base can be any alkali metal base with NaOH and KOH being preferred. The alkali metal base/boric acid mole ratio can range from about 0.001 to about 0.007, and more preferably range between about 0.002 to about 0.006.

The aqueous boric acid/urea dispersion can also include an additional surfactant and xanthan gum. The additional surfactant is a nonionic surfactant of intermediate HLB value that is preferably low foaming (thereby minimizing the generation of foam during the manufacture of the boric acid dispersion) and is used in an effective amount to aid the wet-out and ease of dispersion of the xanthan gum additive. Low foam nonionic surfactants would be those characterized has typically exhibiting an initial Ross-Miles foam height value equal to or less than about 50 mm at a concentration level of 0.1% aqueous. The xanthan gum is also in an effective amount for improving the suspension properties of the boric acid particles in the dispersion (thereby preventing syneresis issues in the dispersion as it ages) and for improving adherence between a wood product and the boric acid particles used with the wood product to improve fire retardancy thereof. The improved adherence of the fine particle size boric acid particles when dispersions are injected or spray applied onto wood fiber, particles or flakes is an important performance benefit as it helps to prevent segregation issues during processing and subsequent pressing of the wood panels. The improved homogeneity of coverage with boric acid particles thereby results in wood panels with better and more consistent fire retardancy performance. When used, the amount of the nonionic surfactant in the boric acid/urea dispersion can range from about 0.01 to about 0.25 wt. % and the amount of the xanthan gum in the boric acid dispersion can range from 0.01 to about 0.25 wt %.

More narrowly defined target ranges for initial and aged Brookfield 2 rpm static viscosities for the boric acid/urea dispersion can be achieved and employed. The initial Brookfield 2 rpm static viscosity can range between about 8,000 and about 20,000 centipoise and the three week aged Brookfield 2 rpm static viscosity can be 200,000 centipoise or less.

Another embodiment of the invention is the use of the boric acid/urea dispersion to improve the fire retardancy of a wood product by providing a waterborne coating formulation employing the boric acid/urea dispersion as a pigment master batch component therein, in whole or as a part thereof, and applying the coating onto one or more surfaces of the wood product. The wood product can be any type of wood product suitable to accept a fire retardant coating formulation comprising boric acid and urea and examples include OSB, particle board, and MDF as well as dimensional lumber products. The wood product would have an applied coating formulation covering at least one surface of the wood product, with the coating formulation comprising the inventive boric acid/urea dispersion functioning as both a pigment and a fire retardant additive and an effective amount of a compatible waterborne binder to help bind the boric acid particles in the boric acid/urea dispersion to the wood product being coated. The waterborne binder is designed to have a relatively neutral pH, have a minimum film formation temperature of 25° C. or less, and have a glass transition temperature less than 25° C. In a preferred mode, the waterborne binder can be about 10-40% by weight of the total coating formulation weight. The waterborne coating formulation can be an intumescent coating formulation and, for this application, both the boric acid/urea dispersion and the boric acid dispersion described below can be used to formulate these kinds of coatings. For either dispersion, the waterborne binder described above can be used as the binder component of the intumescent coating formulation. The boric acid component of either dispersion can act as an acid donor (used alone or in combination with other acid donors known in the art) for the intumescent coating formulation and the urea component of the boric acid/urea dispersion can act as a blowing agent additive or co-additive for the intumescent coating formulation.

Another application for a boric acid-containing dispersion is to coat cellulosic materials to improve their fire retardancy properties. Any cellulosic materials that are used in applications where fire retardancy is a requirement or desired are candidates to be coated by the boric acid/urea dispersion of the invention or the boric acid dispersion described below that does not contain urea. Typical cellulosic materials, which may be coated with an effective amount of the boric acid/urea dispersion or boric acid dispersion and used in structures or the like where fire retardancy is desired, include papers, cardboards, rayons, cottons, shoddy fabrics, natural fibers, synthetic fibers, linens, wood fibers, plant fibers, liner boards, ground newspaper and a mixture of wood fibers and ground newspaper, or combinations thereof. While any application process can be used to coat these cellulosic materials, the sprayability of the boric acid/urea dispersion or boric acid dispersion makes either of these dispersions an ideal candidate for spray application to a cellulosic material. One example of an application would be to apply the boric acid/urea dispersion or boric acid dispersion to ground newspaper or a mixture of wood fibers and ground newspaper, and then use this coated mixture for insulation purposes, e.g., blowing the mixture into attics and other spaces/structures where insulation is desired. Depending on the form of the cellulosic material, the coating process may coat the material in its entirety or on a portion that would be less than the entirety but still be enough coverage of the cellulosic material to provide the desired fire retardancy. While the weight percentage of the applied dispersion based on the total weight of the coated cellulosic material may vary depending on the type of cellulosic material, end use application, and level of fire retardancy required, typical percentages using a dry basis content wt. would range from 3% to 24% of the coated cellulosic material. However, one skilled in the art will readily recognize that the spray application of the boric acid/urea dispersion or boric acid dispersion onto the cellulose can also be used in various combinations with dry powder additives of boric acid and/or sodium borates (e.g., borax pentahydrate, borax decahydrate or DOT) as required to meet the desired fire retardancy and final moisture content properties.

Cellulose insulation, for example, commonly refers to a loose fill product produced primarily from ground newspaper although combinations of ground newspaper and wood fiber are also known to be used. The appeal of cellulose as an insulation material arises from its good thermal insulation properties and its ease of production and subsequent installation. All cellulose insulation products sold in the United States must meet certain Federal specifications (namely Federal Specification HH-I-515-I). For fire retardancy, the specification calls for conducting a Radiant Panel Test for flame spread in combination with a smoldering combustion test. In order to meet the standard, the Critical Radiant Flux (CRF) has to be greater than or equal to 0.12 $W/cm^2$ in the Radiant Panel surface flammability test. For the smoldering combustion test, the weight loss of the cellulose in a steel box (20×20×10 cm) has to be less than 15% after 2 hours using a lighted cigarette as the ignition source. It is known that boric acid is effective in limiting flame spread (as measured by the Radiant Panel surface flammability test) and for also inhibiting smoldering combustion. In comparison, sodium borates are known to be effective in limiting flame spread but can promote smoldering combustion (see discussion in Section 9.2.2 p. 211 in the CRC Press book publication "Fire Retardancy of Polymeric Materials", $2^{nd}$ Edition, edited by Wilkie, C A., et. al. CRC Press, 2010). In the Federal specification for cellulose insulation there are also corrosion related requirements. To balance the flammability test performance and the corrosion test performance while also controlling cost, it is reported in the aforementioned CRC publication that a commonly used combination has been a 1:1 w/w ratio blend of boric acid and borax pentahydrate at a total loading of 15-18% by weight in the cellulose insulation. This total wt. % loading range of boric acid plus borax pentahydrate therefore serves as guidance for targeting an effective content level when applying the high solids boric acid dispersions discussed herein on a cellulosic material.

Similarly, U.S. Pat. No. 8,308,997 discussed above also provides examples of the amounts of boron atom wt. percentages as derived from DOT (disodium octaborate tetrahydrate) and urea wt. percentages used on a given material for effective fire retardancy on cellulosic materials and these boron wt. percentages could be used as loading targets when applying the boric acid/urea dispersion on a cellulosic material. For example, in a preferred embodiment disclosed in the '997 patent, the cellulosic article of commerce comprises from about 0.6 wt. % boron to about 2.5 wt. % boron while the urea content therein ranges from 2 wt. % urea to 15 wt. % urea. An article boron content of 0.6 wt. % therefore translates to a boric acid content of 3.43 wt. % while an article boron content of 2.5 wt. % translates to a boric acid content of 14.3 wt. % in the cellulosic article. When utilizing a boric acid/urea dispersion in accordance with the present invention having a 1.5:1 w/w ratio, the total wt. % content of boric acid plus urea in the cellulosic article would therefore range from 5.72% (3.43% BA+2.29% urea) to 23.8% (14.3% BA+9.53% urea) to deliver the equivalent wt. %'s of boron (0.6-2.5 wt. %) as defined in the '997 patent. Using these content loading guidelines, the boric acid/urea dispersion or boric acid dispersion can therefore be used in place of the DOT/urea materials utilized in the method of coating cellulosic materials as detailed in U.S. Pat. No. 8,308,997.

Another embodiment of the invention along with the coated wood product is a method of coating a wood product to improve its fire retardancy. This method entails applying an effective amount of the coating formulation described above to at least one surface of the wood product to improve the fire retardancy of the wood product and form a coated wood product and then drying the coated wood product. This method can be used on any kind of wood product needing fire retardancy, including but not limited to particle board, oriented strand board, and medium density fiberboard as well as dimensional lumber materials.

Yet another embodiment of the invention is an improvement in the method of making wood products that use wood fiber, particles or flakes, an adhesive, and a fire retardant additive. The improvement is the use of the inventive boric acid/urea dispersion as the fire retardant additive in these kinds of wood product manufacturing methods. The dispersion can be applied using any of the known methods for adding fire retardants when making wood products, e.g. spraying the dispersion on the wood product starting materials, and the like. As with the coating method described above, any kind of a wood product that is in need of a fire retardant when being manufactured is a candidate for using of the inventive boric acid/urea dispersion and examples of these wood products include particle board, oriented strand board, and medium density fiberboard.

DETAILED DESCRIPTION OF THE INVENTION

Figure 1:
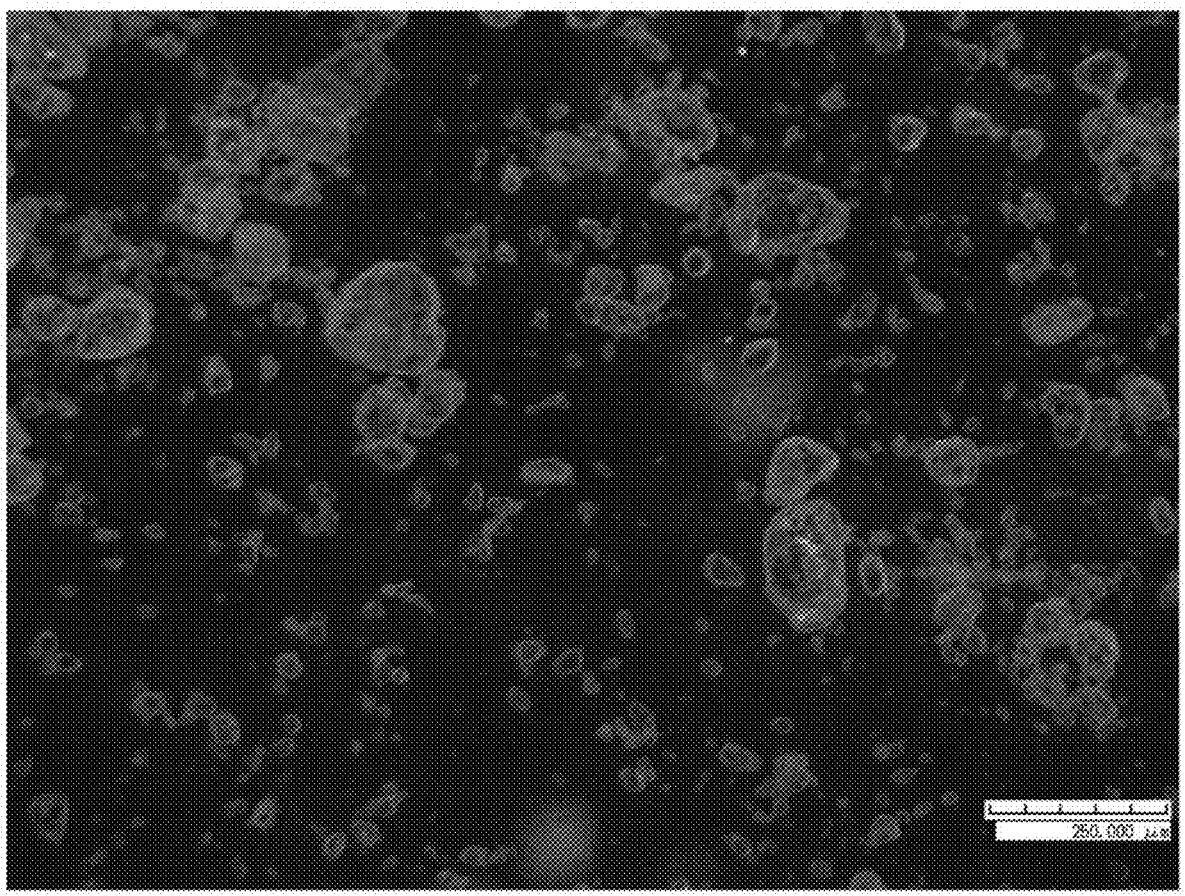
FIG. 1 is an aqueous suspension micrograph of a boric acid fine particle size dispersion.

The following description provides details concerning both an aqueous boric acid dispersion and its properties and applications and an improved aqueous boric acid dispersion that uses an effective amount of urea to improve the dispersion's physical and rheological properties as well as its resultant fire retardant performance in engineered wood and cellulose article applications. The aqueous boric acid dispersion comprises a fine particle dispersion having boric acid particles with a median particle size range of less than 44 microns, having a % solids content of boric acid particles of 50% or greater and further comprising an effective amount of at least one viscosity reducing agent such that the boric acid dispersion has an initial Brookfield 2 rpm static viscosity of 5,000 to 25,000 centipoise and a three week aged Brookfield 2 rpm static viscosity of less than 250,000 centipoise. Having these properties provides a significant advantage in that the dispersion has long term stability, i.e., the boric acid stays in suspension over a long period of time. As such, the boric acid dispersion can be transported in totes and tanker trucks to a wood panel product making facility and the wood product making facility does not have to invest in any manufacturing equipment to be able to supply a boric acid or borate as a fire retardant at its wood product manufacturing facility.

The boric acid dispersion also has a fine particle size particulate of boric acid, which improves its distribution and surface coverage in any wood products using the dispersion for fire retardancy. Using the dispersion results in a more homogenous distribution of the boric acid particles throughout the wood product and uniform surface coverage thereof and avoids the segregation problem that exists in prior art products that use larger size boric acid or borates, such segregation possibly compromising the flame spread index (PSI) properties of the finished wood product.

The boric acid dispersion as a fire retardant additive can be used in any known engineered wood product manufacturing processes. The processes include the manufacture of oriented strand board (OSB), particle board (PB), and medium density fiberboard (MDF) panels. As the manufacturing of these types of engineered wood products is well known in the art, a detailed description of the details of the wood product manufacturing is not needed for understanding of the invention.

The aqueous boric acid dispersion can be used in an effective amount in any of the wood product manufacturing process in order to improve the fire retardancy thereof. Examples of the application of the boric acid dispersion in these effective amounts in wood product manufacturing applications are detailed below.

Besides using the boric acid dispersion as a fire retardant additive in wood product manufacture, the boric acid dispersion can also be used as the main pigment component within a waterborne coating formulation to be applied to a wood product, such as OSB. In this embodiment, a coating process is employed that coats the surface of a wood product using the boric acid particulate-containing coating formulation. A compatible waterborne organic binder is used with the boric acid particles to enhance the wood product's fire retardant properties and to facilitate the binding of the boric acid particles to the wood product. The organic binder can also affect other coating film properties such as flexibility and durability, the coating's ability to be nailed without cracking, its water and weather resistance properties and the like. The boric acid plus binder coating formulation can optionally contain other ingredients such as mineral pigments, colorants, titanium dioxide pigment, thickeners, surfactants, dispersing agents, preservatives, defoamers, solvents, blowing-agents (e.g., melamine or urea), char forming carbonizing additives (e.g., polyols), etc. without departing from the spirit of the invention. The use of additional formulation ingredients largely depends on the end application and whether the coating is intended to be only fire retardant functional or fire retardant functional as well as decorative. Furthermore, the use of blowing agents and carbonizing additives are usually associated with the formulation of a class of fire retardant coatings known as intumescent coatings whose basic operating principle involves an applied coating that reacts to rising heat by expanding to generate a heat-insulating char that slows or even prevents the underlying substrate from reaching a critical temperature. With regards to the boric acid in the boric acid dispersion, it would serve the function of being an acid donor or co-donor agent in an intumescent type coating formulation. In accordance with the teachings of the technical literature ("Intumescent Paints: An Area of Growing Importance," Austin, S, et. al., Paint & Coatings Industry, Oct. 11, 2017), there are four key ingredients in a water-based intumescent coating formulation:

Acid Donor
Carbon Source (typically a polyol)
Blowing Agent
Binding polymer (typically a vinyl acetate based copolymer)

A commonly known and utilized acid donor for intumescent coatings is ammonium polyphosphate but the use of boric acid in intumescent coatings directed to fire retarding wood substrates is known in the prior art. Representative examples of boric acid use in intumescent coatings for wood are disclosed in the following publications/patents: U.S. Pat. No. 6,425,947 B1, US 2014/0295164 A1, RU 2198193 C2 and CN 109370288 A. While the use of boric acid in such coatings is known, the boric acid dispersion herein described would represent a novel way of introducing this additive, available in high solids content liquid form, into waterborne coating formulations. Such boric acid dispersions can therefore serve as the pigment master batch in part or as a whole when formulating water borne coatings offering fire retardant properties.

Using the fine particle boric acid dispersion also produces a product of the coating process, i.e., a coated wood product board, wherein the coating comprises the fine particle size boric acid particles and the binder. Typical applied coating film thicknesses for these types of products is 2-10 mils.

The boric acid dispersion is typically made in water using a high shear mixing process that uses at least one viscosity-reducing agent. The viscosity reducing agent contributes to the ability to have a fine particle size in the dispersion, e.g., less than 44 µm for the median particle size, a solids content of the boric acid particles of at least 50% solids, and a stability as measured in terms of Brookfield initial and aged static viscosities and, optionally dynamic viscosity, which means that the boric acid particle dispersion remains dispersed, doesn't settle, and is readily pumpable over time so that the dispersion can be effectively transported in bulk and not lose the dispersive characteristics when the dispersion is to be used later in a wood product making or coating application.

The solids content of the boric acid particles in the boric acid dispersion can be up to 55% or even up to 60%. Providing a dispersion with excessive water, i.e., much less than 50% solids content, presents a moisture control problem for the wood panel manufacturer. It is therefore advantageous to minimize the amount of water being back added to the wood source being used in the engineered wood panel manufacturing facility. The moisture content of the wood fiber, chips or flakes has to be carefully controlled within certain limits during the wood panel manufacturing process otherwise panels with defects or performance deficiencies are produced.

Figure 2:
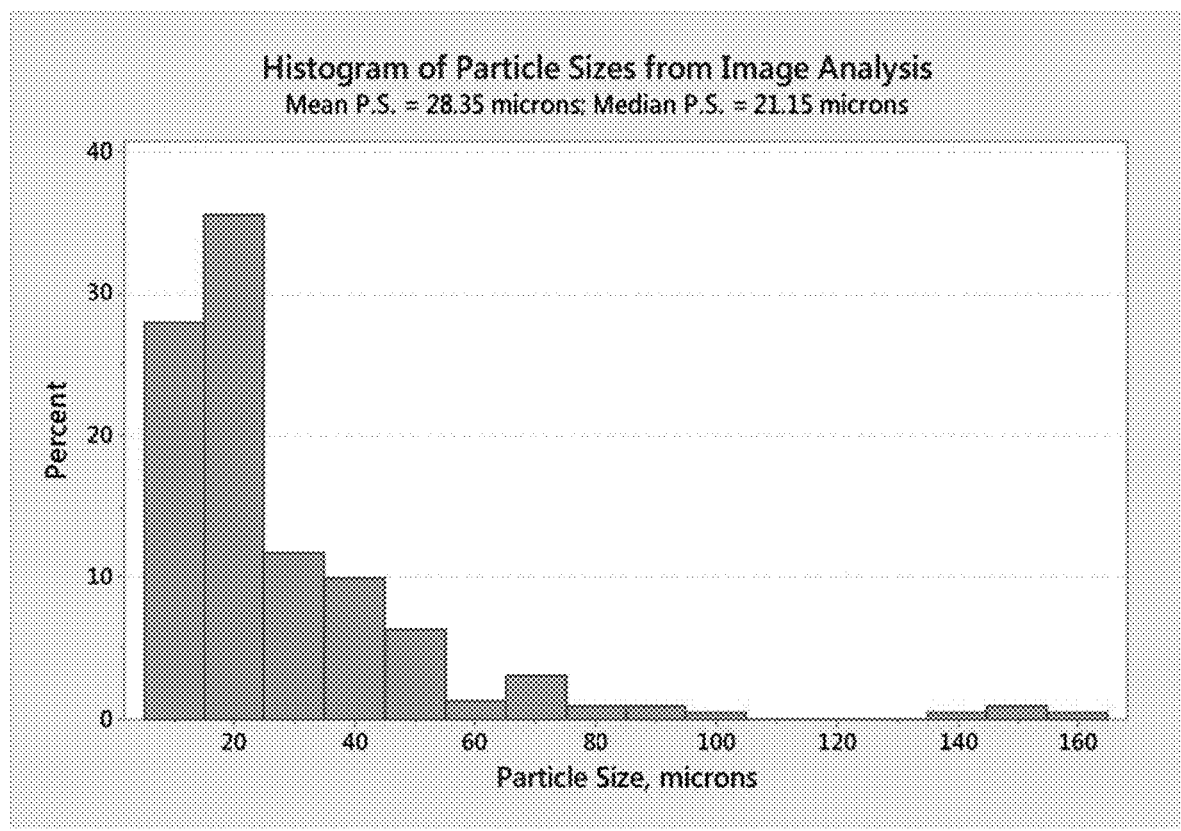
FIG. 2 is a histogram particle size analysis of a boric acid dispersion by microscopic image analysis.

In the formation of aqueous boric acid dispersions, two different dry starting materials are readily available from boric acid and borate producers. One is a technical grade (TG) granular material having crystalline particles predominantly falling within the 40-100 mesh size range (149-420 µm). The other is a pulverized powder of TG boric acid where about 61% of the particles are −200 mesh (or 61%<74 µm) in size. The comparative particle size properties of these possible dry boric acid starting materials are shown in Table 1A.

tioned micrograph, in fact, indicates that the median particle size is about 21 µm (see histogram analysis plot of FIG. 2). A target median particle size range of the boric acid particles in the inventive dispersion is 44 µm or less, with a more preferred median particle size range being between about 10 and 30 µm. The particle size distribution associated with this high solids dispersion of boric acid is therefore considerably finer in particle size than the particle size of the starting material of TG boric acid powder, thus illustrating that significant attrition of the boric acid has occurred during the high-shear dispersion process. Attrition of the boric acid particle size is a consequence of the high-shear mixing conditions employed in the dispersion process acting in combination with the alkali base and the viscosity reducing agent. The histogram analysis plot (per FIG. 2) also indicates that the overall dispersion of boric acid is uniform in particle size distribution which is counter to the prior art teachings of Dietrich. Furthermore, the median particle size and particle size distribution associated with the inventive boric acid dispersion is significantly finer in particle size than anything previously described in the prior art for high solids dispersions of boric acid (high solids being boric acid solids contents ≥50%).

In such high solids aqueous dispersions of boric acid, the dispersion is a heterogeneous system whereby a portion of the boric acid is solubilized in water and the remaining boric acid is present as insoluble particulates suspended in that solution. The fraction of boric acid that is in solution is related to its reported solubility properties in water as a function of temperature (see solubility chart below taken from Rio Tinto's product literature).

TABLE 1A

Typical Particle Size Properties of Technical Grade Boric Acid Raw Materials[a]

| US Standard Sieve Screen, mesh | Equivalent Particle Size Range in microns | TG Granular BA, Typical Wt. % | TG Powdered BA, Typical Wt. % |
|---|---|---|---|
| +40 | >420 µM | 4.8 | 0.0 |
| −40, +100 | <420 but >149 µM | 68.1 | 5.0 |
| −100, +200 | <149 but >74 µM | 23.5 | 32.3 |
| −200, +325 | <74 but >44 µM | 3.0 | 23.4 |
| −325 | <44 µM | 0.6 | 39.4 |

Note:
[a] BA is an abbreviation for boric acid. Reported sieve screen data supplied by National Boraxx Corporation of Cleveland, Ohio on their Technical Grade Granular and Powder Grade Boric Acids.

It is known that prior art dispersion processes teach that it is advantageous to utilize the TG granular boric acid in a low-shear mixing process and that the resultant high solids dispersion yields particles that are on average about 800 µm in size; see the Dietrich patent discussed above.

As such, it is preferred that a high-shear dispersion process and dispersion made therefrom uses the TG boric acid pulverized powder as its starting material and this subsequently leads to making a much finer particle size dispersion of boric acid for fire retardant application uses.

Microscopic examination of the aqueous dispersion of boric acid produced by the high-shear mixing process shows that the majority of the boric acid particles are <50 µm in size (as seen in the micrograph picture of FIG. 1 from illustrative example Expt. #1 as discussed below). Image analysis of the boric acid dispersion shown in the aforemen-

| Solubility in water | | |
|---|---|---|
| Temp ° C. | (° F.) | Boric acid % by weight in saturated solution |
| 0 | (32) | 2.52 |
| 5 | (42) | 2.98 |
| 10 | (50) | 3.49 |
| 20 | (68) | 4.72 |
| 25 | (77) | 5.46 |
| 30 | (86) | 6.23 |
| 35 | (95) | 7.12 |
| 40 | (104) | 8.08 |
| 45 | (113) | 9.12 |
| 50 | (122) | 10.27 |
| 55 | (131) | 11.55 |
| 60 | (140) | 12.97 |

-continued

| Solubility in water | | |
|---|---|---|
| Temp ° C. | (° F.) | Boric acid % by weight in saturated solution |
| 65 | (149) | 14.42 |
| 70 | (158) | 15.75 |
| 80 | (176) | 19.10 |
| 85 | (185) | 21.01 |
| 90 | (194) | 23.27 |
| 95 | (203) | 25.22 |
| 100 | (212) | 27.53 |
| 103.3 | (217.9)* | 29.27 |

*Boiling point of solution

The high solids, fine particle boric acid dispersion entails the use of a high-shear dispersion process employing a Cowles or Hockmeyer style dispersion blade as generally outlined below. In general, the process of making the dispersion involves dispersing a series of boric acid aliquots into the batch along with an accompanying addition of small quantities of either KOH or viscosity reducing agent as part of the series of boric acid aliquots. This dispersion protocol aids in breakdown of the boric acid particles during the high shearing mixing of the boric acid aliquots and mitigates excessive viscosity build during the makedown process. While variations of this process are possible and will be evident to one skilled in the art, the essentials of the dispersion process are as follows:

1) A TG boric acid powder is preferably used as the starting material for the dispersion process.
2) A high-shear mixing system is employed to disperse the boric acid powder into water.
3) Deionized water is preferably used as the water in the process:
   a. hard water is not desirable because it contains divalent metal cations, such as $Ca^{+2}$ and $Mg^{+2}$, which can react with the solubilized boric acid to form calcium or magnesium borates; and
   b. soft water is also less desirable than using deionized water because water softener systems release Na ions into the water as a result of the cation exchange process to remove the water hardness cations so that the total amount of $Na^+$ that is present or introduced during the dispersion should be minimized since sodium borates can be produced.
4) It is preferred that the starting deionized water to be used in the dispersion process should be chilled down to a starting temperature of about 12° C. Starting with chilled deionized water is helpful in keeping the maximum process temperature to a preferred level of below 30° C.
5) The total boric acid powder requirement should be added in several increments. Each incremental amount should be well dispersed before adding the next addition of boric acid.
6) In between boric acid powder additions, small amounts of KOH or other alkali base metal can be added to help lessen the dispersion's viscosity before adding the next incremental amount of boric acid. However, the total amount of KOH to be employed for the purpose of viscosity reduction should be controlled to be <0.01 on a KOH/BA mole ratio basis. KOH is the preferred alkali metal base to be used for these additions.
7) Near the end of the incremental boric acid addition and dispersion process, a small quantity of a viscosity reducing agent should be added to further reduce the batch's viscosity and to help stabilize it during subsequent storage and transport to end-use customer's facilities. This viscosity reducing agent is discussed in more detail below.
8) Finally, a pre-blend of a surfactant plus xanthan gum can be added and mixed in well and an adequate mixing time should be utilized to enable the xanthan gum to become well dispersed into the boric acid dispersion.
   a. An optional nonionic surfactant of intermediate HLB value, e.g., an HLB range of 6-14, can be used as the surfactant in the pre-blend of xanthan gum/surfactant to help wet the xanthan gum and allow for its easier dispersion into the boric acid dispersion. A particularly useful low foaming nonionic surfactant for this purpose is Surfynol 440 which is an ethoxylated 2,4,7,9-tetramethyl 5 decyn-4,7 diol which has a reported HLB value of 8.0.
   b. The xanthan gum serves a dual role in the boric acid dispersion formulation when used. It helps as a pigment suspension aide for the boric acid particles and also helps to stick the boric acid dispersion onto wood particles or chips when the dispersion is applied, e.g., spraying, onto them for end application use.
9) Care should be taken throughout the boric acid dispersion process that the maximum batch temperature not be allowed to exceed about 30° C. If necessary, the dispersion process can be conducted in a jacketed mixing vessel to help regulate the batch's process temperature.
   a. Given the temperature dependent solubility of boric acid, see the solubility chart above, it is desired to avoid forming a supersaturated solution that will tend to crystallize out a lot of boric acid when the batch subsequently cools off to room temperature. Mitigating recrystallization is important for preserving the overall product stability of the finished boric acid dispersions.

Table 1B provides a summary list of chemistries that have been evaluated as viscosity reducing agents for the boric acid dispersion as produced at 60% solids using a high-shear mixing procedure as outlined above where a KOH/BA mole ratio=0.004355 was employed.

TABLE 1B

Description of Dispersant & Surfactant Additives Tested in 60% Solids BA Dispersion[a]

| Chemical Tradename/ Supplier | Chemical or Generic Description | % Activity | Chemical Class & Comments |
|---|---|---|---|
| Tomamine Q-C-15/ Evonik | Coco poly (15) oxyethylene methyl ammonium chloride | 100% | Cationic Surfactant (Ethoxylated Quaternary Amine) |
| Tomamine Q-14-2/ Evonik | Isodecyloxypropyl bis-(2-hydroxy-ethyl) methyl ammonium chloride | 75% | Cationic Surfactant (Ethoxylated Quaternary Amine) |

TABLE 1B-continued

Description of Dispersant & Surfactant Additives
Tested in 60% Solids BA Dispersion[a]

| Chemical Tradename/ Supplier | Chemical or Generic Description | % Activity | Chemical Class & Comments |
|---|---|---|---|
| Tomamine Q-17-2/ Evonik | Isotridecyloxypropyl bis-(2-hydroxyethyl) methyl ammonium chloride | 75% | Cationic Surfactant (Ethoxylated Quaternary Amine) |
| Arquad 2C-75/Akzo Nobel | Dicocoalkyldimethyl ammonium chloride | 75% | Cationic Surfactant (Quaternary Amine but No Ethoxylation) |
| Tomamine E-14-5/ Evonik | Poly (5) oxyethylene isodecyloxypropylamine | 100% | Ethoxylated Amine Surfactant |
| Tomamine E-17-5/ Evonik | Poly (5) oxyethylene isotridecyloxypropylamine | 100% | Ethoxylated Amine Surfactant |
| Edaplan 397/ Munzing | Blend of Polyglycol Esters | 100% | Nonionic Polymeric Dispersant |
| Edaplan 494/ Munzing | Copolymer with pigment affinic groups | 50% | Anionic Polymeric Dispersant |
| Edaplan 490/ Munzing | Copolymer with pigment affinic groups | 40% | Nonionic Polymeric Dispersant |
| Zetasperse 3600/ Evonik | Electrosteric Dispersant & Grind Aide | 52% | Anionic Polymeric Dispersant |
| Zetasperse 1200/ Evonik | Dynamic Wetter + Anionic Dispersant Polymer | 45% | Nonionic & Anionic Polymeric Dispersant |
| Zetasperse 170/Evonik | Blend of Ethoxylated $C_6$-$C_{12}$ Alcohols + Polyoxyalkylene amine derivative | 100% | Nonionic Wetting Agent & Steric Stabilizer for Acidic Pigments |
| Acumer 3100/ Dow Chemical | Carboxylate/Sulfonate/Nonionic Functional Terpolymer | 40% | Polymeric Dispersant |
| Flosperse 9000/SNF | Sodium Polyacrylate | 40% | Anionic Polymeric Dispersant |
| Tamol SN/ Dow Chemical | Sodium Naphthalene Sulfonate | 94% | Anionic Dispersing Agent |
| E-Sperse 100/ Ethox Chemical | Proprietary Dispersing Agent | 71.5% | Anionic Dispersing Agent |
| T-DET A 91-6/Harcros | Poly (6) oxyethylene $C_9$-$C_{11}$ aliphatic Alcohol | 100% | Nonionic Wetting Agent |
| Ethal TDA-5/ Ethox Chemical | Poly (5) oxyethylene iso-$C_{13}$ Alcohol | 100% | Nonionic Wetting Agent |
| T-DET EPO-62/Harcros | Ethylene Oxide/Propylene Oxide Copolymer | 100% | Polymeric Nonionic Wetting Agent |
| Lumulse PEG200/ Vantage | Polyethylene Glycol 200 | 100% | Polymeric Nonionic Wetting Agent |
| DeTERIC ODP-LF/ DeForest | Sodium Octyliminodipropionate | 50% | Amphoteric Surfactant |
| ChemWet 75/ BYK | Butanedioic acid, 2-sulfo-, 1,4-bis(2-ethylhexyl) ester, sodium salt; also known as Na DOSS | 75% | Anionic Wetting Agent |
| Ethfac 140/ Ethox Chemical | Oleyl 4(EO) Phosphate Ester | 100% | Phosphate Ester Wetting Agent |
| Ethfac 161/ Ethox Chemical | Decyl 6(EO) Phosphate Ester | 100% | Phosphate Ester Wetting Agent |

Table Notes:
[a]All dispersion batches of TG Boric Acid Powder were made using the high-shear mixing procedure described above. Surfactants and chemical dispersants listed herein were tested as the viscosity reduction additive. All surfactants and chemical dispersants were utilized on an equivalent active weight basis.

In addition, the viscosity reduction and stabilizing effect that each chemistry additive had on the fine particle size boric acid dispersion as it aged was assessed. The additive chemistries were all evaluated at an equivalent active dosage level of 0.12% by wt. in the dispersion process. The additive chemistries tested included the following types:

- various surfactants (nonionic, anionic, amphoteric and cationic types)
- dispersants (polymeric anionic and anionic/nonionic types)
- phosphate esters The dispersion results observed over time from testing the additive chemistries listed in Table 1B are summarized in Table 1C.

TABLE 1C pH and Brookfield Viscosity Tracking Results for 60% Solids, High-Shear BA Dispersions[a]

| Expt, #/ Chemical Tradename/ Supplier | Specific Gravity[c] (g/ml) | Initial pH & BF Visc.[b], cPs | Aged pH & BF Visc.[b], cPs (after 3 days) | Aged pH & BF Visc.[b], cPs (after 1 week) | Aged pH & BF Visc.[b], cPs (after 2 weeks) | Aged pH & BF Visc.[b], cPs (after 3 weeks) | Experimental Observations & Comments |
|---|---|---|---|---|---|---|---|
| *Experiments with Cationic Surfactants* | | | | | | | |
| #1) Tomamine Q-C-15/Evonik | 1.2025 | Sp #91<br>2 rpm = 16,100<br>20 rpm = 3,410<br>pH = 5.90 | Sp #91<br>2 rpm = 57,000<br>20 rpm = 9,140<br>pH = 5.77 | Sp #92<br>2 rpm = 73,800<br>20 rpm = 9,480<br>pH = 5.79 | Sp #92<br>2 rpm = 119,000<br>20 rpm = 16,640<br>pH = 5.81 | Sp #93<br>2 rpm = 180,000<br>20 rpm = 22,750<br>pH = 5.76 | manageable process viscosity & pumpable after aging |
| #2) Tomamine Q-14-2/Evonik | 1.2376 | Sp #91<br>2 rpm = 10,300<br>20 rpm = 1,900<br>pH = 5.95 | Tracking Stopped | NA | NA | NA | ~⅛" layer of clear syneresis observed after 24 hrs. |
| #3) Tomamine Q-17-2/Evonik | 1.2449 | Sp #91<br>2 rpm = 21,500<br>20 rpm = 2,500<br>pH = 5.91 | Tracking Stopped | NA | NA | NA | ~¼" layer of clear syneresis observed after 24 hrs. |
| #4) Arquad 2C-75/Akzo Nobel | 1.2234 | Sp #91<br>2 rpm = 14,000<br>20 rpm = 2,670<br>pH = 5.88 | Tracking Stopped | NA | NA | NA | ~½" layer of clear syneresis observed after 24 hrs. |
| *Experiments with Ethoxylated Amine Surfactant* | | | | | | | |
| #5) Tomamine E-14-5/Evonik | 1.2354 | Sp #91<br>2 rpm = 12,900<br>20 rpm = 2,500<br>pH = 5.90 | Sp #91<br>2 rpm = 40,200<br>20 rpm = 6,600<br>pH = 5.79 | Sp #91<br>2 rpm = 50,400<br>20 rpm = 8,030<br>pH = 5.73 | Sp #92<br>2 rpm = 77,200<br>20 rpm = 10,200<br>pH = 5.82 | Sp #93<br>2 rpm = 210,500<br>20 rpm = 19,450<br>pH = 5.74 | slight syneresis observed after 3 weeks |
| #6) Tomamine E-17-5/Evonik | 1.2302 | Sp #91<br>2 rpm = 33,600<br>20 rpm = 3,300<br>pH = 5.95 | Tracking Stopped | NA | NA | NA | notable syneresis observed within 2 hrs. |
| *Experiments with Pigment Dispersants (Anionic & Nonionic Types)* | | | | | | | |
| #7) Edaplan 397/Munzing | 1.2378 | Sp #91<br>2 rpm = 21,000<br>20 rpm = 3,890<br>pH = 5.94 | Sp #92<br>2 rpm = 152,000<br>20 rpm = 19,660<br>pH = 5.79 | Sp #93<br>2 rpm = 355,000<br>20 rpm = 38,500<br>pH = 5.73 | Sp #94<br>2 rpm = 830,000<br>20 rpm = 68,900<br>pH = 5.74 | Sp #96<br>2 rpm = 1,470,000<br>20 rpm = 103,000<br>pH = 5.74 | unpumpable |
| #8) Edaplan 494/Munzing | 1.239 | Sp #91<br>2 rpm = 24,600<br>20 rpm = 4,440<br>pH = 5.94 | Sp #92<br>2 rpm = 114,200<br>20 rpm = 14,360<br>pH = 5.80 | Sp #92<br>2 rpm = 157,800<br>20 rpm = 18,120<br>pH = 5.73 | Sp #93<br>2 rpm = 404,000<br>20 rpm = 36,700<br>pH = 5.75 | Sp #93<br>2 rpm = 482,000<br>20 rpm = 38,700<br>pH = 5.78 | poor pumpability |
| #9) Edaplan 490/Munzing | 1.2509 | Sp #91<br>2 rpm = 21,900<br>20 rpm = 4,040<br>pH = 5.91 | Sp #92<br>2 rpm = 84,400<br>20 rpm = 11,320<br>pH = 5.73 | Sp #92<br>2 rpm = 127,000<br>20 rpm = 16,580<br>pH = 5.95 | Sp #93<br>2 rpm = 245,000<br>20 rpm = 23,000<br>pH = 5.75 | Sp #93<br>2 rpm = 273,000<br>20 rpm = 24,800<br>pH = 5.74 | fair pumpability |
| #10) Zetasperse 3600/Evonik | 1.2394 | Sp #91<br>2 rpm = 22,500<br>20 rpm = 4,350<br>pH = 5.89 | Sp #92<br>2 rpm = 90,400<br>20 rpm = 12,700<br>pH = 5.74 | Sp #92<br>2 rpm = 125,600<br>20 rpm = 16,280<br>pH = 5.88 | Sp #93<br>2 rpm = 220,500<br>20 rpm = 24,300<br>pH = 5.74 | Sp #93<br>2 rpm = 299,000<br>20 rpm = 29,700<br>pH = 5.77 | fair pumpability |
| #11) Zetasperse 1200/Evonik | 1.2439 | Sp #91<br>2 rpm = 23,000<br>20 rpm = 4,250<br>pH = 5.90 | Sp #92<br>2 rpm = 98,600<br>20 rpm = 13,140<br>pH = 5.73 | Sp #92<br>2 rpm = 160,200<br>20 rpm = 19,160<br>pH = 5.86 | Sp #93<br>2 rpm = 321,500<br>20 rpm = 33,000<br>pH = 5.73 | Sp #93<br>2 rpm = 475,500<br>20 rpm = 42,900<br>pH = 5.75 | poor pumpability |
| #12) Zetasperse 170/Evonik | 1.2156 | Sp #91<br>2 rpm = 20,300<br>20 rpm = 3,720<br>pH = 5.85 | Sp #92<br>2 rpm = 113,200<br>20 rpm = 14,460<br>pH = 5.89 | Sp #93<br>2 rpm = 197,500<br>20 rpm = 22,600<br>pH = 5.83 | Sp #93<br>2 rpm = 326,000<br>20 rpm = 31,000<br>pH = 5.71 | Sp #93<br>2 rpm = 428,000<br>20 rpm = 35,150<br>pH = 5.65 | poor pumpability |

TABLE 1C-continued pH and Brookfield Viscosity Tracking Results for 60% Solids, High-Shear BA Dispersions[a]

| Expt, #/ Chemical Tradename/ Supplier | Specific Gravity[c] (g/ml) | Initial pH & BF Visc.[b], cPs | Aged pH & BF Visc.[b], cPs (after 3 days) | Aged pH & BF Visc.[b], cPs (after 1 week) | Aged pH & BF Visc.[b], cPs (after 2 weeks) | Aged pH & BF Visc.[b], cPs (after 3 weeks) | Experimental Observations & Comments |
|---|---|---|---|---|---|---|---|
| #13) Acumer 3100/Dow Chemical | 1.2442 | Sp #91<br>2 rpm = 31,200<br>20 rpm = 5,020<br>pH = 5.94 | Sp #92<br>2 rpm = 131,200<br>20 rpm = 16,140<br>pH = 5.80 | Sp #93<br>2 rpm = 261,500<br>20 rpm = 27,250<br>pH = 5.78 | Sp #93<br>2 rpm = 449,000<br>20 rpm = 39,300<br>pH = 5.77 | Sp #93<br>2 rpm = 486,500<br>20 rpm = 40,750<br>pH = 5.76 | poor pumpability |
| #14) Flosperse 9000/SNF | 1.2451 | Sp #91<br>2 rpm = 28,100<br>20 rpm = 4,750<br>pH = 5.95 | Sp #92<br>2 rpm = 128,000<br>20 rpm = 16,200<br>pH = 5.93 | Sp #93<br>2 rpm = 236,000<br>20 rpm = 26,600<br>pH = 5.85 | Sp #93<br>2 rpm = 328,500<br>20 rpm = 34,600<br>pH = 5.84 | Sp #93<br>2 rpm = 446,000<br>20 rpm = 59,800<br>pH = 5.84 | poor pumpability |
| #15) Tamol SN/Dow Chemical | 1.2434 | Sp #91<br>2 rpm = 33,900<br>20 rpm = 6,260<br>pH = 5.87 | Sp #92<br>2 rpm = 124,600<br>20 rpm = 16,280<br>pH = 5.74 | Sp #93<br>2 rpm = 265,500<br>20 rpm = 29,350<br>pH = 5.88 | Sp #93<br>2 rpm = 390,000<br>20 rpm = 37,450<br>pH = 5.75 | Sp #93<br>2 rpm = 493,500<br>20 rpm = 45,200<br>pH = 5.75 | poor pumpability |
| #16) E-Sperse 100/ Ethox Chemical | 1.2321 | Sp #91<br>2 rpm = 23,100<br>20 rpm = 4,280<br>pH = 5.90 | Sp #92<br>2 rpm = 113,800<br>20 rpm = 14,700<br>pH = 5.81 | Sp #92<br>2 rpm = 149,000<br>20 rpm = 18,200<br>pH = 5.88 | Sp #93<br>2 rpm = 360,000<br>20 rpm = 35,150<br>pH = 5.75 | Sp #93<br>2 rpm = 414,500<br>20 rpm = 38,050<br>pH = 5.74 | poor pumpability |
| Experiments with Nonionic, Anionic or Amphoteric Type Surfactants | | | | | | | |
| #17) T-DET A 91-6/ Harcros | 1.1867 | Sp #91<br>2 rpm = 24,000<br>20 rpm = 4,060<br>pH = 5.86 | Sp #92<br>2 rpm = 94,200<br>20 rpm = 12,620<br>pH = 5.80 | Sp #92<br>2 rpm = 123,400<br>20 rpm = 16,260<br>pH = 5.89 | Sp #93<br>2 rpm = 293,000<br>20 rpm = 32,800<br>pH = 5.71 | Sp #93<br>2 rpm = 359,000<br>20 rpm = 32,450<br>pH = 5.74 | poor pumpability |
| #18) Ethal TDA-5/ Ethox Chemical | 1.223 | Sp #91<br>2 rpm = 19,200<br>20 rpm = 3,570<br>pH = 5.86 | Sp #92<br>2 rpm = 87,200<br>20 rpm = 12,200<br>pH = 5.85 | Sp #93<br>2 rpm = 168,500<br>20 rpm = 20,400<br>pH = 5.85 | Sp #93<br>2 rpm = 290,000<br>20 rpm = 30,500<br>pH = 5.74 | Sp #93<br>2 rpm = 448,000<br>20 rpm = 38,200<br>pH = 5.72 | poor pumpability |
| #19) T-DET EPO-62/ Harcros | 1.2455 | Sp #91<br>2 rpm = 30,800<br>20 rpm = 4,900<br>pH = 5.88 | Sp #92<br>2 rpm = 160,600<br>20 rpm = 18,600<br>pH = 5.90 | Sp #93<br>2 rpm = 266,000<br>20 rpm = 30,200<br>pH = 5.86 | Sp #93<br>2 rpm = 411,000<br>20 rpm = 37,450<br>pH = 5.76 | Sp #94<br>2 rpm = 867,000<br>20 rpm = 55,400<br>pH = 5.70 | unpumpable |
| #20) Lumulse PEG200/ Vantage | 1.2492 | Sp #91<br>2 rpm = 36,000<br>20 rpm = 5,440<br>pH = 5.83 | Sp #92<br>2 rpm = 156,200<br>20 rpm = 18,220<br>pH = 5.88 | Sp #93<br>2 rpm = 252,000<br>20 rpm = 26,000<br>pH = 5.82 | Sp #93<br>2 rpm = 357,000<br>20 rpm = 32,500<br>pH = 5.71 | Sp #93<br>2 rpm = 462,500<br>20 rpm = 37,650<br>pH = 5.70 | poor pumpability |
| #21) DeTERIC ODP-LF/ DeForest | 1.2414 | Sp #91<br>2 rpm = 35,200<br>20 rpm = 5,550<br>pH = 5.90 | Sp #92<br>2 rpm = 149,600<br>20 rpm = 18,160<br>pH = 5.89 | Sp #93<br>2 rpm = 235,500<br>20 rpm = 27,950<br>pH = 5.85 | Sp #93<br>2 rpm = 337,000<br>20 rpm = 29,550<br>pH = 5.73 | Sp #93<br>2 rpm = 442,500<br>20 rpm = 35,150<br>pH = 5.66 | poor pumpability |
| #22) ChemWet 75/ BYK | 1.2415 | Sp #91<br>2 rpm = 23,400<br>20 rpm = 4,290<br>pH = 5.95 | Sp #91<br>2 rpm = 55,900<br>20 rpm = 9,210<br>pH = 5.90 | Sp #92<br>2 rpm = 85,400<br>20 rpm = 11,060<br>pH = 5.79 | Sp #92<br>2 rpm = 123,800<br>20 rpm = 15,440<br>pH = 5.74 | Sp #93<br>2 rpm = 221,500<br>20 rpm = 21,750<br>pH = 5.72 | fair pumpability |
| Experiments with Ethoxylated Phosphate Ester Surfactants | | | | | | | |
| #23) Ethfac 140/Ethox Chemical | 1.2301 | Sp #91<br>2 rpm = 19,000<br>20 rpm = 3,640<br>pH = 5.88 | Sp #92<br>2 rpm = 62,800<br>20 rpm = 10,400<br>pH = 5.89 | Sp #92<br>2 rpm = 76,800<br>20 rpm = 12,120<br>pH = 5.83 | Sp #93<br>2 rpm = 148,000<br>20 rpm = 20,150<br>pH = 5.74 | Sp #93<br>2 rpm = 172,000<br>20 rpm = 20,700<br>pH = 5.63 | manageable process viscosity & pumpable after aging |
| #24) Ethfac 161/Ethox Chemical | 1.2159 | Sp #91<br>2 rpm = 27,500<br>20 rpm = 4,770<br>pH = 5.87 | Sp #92<br>2 rpm = 92,800<br>20 rpm = 11,900<br>pH = 5.89 | Sp #92<br>2 rpm = 138,000<br>20 rpm = 15,220<br>pH = 5.80 | Sp #93<br>2 rpm = 281,000<br>20 rpm = 27,250<br>pH = 5.73 | Sp #93<br>2 rpm = 233,500<br>20 rpm = 34,900<br>pH = 5.64 | fair pumpability |

Note:
[a]All boric acid dispersions were produced using TG boric acid powder and high-shear mixing conditions in accordance with the dispersion process outlined above. Variable being explored in these dispersion experiments was the specific surfactant or dispersant chemistry employed. All test batches were produced at a KOH/BA mole ratio of 0.004355.
[b]All boric acid dispersions were subsequently aged and retested at 25 ± 1° C. Brookfield Viscosities were measured using a Brookfield RVDVE Heliopath Viscometer Unit equipped with T-spindles run at 2 rpm and then 20 rpm; T-spindles A (#91) through F (#96) were employed as required.
[c]Specific gravities were determined using a 100 ml specific gravity cup in accordance with ASTM D1475.

The initial static and dynamic viscosity of each test batch was determined and if the resultant boric acid dispersion was viable, it was subsequently viscosity tracked as it aged over a three (3) week time period. All dispersion test batches were aged and subsequently retested at 25±1° C. Viscosities were measured at 2 rpm and 20 rpm using a Brookfield RVDVE Heliopath Viscometer unit equipped with T-Spindles. Brookfield measurements run at 2 rpm with a T-spindle are indicative of the overall stability and pumpability of the boric acid dispersion and are characterized as a static viscosity. An initial Brookfield 2 rpm static viscosity of 5,000-25,000 centipoise is needed in order to keep the dispersed boric acid particles well suspended in the dispersion over time. A 3-week aged Brookfield 2 rpm static viscosity that is less than 250,000 centipoise is needed in order to insure that the thixotropic gel that forms on standing can be readily broken down by the applied suction from a positive displacement transfer pump and consequently transformed into a flowable fluid that can be pumped out from storage totes or tanker truckers.

The Brookfield measurements run at 20 rpm are more indicative of a dynamic viscosity value that is useful information in discerning the pump size that is required to provide a required flow rate of a boric acid dispersion as it is being pumped. Furthermore, a Brookfield at 20 rpm dynamic viscosity less than 5,000 centipoise is preferred from the standpoint of having a boric acid dispersion that can be readily injected into wood fiber streams or spray applied onto wood chips or flakes. It should be noted here that boric acid dispersions exhibit thixotropic rheological behavior so when static aged samples are subsequently re-agitated or pumped they will revert back to their initial viscosity values and upon standing they will gradually increase in viscosity again in a similar manner and to a similar maximum viscosity.

The ideal target Brookfield viscosities arising from the boric acid dispersion process at 60% solids are as follows:

An initial Brookfield 2 rpm static viscosity of about 10,000-20,000 centipoise
  This process viscosity is high enough to impart sufficient mechanical work through mixing shear into the makedown batch to help attrition down the particle size of the boric acid particles to yield a fine particle size dispersion having a median particle size value of about 10-30 microns. Producing a finer particle size distribution is desirable in terms of enhancing the fire retardant properties of the boric acid product to be utilized in various engineered wood related applications.
  This process viscosity is also high enough that it inhibits the settling of the suspended boric acid particles during the subsequent aging period.
  This process viscosity is low enough that good mixing can be achieved throughout the dispersion process.
A three week aged Brookfield 2 rpm static viscosity less than about 200,000 centipoise
  This aged static viscosity limit is important in terms of maintaining the pumpability of the finished product after transport to customers via totes or tanker trucks.
An initial or re-agitated Brookfield 20 rpm dynamic viscosity less than about 5,000 centipoise
  A Brookfield 20 rpm dynamic viscosity less than 5,000 centipoise is important from the standpoint of having a boric acid dispersion that can be readily injected into wood fiber streams or spray applied onto wood chips or flakes.

Based on these Brookfield viscosity and suspension stability criteria, dispersion Expt. #1 using the Tomamine Q-C-15 additive yielded the most desirable results. Tomamine Q-C-15 is a cationic surfactant consisting of an ethoxylated quaternary amine. The degree of ethoxylation present in this kind of an ethoxylated quaternary amine is important as other cationic surfactants in the same family but having a lower EO content were not as effective. Other alternative surfactants that showed good results were ChemWet 75 (an anionic surfactant consisting of sodium dioctyl sulfosuccinate per dispersion Expt. #22), Tomamine E-14-5 (an ethoxylated fatty amine per dispersion Expt. #5) and Ethfac 140 (an ethoxylated Phosphate Ester chemistry per dispersion Expt. #23).

These three alternative surfactants yielded results that were close enough to hitting the viscosity targets that some minor adjustments in the dispersion recipe amounts (added surfactants and xanthan gum) should enable viable formulations to be developed. However, it should be emphasized that keeping the amounts of added surfactants and xanthan gum as low as possible is desirable since they are materials that will burn. The process additives exhibiting superior viscosity reduction and stability characteristics for the dispersion in this experimentation were all surfactants rather than traditional polymeric dispersants. In the high-shear mixing process, it was found that certain classes of surfactants were more effective in reducing the viscosity and stabilizing the boric acid dispersion as it aged. One preferred overall compositional recipe associated with the most preferred boric acid dispersion arising from Expt. #1 is summarized in Table 1D.

TABLE 1D

Composition of Fine Particle Size Boric Acid Dispersion (per Expt. #1 above)

| Chemical Component | Batch Wt. Amount, g | Wt. % in Formulation |
| --- | --- | --- |
| Deionized Water | 649.15 | 39.34 |
| Boric Acid TG Powder | 986.18 | 59.76 |
| 45% KOH | 8.66 | 0.52 |
| Tomamine Q-C-15[c] | 1.97 | 0.12 |
| Surfynol 440[a] | 2.17 | 0.13 |
| Xanthan Gum[b] | 2.17 | 0.13 |
| Total = | 1650.30 | 100.00 |

Note:
[a]Surfynol 440 (Evonik); Gemini type Nonionic Surfactant having a HLB value = 8.0; functions as low-foaming dynamic wetting agent.
[b]Xanthan gum (100% –60 mesh grade yielding 1% KCl Viscosity = 1,200-1,600 cPs); it functions as a pigment suspension aide and helps stick boric acid particles to wood chips or fiber.
[c]The cationic surfactant helps to lower batch viscosity and stabilize the boric acid dispersion.

The viscosity reducing agent of the invention is an important aspect of the inventive boric acid dispersion. The boric acid dispersion requires an effective amount of this viscosity reducing agent for a number of reasons. One is to control the process viscosity of the dispersion when being made. The slurry that is subjected to the high shearing mixing process needs to be thick enough so that attritioning of the boric acid particles occurs. If the slurry is too thin, sufficient attrition would not occur and the desired final particle size would not be attained. In addition, the dispersion would not have the desired stability or improved functionality when used as a fire retardant in wood product manufacture.

The viscosity reducing agent also provides sufficient body to the fluid to keep the boric acid particles suspended during the attrition phase of making the dispersion.

Therefore, the viscosity reducing agent should be one that is used in an effective amount so as to provide an initial Brookfield 2 rpm static viscosity of 5,000 to 25,000 centipoise of the thus-made boric acid dispersion, as measured in the experiments described above, i.e., Brookfield RVDVE Heliopath Viscometer unit using 2 RPM and T-spindle #91. A more preferred range of initial Brookfield 2 rpm static viscosity would be 10,000 to 20,000 centipoise. In terms of an initial Brookfield 20 rpm dynamic viscosity (again using T-spindle #91) a viscosity value that is less than about 5,000 centipoise is desirable for the boric acid dispersion in order to insure it can be readily applied to wood raw material sources via injection or spray application. This 20 rpm dynamic viscosity guideline also applies to aged dispersions of boric acid that have been re-agitated prior to use. Re-agitation of the boric acid dispersion reverses its viscosity properties back to those seen upon initial manufacture. In other words, after a boric acid dispersion has been stored for a period of time, it is preferred that it exhibit a 20 rpm dynamic viscosity of less than 5,000 centipoise when re-agitated so that it can be readily used in spraying or injecting applications for wood product manufacture.

The measurement of the Brookfield 2 rpm static viscosity over time is also an important aspect of the inventive boric acid dispersion. This measure of aged static viscosity is an indication of the stability and pumpability of the dispersion over time. Having this stability is important because the stability allows the boric acid dispersion to be transported in totes or tank trucks to a manufacturing facility that would use the boric acid dispersion when making engineered wood products. As such, the viscosity reducing agent should be used in an amount that would be effective so that after up to three weeks of time, the aged Brookfield 2 rpm static viscosity of the dispersion should be 250,000 centipoise or less, and more preferably 200,000 centipoise or less.

After the boric acid dispersion is made and a period of time elapses, the dispersion takes on the characteristics of a thixotropic gel. Thus, once the dispersion is then transported to a manufacturing facility for end application use, the dispersion can be agitated and, by shear thinning as a result of the agitation, the dispersion reverts to a viscosity like its initial viscosity which can then be easily pumped or metered into a manufacturing process, e.g., a spraying impregnation. In many instances, the act of pumping the aged dispersion can by itself also provide enough shear to revert the dispersion's viscosity to an initial like viscosity value so long as the positive displacement pump has enough suction to break the gel and begin moving the fluidized material through the delivery system. For purposes of injection or spray application the reverted Brookfield 20 rpm dynamic viscosity should have a viscosity value less than 5,000 centipoise. Again, the stability of the boric acid dispersion over an extended period of time makes the dispersion an ideal candidate to be made at a facility remote from wood product manufacturing facility and shipped to the wood product manufacturing facility for use.

While the measure of the effective amount of the viscosity reducing agent is determined by the initial and aged static viscosity and optionally the dynamic viscosity of the thus-produced boric acid dispersion, the range in terms of the weight percent of the formulation is 0.01 to 1.0%, with a preferred range of 0.05 to 0.20%.

The inventive boric acid dispersions exhibit thixotropic rheology properties which are unique and important characteristics of the dispersions. Their thixotropic properties are critical to their ability to be supplied in a stable form where good pigment suspension is achieved. In addition, the ability of the thixotropic gel produced under static aging conditions to be easily reverted back to a flowable fluid when exposed to shear forces (such as those applied from mechanical stirrers or through the mechanical action of pumps) is also equally important to its end-use utility. Thixotropic behavior can be easily quantified by means of determining a fluid's Thixotropic Index (TI) value. One way a TI value can be determined is by dividing two Brookfield viscosity readings that are recorded at least a factor of 10× apart in shear rate. So, for a given dispersion dividing its Brookfield 2 rpm viscosity value by its Brookfield 20 rpm viscosity value yields a representative TI value that can be compared with the calculated TI value of another dispersion to assess their comparative thixotropic nature on a relative basis. The greater the calculated TI value is the more thixotropic the dispersion is; hence the observance of a high TI value is typically associated with the formation of gels. In the case of the preferred boric acid dispersions, the dispersion experiments #1, #5, #22 and #23 (as listed in Table 1C) are illustrative of the concept when utilizing their reported 2 rpm and 20 rpm viscosity data to calculate the respective TI values by the equation TI value=(BF 2 rpm)/(BF 20 rpm). Hence, using their initial Brookfield viscosity data for calculation purposes, these four dispersion experiments exhibited initial TI values of 4.72, 5.16, 5.45 and 5.22, respectively. Similarly, based on using their 3-week aged Brookfield viscosity data, the four dispersions exhibited aged TI values of 7.91, 10.82, 10.18 and 8.31, respectively. So, in each case, the boric acid dispersions exhibited an initial TI value of intermediate magnitude in the range of 4.0-6.0 and were then observed to subsequently increase in TI value over time; however, each dispersion eventually plateaued off at an aged TI value falling into a range from about 7.0-11.5. Aged TI values of 7.0-11.5 are reflective of gels having been formed during the static aging of the boric acid dispersion.

It should also be noted that the formation of too much thixotropy upon aging, as reflected by a TI value of greater than 11.5 is not desirable for the dispersions as the resultant gel so forming can have a Yield Point so high that the gel cannot be easily broken down by the suction applied by various positive displacement pumps. The inability to transform the material into a flowable fluid with a pump alone can be problematic at certain customer locations where there is no ability to re-agitate the delivered product via mechanical stirrers. So, in terms of pumpability after aging the boric acid dispersions should have a Brookfield 2 rpm viscosity less than 250,000 centipoise and also be gels having a TI value less than or equal to 11.5. Illustrative examples of boric acid dispersions having problematic pumpability issues are dispersion experiments #20 and #21 in Table 1C. In both instances, the 3-week aged Brookfield 2 rpm viscosity value was greater than 250,000 centipoise (their reported readings were 462,500 and 442,500 centipoise, respectively) and they in addition both exhibited a TI value greater than 11.5 (their calculated TI values being 12.28 and 12.59, respectively). Therefore, the boric acid dispersions produced from dispersion experiments #20 and #21 do not meet the requirements for the intended end-use fire retardant application.

Given the measurement of 2 rpm and 20 rpm Brookfield viscosities and their relationship to one another in defining a TI value for the dispersions, it is important to understand why these specific measurements are being made. The Brookfield 2 rpm measurement is being made to determine the viscosity of the dispersion under essentially "static conditions" where a very low shear force is being applied. This low 2 rpm reading is particularly important when measuring the viscosity of the gels formed from aging under static conditions as it is essentially a measure of the gel's viscosity. In rheology terminology, the term kinematic viscosity is also used to define the measurement of a fluid's inherent resistance to flow when no external force, other than gravity, is acting on it. In contrast, the higher shear Brookfield 20 rpm measurement is measuring essentially a dynamic viscosity value. Dynamic viscosity is defined as the measurement of a fluid's resistance to flow when an external force is being applied. In the case when 20 rpm is used, the dynamic viscosity of the dispersion product is being measured in its flowable state as opposed to the viscosity reading at 2 rpm whereby the product is being measured in its non-flowing "static" gel state. Readings at both shear rates are consequently needed in order to better understand the overall rheological properties of the inventive boric acid dispersions.

The experiments above show that there are four kinds of general surfactants that are believed to provide the target viscosities, i.e., a cationic type surfactant, an ethoxylated amine surfactant, a nonionic, anionic or amphoteric surfactant, and an ethoxylated phosphate ester. The experiments also show that among the listing of these surfactants, certain surfactants are even more preferred, i.e., a coco poly (15) oxyethylene methyl ammonium chloride, poly (5) oxyethylene isodecyloxypropylamine, butanedioic acid, 2-sulfo-, 1,4-bis(2-ethylhexyl) ester, sodium salt, and an oleyl 4(EO) phosphate ester.

The aqueous boric acid dispersions are heterogeneous systems in that a small portion of the boric acid is present in solution and the remainder is present as suspended solid particles. The viscosity reducing agent also possibly functions as a crystal growth inhibitor once the dispersion is made. It is known that with suspended boric acid particles, partial dissolution can occur and this dissolution can subsequently lead to recrystallization thereby producing larger particles and the formation of such larger particles can adversely affect the particle size distribution and stability properties of the dispersion. This crystal growth process in heterogeneous systems is a colloidal phenomenon known as Oswald Ripening. The viscosity reducing agent of the invention acts to inhibit this crystal growth over time, thus leaving the dispersion in a state where, after a prolonged period of time, the boric acid particles will not recrystallize into larger particles that become more difficult to suspend and consequently prevents the dispersion from being easily pumped or metered when used in a wood product manufacturing application. An increase in the boric acid dispersion's particle size over time is also not desirable from a fire retardant performance standpoint.

While one viscosity reducing agent is exemplified in the making of the dispersion, a combination of agents could be used if so desired.

As noted above, the boric acid dispersion can also include an optional addition of xanthan gum and a surfactant to improve the wetting of the gum when used during the dispersion high shearing making method. A preferred range of the xanthan gum on a weight basis of the total dispersion would be 0.01 to 0.25 wt. %, with a preferred range of 0.05 to 0.20%. Similar addition ranges would apply for the low-foaming surfactant used with the xanthan gum. The preferred type of surfactant for this purpose is a nonionic surfactant of intermediate HLB value, e.g., an HLB range of 6-14. A particularly useful low foaming nonionic surfactant is Surfynol 440 which chemically is an ethoxylated 2,4,7, 9-tetramethyl 5 decyn-4,7 dial and has a reported HLB value of 8.0.

As described above, the alkali metal base is also an optional additive when making the boric acid dispersion. When used, the base to boric acid mole ratio amount should be greater than zero and less than 0.01. The presence of the alkali base does affect the pH of the boric acid dispersion. The pH should range between about 4.0 and 6.0. Having the alkali base present in the boric acid dispersion also improves the shelf life of the dispersion. When the alkali metal base is used in the mole ratio amount of 0.004355, the pH of the subsequent dispersion is about 5.5 to 6.0. Without the alkali metal base, the pH of the dispersion is about 4.0 to 4.6.

The alkali metal base should not be present in too large of an amount as this can result in a conversion of the boric acid to a borate and this then creates problems in terms of the stability of the dispersion.

A comparison study was made using a low shear mixing process such as that taught in the Dietrich patent. This study used different alkali bases, e.g., NaOH or KOH, different types of boric acid particles, e.g., granular or powder, different alkali base/boric acid active basis ratios, and no viscosity reducing agent. These low-shear mix dispersion experiments without the use of a viscosity reducing agent were carried out in order to comparatively demonstrate the differences in viscosity and stability obtained as compared to the results where the viscosity reducing agent was used, see the process of Expt. #1. The low-shear mixing process of the prior art and variations thereof do not yield stable, high solids boric acid dispersions that lend themselves to being stored without mixing or being shipped long distances in totes or tanker trucks.

In addition, the finished particle size arising from the prior art low-shear dispersion method is much larger in size which accordingly yields a lower level of fire retardant performance as will be demonstrated in subsequent examples below.

Additional experiments were conducted comparing the effect of using borates instead of boric acid as the starting material when making the dispersion, and the effect of the use of KOH. The results of this dispersion study are shown in Table 2A below. Another study was conducted using a different processing scheme to make the dispersion and the results of this study are shown in Table 2B.

In Table 2A, the first two experiments (Expts. #25 and #26) listed therein summarize the results from a pair of boric acid dispersions produced under high-shear mixing conditions (analogous to the process scheme described above) but made without the use of any surfactant to aide dispersion of the boric acid and help reduce its process viscosity. Expt. #25 employed no KOH or surfactant during the high-shear dispersion while Expt. #26 employed only KOH at a KOH/BA mole ratio of 0.004355. Neither of these boric acid dispersion efforts yielded an acceptable slurry product and this experiment clearly illustrates the importance of using a small quantity of an appropriate surfactant to reduce the process viscosity.

In Table 2A, the dispersion Expts. #27 and #28 show that the preferred surfactant additive from Experiment #1, namely Tomamine Q-C-15, provides no real processing benefit in terms of yielding stable, high solids dispersions of acceptable viscosity when attempting to high-shear disperse various sodium borates such as disodium tetraborate pentahydrate or disodium octaborate tetrahydrate. This test finding also implies that the viscosity reduction benefits seen with Tomamine Q-C-15 when producing boric acid dispersions under high-shear mixing conditions are truly unexpected and are not universal to all boron-based flame retardant additives like the tested borates. Thus, it is preferred to limit the amount of borates added to or formed "in situ" in the inventive boric acid dispersions to very small quantities ranging from 0, on a borate/boric acid mole ratio basis, to about 0.00145 on a borate/boric acid mole ratio basis. A low inconsequential amount of borates can be present in a boric acid dispersion so long as the target solids, particle size target, and viscosity targets are not altered. For example, in Expt. #1 per Table 1C a fine particle dispersion of boric acid is produced using a small amount of KOH reagent to adjust the final pH of the dispersion. The KOH/Boric Acid mole ratio employed in this dispersion was 0.004355. This small KOH addition therefore results in the "in situ" formation of tripotassium borate ($K_3BO_3$) in an amount equaling about 0.001452 on a borate/boric acid mole ratio basis. On the other hand, in Expt. #29 (per Tables 2A, 2B & 2C) no KOH reagent was employed in the dispersion process for boric acid. So long as the viscosity reducing agent Tomamine Q-C-15 is employed in the dispersion process a viable boric acid dispersion product can be produced without the use of KOH. Since Expt. #29 employs no KOH, then no borates are present in the boric acid dispersion.

that the addition of the alkali base is not necessarily required to produce a high solids content boric acid dispersion that

TABLE 2A

Test Data on Comparative High-Shear Dispersions of Boric Acid versus Na Borates

| Expt.[b,c] | Boric Acid or Na Borate Chemistry Used[a] | KOH/BA "active basis" mole ratio | Target Solids, Wt. % | Surfactant System Employed | Test Batch pH @ Finished Batch Run Temp. | Test Batch Initial BF Visc. (Sp# @ 2 rpm)[d], cPs | Test Batch Initial BF Visc. (Sp# @ 20 rpm)[d], cPs | comments & observations |
|---|---|---|---|---|---|---|---|---|
| #25 | TG Boric Acid Powder | 0.0000 No KOH used | 60.0 | None | 4.28 @ 18° C. | 810,000 | 41,800 | boric acid particle settling started immediately |
| #26 | TG Boric Acid Powder | 0.004355 | 60.0 | None | 6.01 @ 18° C. | 577,000 | 29,400 | boric acid particle settling started immediately |
| #27 | Borax Pentahydrate | 0.0000 No KOH used | 60.0 | Tomamine Q-C-15 + Surfynol 440 | 9.53 @ 47° C. | 1,733,000 | 230,500 | formed firm semi-solid mass |
| #28 | Polybor | 0.0000 No KOH used | 60.0 | Tomamine Q-C-15 + Surfynol 440 | 7.71 @ 28° C. | 13,100 | 3,660 | completely solidified into hard solid mass within 30 min. |
| #29 | TG Boric Acid Powder | 0.0000 No KOH used | 60.0 | Tomamine Q-C-15 + Surfynol 440 | 4.30 @ 21° C. | 8,700 | 1,900 | sample set up for tracking; see table 3b |

Notes:
[a]borax pentahydrate = disodium tetraborate pentahydrate ($Na_2B_4O_7 \cdot 5H_2O$); polybor = disodium octaborate tetrahydrate ($Na_2B_8O_{13} \cdot 4H_2O$).
[b]The high-shear dispersions for Expts. #25-#28 were carried out in a manner analogous to Process Scheme #1 except variations in the use of KOH, use of surfactant or use of a Na Borate instead of boric acid were employed (as noted) to generate the test matrix. Whenever KOH was employed (as in Expt. #26) 45% active KOH reagent was used in the process.
[c]The high-shear dispersion for Expt. #29 was carried out via a process scheme whereby no KOH was employed and the Tomamine Q-C-15 cationic surfactant was added in periodic increments during the dispersion run rather than at the end of the process.
[d]All Brookfield viscosities were measured using a Brookfield RVDVE Heliopath Viscometer Unit equipped with T-spindles run at 2 rpm and then 20 rpm; T-spindles A (#91) through F (#96) were employed as required. All Brookfield viscosity measurements were measured at 25° C.

As discussed above, Expt. #29 in Table 2A shows the effect of high-shear dispersing boric acid with only Tomamine Q-C-15 surfactant (no KOH is employed). The make-down procedure associated with dispersion Expt. #29 is therefore different than that of the process scheme described above for dispersion Expt. #1. The difference in the process scheme for Expt. #29 was that no KOH was employed in the process and some of the Tomamine Q-C-15 surfactant had to be intermittently added in place of the alkali metal base to keep the dispersion fluid. The compositional recipe for dispersion Expt. #29 is shown in Table 2B. Expt. #29 contrasts with Expt. #26, where KOH was used but no surfactant was used and contrasts with Expt. #25 where no KOH and no surfactant were used in the boric acid dispersion process. The initial Brookfield 2 rpm static viscosity obtained via this modified high-shear dispersion process, whereby no KOH was used, is actually lower than that obtained in Expt. #1 via the process scheme described above where small intermittent amounts of KOH were added. Subsequent aging of this dispersion also showed promise (see tracking results in Table 2C) but it yielded a slight amount of clear syneresis after 2 weeks. However, the formula for this no KOH, high-shear dispersion can undoubtedly be tweaked to better optimize its viscosity properties. For example, small adjustments in the amount of Tomamine Q-C-15 and xanthan gum used in the formula can readily accomplish this task. What Table 2C demonstrates is has adequate stability characteristics and can be transported in bulk for fire retardant use in wood product making applications.

TABLE 2B

Composition of Fine Particle Size Boric Acid Dispersion (per Expt. #29 and alternative process scheme)

| Chemical Component | Batch Wt. Amount, g | Wt. % in Formulation |
|---|---|---|
| Deionized Water | 649.15 | 39.543 |
| Boric Acid TG Powder | 986.18 | 60.073 |
| Tomamine Q-C-15[c] | 1.97 | 0.120 |
| Surfynol 440[a] | 2.17 | 0.132 |
| Xanthan Gum[b] | 2.17 | 0.132 |
| Total = | 1641.64 | 100.000 |

Note:
[a]Surfynol 440 (Evonik); Gemini type Nonionic Surfactant having HLB value = 8.0; functions as low-foaming dynamic wetting agent.
[b]Xanthan gum (100% −60 mesh grade yielding 1% KCl Viscosity = 1,200-1,600 cPs); functions as a pigment suspension aide and helps stick boric acid particles to wood chips or fiber.
[c]The cationic surfactant that helps to lower batch viscosity and stabilize the boric acid dispersion.

TABLE 2C pH & Viscosity Tracking[a] of Boric Acid Dispersion (Expt. #29 made by alternate process scheme using no KOH)

| Expt. | Batch Specific Gravity, g/ml | Initial pH & BF Visc., cPs | Aged pH & BF Visc.[a], cPs (after 3 days) | Aged pH & BF Visc.[a], cPs (after 1 week) | Aged pH & BF Visc.[a], cPs (after 2 weeks) | comments upon aging |
|---|---|---|---|---|---|---|
| #29 (from Table 2A) | 1.1820 | Sp #91<br>2 rpm = 8,700<br>20 rpm = 1,900<br>pH = 4.30 | Sp #91<br>2 rpm = 44,900<br>20 rpm = 7,620<br>pH = 4.09 | Sp #92<br>2 rpm = 131,400<br>20 rpm = 13,320<br>pH = 4.26 | Sp #92<br>2 rpm = 160,800<br>20 rpm = 17,360<br>pH = 4.17 | slight syneresis observed after 2 weeks |

Notes:
[a]Boric acid dispersion batch (Expt. #29) was aged and periodically retested at 25 ± 1° C. All Brookfield Viscosities were measured using a Brookfield RVDVE Heliopath Viscometer Unit equipped with T-spindles run at 2 rpm and then 20 rpm; T-spindles A (#91) through F (#96) were employed as required. All Brookfield viscosity measurements were measured at 25° C.

In summary, given the use of one or more of the preferred viscosity reducing surfactants while employing a process scheme that uses or does not use KOH, the data in Tables 2A-2C demonstrate that fine particle size boric acid dispersions can be readily produced which can exhibit a finished pH of 4.0-6.0 depending on the amount of alkali metal base, such as KOH, that is employed in the high-shear dispersion process. The amount of active basis KOH suitably employed in the boric acid dispersions can range from an alkali metal base/boric acid mole ratio from zero to about 0.01 whereby a molar ratio of about 0.004 is particularly useful.

In connection with the fire retardant properties of the boric acid dispersion, experiments were conducted to assess the performance of the boric acid dispersion in different engineered wood related applications where fire retardancy is measured. A first experiment involved making OSB test panels and measuring flame spread for the panels.

In this experiment, a 6 inch by 12 inch wood test panel specimen (rather than the 6 inch×18 inch dimension specified in the standard radiant panel ASTM E162 protocol) was mounted within a metal specimen holder then inclined at an angle of 30° while facing toward a vertical radiant heat source panel. The upper 6 inch wide edge of the specimen is located 4¾ inches from the radiant heat panel. The radiant heat panel consists of porous, refracting material mounted within a cast-iron frame, 10 inch by 19 inch in overall dimensions, and heated by a gas-air mixture. The radiant heat panel is supplied by a 32,000 BTU propane fueled system equipped with a gas flow controller and regulating valves to facilitate its operation at a radiant temperature of 1238° F. (670° C.).

An exhaust stack and hood, located above the wood specimen, collect and exhaust the products of combustion. The exhaust stack is used for internal mounting of eight thermocouples which collectively measure the average temperature of the combustion gases being produced. A small pilot burner of ⅛-inch stainless steel tubing (³⁄₁₆ inch OD) is located horizontally so that a 2-3 inch flame of gas, premixed with air, will emit from the burner tip near the top edge of the wood test panel specimen.

For the surface flammability test, the gas-air mixture is passed through the radiant panel and burned for 15 minutes, then adjusted to maintain a heat output equivalent to a black body at a temperature of 1238° F.±7 (670° C.±4) as measured by a radiation pyrometer. The hood's blower is adjusted to produce a velocity of 250 ft./min. at the top of the stack when the radiant panel is at its standard operating temperature. The pilot burner is ignited, adjusted to give a 2-3 inch flame, and positioned in front of the radiant panel so as to be within ½ inch of touching the center top edge of the test panel when placed in test position. The test panel within the specimen frame is then moved into exposure position. The specimen is exposed to the radiant heat and pilot flame for 11 minutes or until the flame front has progressed down the wood test panel 11 inches (whichever comes first). The time for the flame front to progress every 1 inch on the face of the specimen and the maximum temperature rise of the stack thermocouples are recorded.

In preparing test panels for surface flammability tests using the above radiant heat source apparatus, all the 6 inch by 12 inch wood panels are first conditioned by allowing them to sit in a mechanical forced air oven at 60° C. for 24 hours. This drying step is then followed by a one hour cooling period enclosed in a Ziploc plastic bag to ensure consistent moisture content amongst the panels prior to their comparative evaluation.

Figure 3:
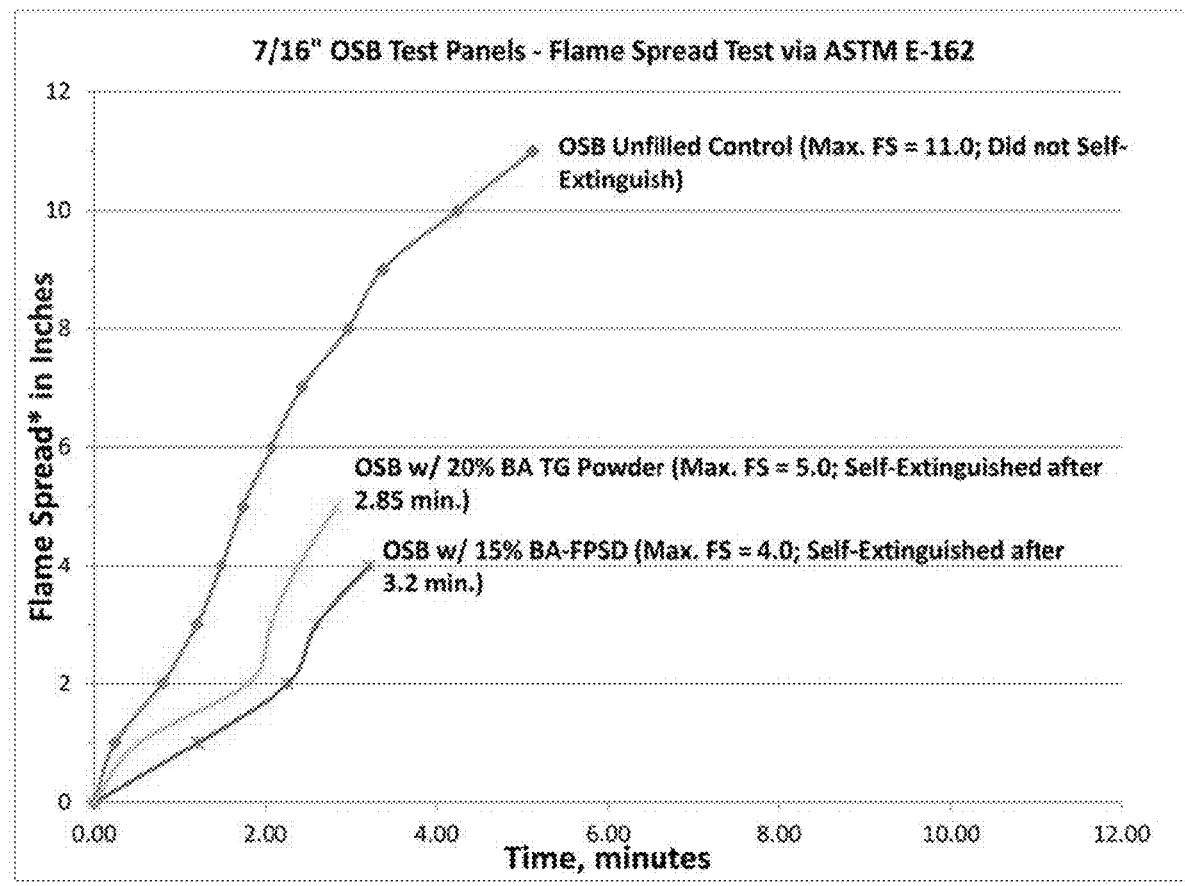
FIG. 3 is a graph showing comparative flame spread data on OSB for a boric acid technical grade powder vs. a boric acid dispersion.

In the testing below, a standard ⁷⁄₁₆" thick OSB wood panel using Southern Yellow Pine (SYP) wood flakes was produced using standard commercial operating conditions known in the industry. The OSB panels were produced using a 5% addition of pMDI (Covestro's Mondur 541-Light) as the adhesive. The boric acid TG Powder (at a 20% loading in the board) was dry blended with the wood flakes plus pMDI adhesive prior to being formed into a mat and pressed. In the case of using the inventive fine particle size boric acid dispersion (60% solids with a composition in accordance with Expt. #1), the dispersion was spray applied onto the SYP wood flakes in the blender unit containing wood flakes plus pMDI adhesive so as to ultimately yield a 15% by wt. loading of active basis boric acid in the finished OSB panel on a dry wood weight basis. The surface flammability test results for these OSB panels are shown in FIG. 3. The OSB panel using the inventive dispersion, designated as BA-FPSD, exhibited a shorter flame spread distance even at a lower loading level and its flame self-extinguished after 3.2 minutes. It should be noted that for FIG. 3, the maximum flame spread is measured after a 11 minute test burn period or stopped after reaching the 11 inch mark or recorded at the point of self-extinguishment of the flame (whichever event comes first). What FIG. 3 shows is an unexpected result in that the loading of the OSB panel with only 15% boric acid (originating from the high-shear dispersion process) yielded better fire retardancy properties than a product with more boric acid, i.e., 20% loading of dry TG powder. The lower amount of boric acid is also significant as this means that the wood product weighs less but has at least equivalent fire retardancy properties. The lowering of the boric acid amount is also important as excessive use of fire retardant additives like boric acid in the wood product can compromise the strength and structural integrity of the wood product so using less boric acid assists the manufacturer of the wood product in meeting the strength and structural standards for the wood product's end-use application.

The fine particle boric acid dispersion can also be used as the principal pigment component or as a co-pigment additive in a waterborne coating formulation that is designed to improve the fire retardancy of a wood product or other material. The following shows an example of a coating formulation using the boric acid dispersion and a waterborne binder to yield a fire retardant coating formulation that is applied to an engineered wood substrate to produce a coated wood product having improved flame spread properties. Such fire retardant coatings can also be utilized to coat other types of wood such as dimensional lumber.

Fire retardant coating formulations were respectively produced by combining the boric acid dispersions with a chemically compatible waterborne organic binder. The boric acid particles function as both a pigment and as a fire retardant additive in the coating formulation. The waterborne organic binder is polymeric and used in an effective amount to assist in at least binding the boric acid particles of the boric acid dispersion to the wood product being coated; however, the binder can also affect other coating film properties such as its flexibility and durability, the coating's ability to be nailed without cracking, its water and weather resistance properties and the like.

One example of an organic binder that can be successfully employed with the boric acid dispersion is an EVCL (ethylene/vinyl chloride copolymer) based polymer dispersion. This kind of binder is available commercially under the tradename Vinnol 4514 (manufactured by Wacker Polymers) and it is believed to be particularly suitable for this application as it exhibits the following properties.

The polymeric coating binder has a relatively neutral pH (hence better pH compatibility with the boric acid dispersions than binders having a high pH);

The polymeric coating binder itself has some fire resistance properties (due to its vinyl chloride content) which provides an additional performance benefit;

The polymeric coating binder has a low minimum film formation temp (MFFT). A MFFT≤25° C. is particularly advantageous in this application because that means you can largely avoid the use of any coalescent solvents in the coating formulation and this allows one to keep the VOC level low which is viewed as a big positive in an engineered wood mill facility whose emissions are closely monitored.

The polymeric coating binder has a low glass transition (Tg) temperature. The Tg for the Vinnol 4514 is reported to be 12° C. Having a Tg value ≤25° C. is particularly desirable in this application because that means the coating film will be tough but flexible. Since the coating will be applied to an engineered wood panel that may be nailed in subsequent construction use (such as panels of OSB), the applied coating needs to be flexible enough that nailing the panel does not crack or chip off the applied fire retardant coating.

It should be noted that Vinnol 4514 is one illustrative example of a useful polymeric binder but other binder chemistries could also be used with the inventive boric acid dispersion with good success so long as they generally meet the pH compatibility, MFFT and Tg property requirements outlined above. It should also be understood that the coating formulation using the waterborne binder and fine particle boric acid dispersion can use other ingredients as would be known in the art for waterborne coating formations. These other ingredients can include various mineral pigments, $TiO_2$ pigment, colorants, thickeners, surfactants, dispersing agents, preservatives, defoamers, solvent, blowing-agents (e.g., melamine or urea), char forming carbonizing additives (e.g., polyols), etc. and they can be used in amounts typically found in coating formations. In particular, the use of blowing-agents and char forming carbonizing additives in the formulation would be directed to a class of waterborne fire retardant coatings commonly known as intumescent coatings. Later examples directed to the production of high actives content boric acid/urea dispersions would then be a useful master batch approach for the formulation of intumescent coatings given the acidic nature of boric acid and the known capability of urea as a blowing agent additive or co-additive.

As previously discussed, intumescent coatings are applied coating films that react to rising heat by expanding to generate a heat-insulating char that slows or even prevents the underlying substrate from reaching a critical temperature (such as the temperature needed to initiate combustion of the wood cellulose). In generalized formulary terms, there are four key ingredients in a water-based intumescent coating formulation:

Acid Donor
Carbon Source (typically a polyol)
Blowing Agent
Binding polymer (typically a vinyl acetate based copolymer)

With regards to these key ingredients the boric acid component of the boric acid dispersion would serve the role or co-role of being an acid donor in an intumescent coating formulation. A commonly known and utilized acid donor for intumescent coatings is ammonium polyphosphate but the use of boric acid in intumescent coatings directed to fire retarding wood substrates is known in the prior art. While the use of boric acid in such coatings is known the boric acid dispersion herein described would represent a novel way of introducing this acid donor additive, available in high solids content liquid form, into waterborne coating formulations. Such boric acid dispersions can therefore serve as the pigment master batch in part or as a whole when formulating waterborne coatings offering fire retardant properties.

As discussed in US 2014/0295164, the use of boric acid changes the pathway that wood and polymeric binders break down during combustion of the wood product. With boric acid use, when the wood and polymers break down, they form more char and fewer combustible gases thus reducing the amount of flames and the heat produced during a fire event. Boric acid also contains bound moisture which is released during a fire event. The release of the moisture reduces temperatures as the water vaporizes and the water vapor dilutes any combustible gases that are generated during the combustion process making it more difficult to form a flammable gas mixture. This reduces flaming combustion, time to ignition, and the amount of heat released as the coating thermally decomposes.

With regards to the boric acid/urea dispersions hereafter described they would represent high % actives content dispersions containing two of the four key ingredients needed to formulate an intumescent coating product. The boric acid portion of the boric acid/urea dispersion would again serve the role or co-role of being an acid donor in an intumescent coating formulation. The urea portion of the boric acid/urea dispersion would thus serve the role as being the blowing agent or at least part of the overall blowing agent package in an intumescent coating formulation. Melamine is one of the most commonly used blowing-agents in intumescent coatings however urea has also been used.

Some representative examples of intumescent coatings employing both boric acid and urea for fire retarding wood substrates are disclosed in the following patents: U.S. Pat. No. 6,425,947 B1 and RU 2198193 C2. While the use of both boric acid and urea in such coatings is known, the boric acid/urea dispersion herein described would represent a novel way of simultaneously introducing this acid donor additive and blowing agent additive, available in a high actives content liquid form, into waterborne coating formulations. Such boric acid/urea dispersions might therefore serve as the pigment master batch in part or as a whole when formulating waterborne coatings offering fire retardant properties.

While a waterborne binder having the properties of being relatively neutral in pH, having a minimum film formation temperature of 25° C. or less, and a glass transition temperature less than 25° C., the water borne binder being about 10-40% by weight of the total coating formulation weight, is described for use with the boric acid dispersion, and exemplified as an ethylene-vinyl chloride based copolymer, this kind of a binder or other kinds of binders can be used with slightly different properties if the boric acid/urea dispersion described below is used as part of an intumescent coating formulation. Relative to a particular water borne binder that is utilized it is common for commercially available binders to be supplied to formulators as dispersions at solids contents of 45-70% by wt., and more typically at 50-65% solids by wt., hence the amount of active basis polymer binder being used can vary somewhat depending on the amount of water borne binder being added to the coating formulation and the binder's corresponding % solids content. U.S. Pat. No. 10,072,163 shows the state of the art of the types of binders that can be used in intumescent coating formulations and this patent is incorporated in its entirety herein for these teachings. A typical example of a waterborne binder for an intumescent coating formulation is an ethylene-vinyl acetate based copolymer. With these kinds of binders, typical pH ranges for the coating formulation are from about 4 to about 9. Thus, the pH range for the waterborne binder can range from 4-9 as this encompasses both exemplified binders described above.

Another coating application for the boric acid dispersion described herein or the boric acid/urea dispersion described below is in the field of cellulosic materials that are in need of improved fire retardancy. Any cellulosic materials that are used in applications where fire retardancy is a requirement or desired are candidates to be coated by the boric acid/urea dispersion of the invention or the boric acid dispersion. Typical cellulosic materials, which may be coated with an amount of the boric acid/urea dispersion or boric acid dispersion and used in structures or the like where fire retardancy is desired, include papers, cardboards, rayons, cottons, shoddy fabrics, natural fibers, synthetic fibers, linens, wood fibers, plant fibers, liner boards, ground newspaper and a mixture of wood fibers and ground newspaper, or combinations thereof. The amount of dispersion applied is an effective amount that provides the desired fire retardancy for the cellulosic material being coated. Examples of coating amounts are discussed below.

While any application process can be used to coat these cellulosic materials, the sprayability of the boric acid-containing dispersions described herein make these dispersions an ideal candidate for spray application to a cellulosic material. One example of an application would be to apply the boric acid/urea or boric acid dispersion to ground newspaper or to a mixture of wood fibers and ground newspaper, and then use this coated mixture for insulation purposes, e.g., blowing the mixture into attics and other spaces/structures where thermal insulation is desired. Depending on the form of the cellulosic material, the coating process may coat the material in its entirety or on a portion that would be less than the entirety but still be enough coverage of the cellulosic material to provide the desired fire retardancy. While the weight percentage of the applied dispersion based on the total weight of the coated cellulosic material may vary depending on the type of cellulosic material, end use application, and level of fire retardancy required, typical percentages using a dry basis content wt. would range from 3% to 24% of the coated cellulosic material. For example, if a boric acid/urea dispersion is used for producing the cellulosic article that is 60/40 (1.5:1 w/w) boric acid/urea, then a 3% target content loading of that dispersion, on an active basis, provides 1.8% BA and 1.2% urea by weight in the finished article. At a 24% total content loading for the same 1.5:1 w/w ratio of boric acid and urea, the boric acid content would be 14.4% and the urea content would be 9.6% by weight in the finished article. This 60/40 (1.5:1) w/w ratio dispersion of boric acid/urea is believed to be an optimum fire retardant product for this particular end use application as it contains a high level of total actives content (78-82% by wt.) and highest relative amount of urea amongst the group of inventive dispersions. However, one skilled in the art will readily recognize that the spray application of the boric acid/urea dispersion or boric acid dispersion onto the cellulose articles can also be used in various combinations with dry powder additives of boric acid and/or sodium borates (e.g., borax pentahydrate, borax decahydrate or DOT) as required to meet the desired fire retardancy and final moisture content properties.

U.S. Pat. No. 8,308,997 discussed above also provides examples of the amounts of boron atom wt. percentages as derived from DOT and urea wt. percentages used on a given material for effective fire retardancy on cellulosic materials and these boron wt. percentages could be used as loading targets when applying the boric acid/urea dispersion or boric acid dispersion on a cellulosic material. For example, in a preferred embodiment disclosed in the '997 patent, the cellulosic article of commerce comprises from about 0.6 wt. % boron to about 2.5 wt. % boron while the urea content therein ranges from 2 wt. % urea to 15 wt. % urea. An article boron content of 0.6 wt. % therefore translates to a boric acid content of 3.43 wt. % while an article boron content of 2.5 wt. % translates to a boric acid content of 14.3 wt. % in the cellulosic article. When utilizing a boric acid/urea dispersion in accordance with the present invention having a 1.5:1 w/w ratio the total wt % content of boric acid plus urea in the cellulosic article would therefore range from 5.72% (3.43% BA+2.29% urea) to 23.8% (14.3% BA+9.53% urea) to deliver the equivalent wt. percentages of boron (0.6-2.5 wt. %) as defined in the '997 patent. Given these content loading guidelines, the boric acid/urea dispersion or boric acid dispersion can therefore be used in place of the DOT/urea materials utilized in the method of coating cellulosic materials as detailed in U.S. Pat. No. 8,308,997. One of the primary advantages in employing the boric acid dispersions or the boric acid/urea dispersions over the prior art DOT/urea solutions of the '997 is the notably higher actives content associated with the aforementioned dispersions which enables higher additive loadings to be achieved while better controlling the total moisture content of the cellulosic article.

Using the boric acid dispersion in cellulosic articles offers another advantage as ammonia gas emissions can create a problem when coating cellulosic materials using urea-containing coating formulations (urea is known to outgas ammonia over time). Since the boric acid dispersion does not include urea but still has excellent sprayability, this dispersion is an ideal candidate for coating a cellulosic material where ammonia gas emission problems are of potential concern.

For the method of applying the effective amount of the boric acid dispersion or boric acid/urea dispersion, since the dispersion would be directly sprayed onto the cellulosic material, similar to the process described herein where the dispersion is sprayed on wood chips or flakes as part of board manufacture, no binder chemistry is involved. Therefore, the dispersion can be sprayed onto the cellulose without the need for a waterborne binder like the coating film applications for wood product surfaces. When spraying just the boric acid dispersion, which is typically 60% solids, a range for application onto cellulosic articles would be 3 to 18% on a dry weight basis, similar to the dry weight basis % used above to describe the application amount range when using a boric acid/urea dispersion. A target application amount of 18% by wt. is also consistent with the teachings disclosed in the CRC Press book publication "Fire Retardancy of Polymeric Materials", $2^{nd}$ Edition, edited by Wilkie, C. A., et. al. CRC Press, 2010, which indicated that a commonly used fire retardant combination has been a 1:1 w/w ratio blend of boric acid and borax pentahydrate at a total loading of 15-18% by weight in cellulose insulation. Again, one skilled in the art will readily recognize that the spray application of the boric acid dispersion onto the cellulose articles can also be used in various combinations with dry powder additives of boric acid and/or sodium borates (e.g., borax pentahydrate, borax decahydrate or DOT) as required to meet the desired fire retardancy and final moisture content properties.

Using the dispersions, either using just boric acid or boric acid/urea, provide a significant advantage over other fire retardant materials used to coat cellulosic materials as the dispersions are easily sprayed and a high solids content of the boric acid or high total actives content of boric acid/urea can be employed for fire retardancy purposes while minimizing the amount of moisture being added back to the cellulose article The following Table 3A shows an example of simplified waterborne coating formulations that were designed to illustrate the fire retardant performance advantages of the fine particle boric acid dispersion when used as the pigment master batch. The Table lists the ingredients for two formulations. One uses a granular boric acid low-shear dispersed in water in accordance with the prior art teachings of Dietrich and the other formulation uses the fine particle size boric acid dispersion herein described in Table 1D.

TABLE 3A

Boric Acid Containing Coating Formulations for Surface Flammability Testing

| Formula ingredient | Coating Expt. 30B using Granular boric acid Disp. | Coating Expt, 30C using BA-FPSD |
|---|---|---|
| DI Water | 15.6 g | 0.0 |
| Granular boric acid disp. Total Solids = 77.4%; BA Content @ 76.4%)[a] | 54.3 g | — |
| Fine particle size boric acid disp. (Expt. #1 having total solids = 60%) | — | 70.0 |
| Xanthan gum[b] | 0.1 g | — |
| Binder (Vinnol 4514 @ 50% solids)[c] | 30.0 g | 30.0 |
| Total = | 100.0 g | 100.0 |
| Coating Properties | | |
| Total solids content, Wt. % | 57.1% | 57.0% |
| Pigment solids content, Wt. % | 42.0% | 42.0% |
| Pigment/binder ratio (active basis w/w ratio) | 2.8:1 | 2.8:1 |

Notes:
[a]Prior art boric acid dispersion was produced from TG granular boric acid in accordance with the procedure used in U.S. Pat. No. 4,801,404.
[b]Xanthan gum (100% −60 mesh grade yielding 1% KCl Viscosity = 1,200-1,600 cPs).
[c]Vinnol 4514 binder (ethylene-vinyl chloride based emulsion polymer from Wacker Polymers).

While coating formulation Expt. #30C used 30% of the waterborne organic binder, a wt. % range of the amount of the waterborne binder in the total coating formulation employing the boric acid dispersion and the waterborne binder can range between about 10 and 45% by wt., and more preferably 20-40% by wt. In terms of the coating thickness, a 6 mil thickness of wet coating was applied to the wood substrate in Expt. #30C however different thicknesses of the fire retardant coating can be used, e.g., from 2-10 mil. Based on the coating formulation's specific gravity (1.171 g/ml) and the 6 mil wet coating film thickness, Expt. #30C was applied at a wet weight of about 16.6 g/ft.$^2$ to the wood substrate. Given the coating formulation's solids content (57.0%) this then translates to about 9.45 g/ft.$^2$ of dry basis coating being applied. For an applied wet film thickness ranging from 2-10 mils this then corresponds to dry basis coating weights of about 3-16 g/ft.$^2$. If any of the optional coating ingredients previously disclosed are utilized in other variations of the formulation, then the % solids content and specific gravity of the coating can change and the applied coating weights will change accordingly.

The waterborne coating formulations from Table 3A were then coated onto panels of a commercial grade particle board (PB) manufactured by Georgia Pacific that was 0.75 inch thick. A 6.0 mil wet film thickness was applied and allowed to air dry overnight. The PB panels were only coated on one side which is the side that was subsequently directed towards the radiant heat source in the surface flammability test. An uncoated PB panel was also tested (Expt. 30A) to serve as a comparative control. The panels were all tested in accordance with the modified radiant panel ASTM E162 test protocol as described above and the results are comparatively summarized in Table 3B.

Review of the flame spread testing results summarized in Table 3B indicates that the PB coating containing the fine particle size dispersion of boric acid (Coated Test Panel 30C) yielded the shortest flame spread value. This flame spread data consequently illustrates the greater fire retardant efficiency of the fine particle dispersion of boric acid as compared to using the prior art boric acid dispersion of Dietrich produced from TG granular boric acid.

TABLE 3B

Flame Spread Determination[a] of Coated Particle Boards[b,c]

| Flame Spread inches | Expt. 30A (Control; Uncoated Std. PB) (min:sec) | Expt. 30B (Std. PB Coated with Granular BA[e]) (min:sec) | Expt. 30C (Std. PB Coated with BA-FPSD[f]) (min:sec) |
|---|---|---|---|
| 1 | 0:10 | 0:48 | 0:45 |
| 2 | 1:23 | 2:15 | 2:45 |
| 3 | 2:06 | 2:50 | 3:39 |
| 4 | 2:45 | 3:30 | 4:28 |
| 5 | 3:30 | 4:15 | 5:28 |
| 6 | 4:18 | 5:05 | 6:37 |
| 7 | 5:17 | 6:10 | 8:01 |
| 8 | 6:22 | 7:38 | 9:56 |
| 9 | 7:31 | 9:06 | — |
| 10 | 9:08 | 11:00 | — |
| 11 | 10:59 | — | — |
| Self-Extinguishment Observed | No, Still Burning after 11:00 min. | No, Still Burning after 11:00 min. | No, Still Burning after 11:00 min. |
| Max. Flame Spread during Test[d], inches | Max FS = 11" | Max FS = 10" | Max FS = 8.7" |

Notes:
[a]Flame spread determinations were carried out using a modified ASTM E162 radiant panel test methodology employing 6" × 12" PB panels.
[b]Particle board employed in the study was a Georgia Pacific, 0.75" thick, standard grade panel purchased from Home Depot.
[c]A 6.0 mil wet film thickness was applied to the particle board panels on one side using a wire-wound applicator rod and the applied coating was allowed to air dry overnight. Board was burned with the coated side facing the radiant heat panel.
[d]Maximum flame spread is measured after an 11 minute test burn period or stopped after reaching the 11 inch mark or recorded at the point of self-extinguishment of the flame (whichever event comes first).
[e]Coating contains the prior art boric acid dispersion that was produced from a TG granular boric acid in accordance with the procedure used in U.S. Pat. No. 4,801,404.
[f]Waterborne coating formula utilizes the fine particle size dispersion of boric acid obtained from Expt. #1.

30

Yet another experiment was performed to assess the flame spread properties of wood products treated with different boric acid dispersions. In this experiment, the flame spread properties of some laboratory-produced wood panels were comparatively evaluated. In order to accentuate FR performance differences very thin wood panels only 0.25 inches in thickness were produced. Fine Southern Yellow Pine wood shavings (much smaller in size than wood flakes used in commercial OSB board mills) were employed. The SYP wood shavings were purchased from PETCO and had a typical dimension of about 10 mm×15 mm×0.1 mm thickness. The boric acid and pMDI adhesive additives were thoroughly pre-blended with the SYP wood shavings prior to forming the mats and pressing the test boards. Three test boards were produced using an 18 inch×18 inch Wabash Press. One board (Expt. 31A) was unfilled to serve as a comparative control. The other two Boards (Expt. 31B & 31C) were loaded with a 15% addition level of boric acid additive. All test boards utilized an equivalent level of pMDI (Mondur 541-Light) adhesive. In Expt. 31B, the test board was produced using the boric acid dispersion prepared using the prior art technique of U.S. Pat. No. 4,801,404, which was an experiment that produced a dispersion of boric acid using granular TG boric acid and NaOH as the alkali metal base. In Expt. 31C, the fine particle size dispersion of boric acid from Expt. #1 was utilized to produce the test board. Using the modified ASTM E162 testing protocol previously described above, the Flame Spread properties were then determined.

Results for the three test boards are comparatively summarized in Table 4. The maximum flame spread value for Test Board Expt. 31C was significantly less than the corresponding value observed for Test Board Expt. 31B. In addition, the flame front for Test Board Expt. 31C self-extinguished after 8 min. 56 sec. whereas the other boards continued to burn through the entire test period. This data again illustrates the greater fire retardant efficiency of wood panels using the inventive fine particle dispersion of boric acid as a FR additive as compared to using the prior art boric acid dispersion.

TABLE 4

Flame Spread Determination[a] of Wood Test Panels with Internal Boric Acid Additives

| Flame Spread Inches | Expt. 31A (Control; Unfilled Board) (min:sec) | Expt. 31B (Board w/15% Granular BA[c]) (min:sec) | Expt. 31C (Board w/15% BA-FPSD[d]) (min:sec) |
|---|---|---|---|
| 1 | 0:22 | 0:47 | 0:54 |
| 2 | 1:45 | 5:43 | 5:11 |
| 3 | 2:40 | 6:14 | 5:50 |
| 4 | 3:26 | 6:52 | — |
| 5 | 4:22 | 7:31 | — |
| 6 | 5:42 | 10:40 | — |
| 7 | 6:38 | — | — |

TABLE 4-continued

Flame Spread Determination[a] of Wood Test
Panels with Internal Boric Acid Additives

| Flame Spread Inches | Expt. 31A (Control; Unfilled Board) (min:sec) | Expt. 31B (Board w/15% Granular BA[c]) (min:sec) | Expt. 31C (Board w/15% BA-FPSD[d]) (min:sec) |
|---|---|---|---|
| 8 | 7:40 | — | — |
| 9 | 8:44 | — | — |
| 10 | 10:07 | — | — |
| 11 | — | — | — |
| Self-Extinguishment Observed | No, Still Burning after 11:00 min. | No, Still Burning after 11:00 min. | Yes, Stopped Burning after 8:56 min. |
| Max. Flame Spread During Test[b], inches | Max FS = 10.7" | Max FS = 6.5" | Max FS = 3.2" |

Notes:
[a]Flame spread determinations were carried out using a modified ASTM E162 radiant panel test methodology employing 6" × 12" wood panels.
[b]Maximum flame spread is measured after an 11 minute test burn period or stopped after reaching the 11 inch mark or recorded at the point of self-extinguishment of the flame (whichever event comes first).
[c]Board contains boric acid dispersion that is produced from a TG Granular boric acid in accordance with the procedure in U.S. Pat. No. 4,801,404.
[d]The board utilizes the fine particle size dispersion of boric acid obtained from Expt. #1.

Figure 4:
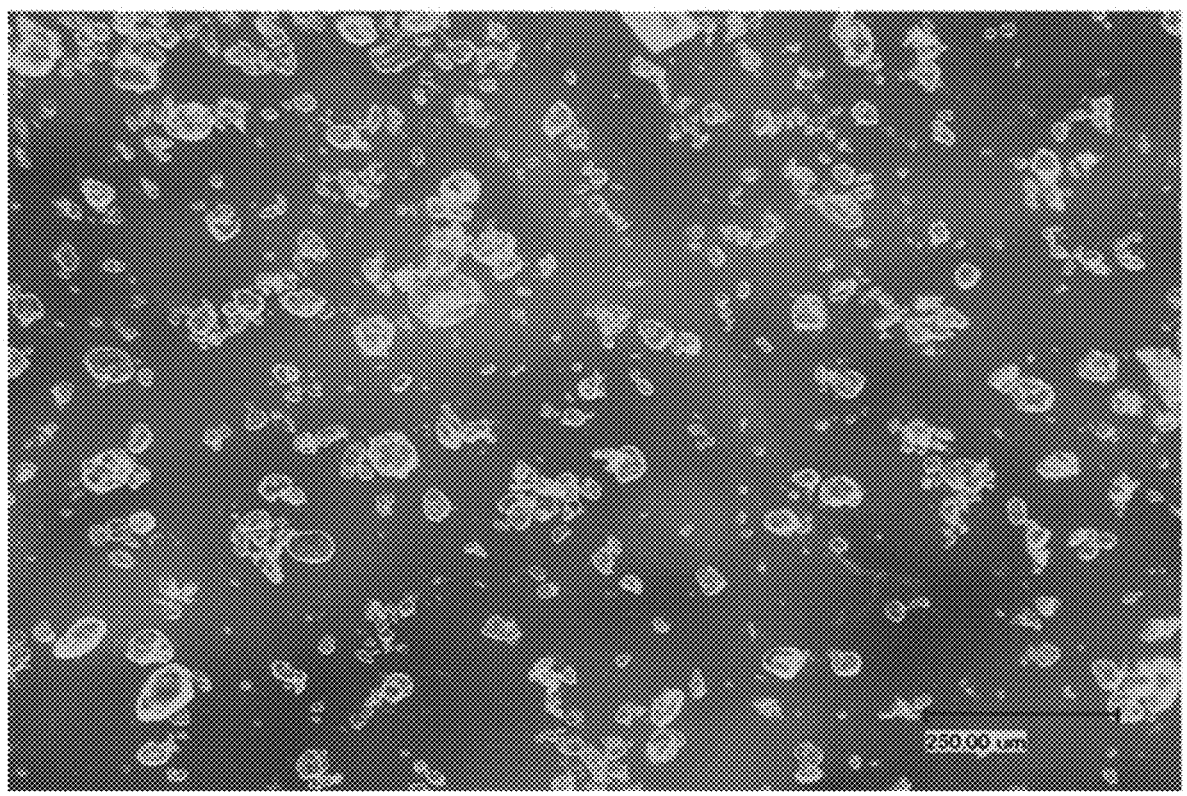
FIG. 4 is a micrograph image of a 3:1 w/w boric acid/urea ratio dispersion at 200× magnification.

One additional experiment was conducted to assess the effect of the use of the boric acid dispersion on flame retardancy when used as an additive in medium density fiberboard (MDF). In this experiment, the fine particle size boric acid dispersion produced in accordance with Expt. #1 was utilized as a flame retardant additive in a MDF panel of 0.75 inch thickness. This boric acid dispersion was introduced to the ligneous fiber material at the refiner at an addition level to yield 15% by wt. of boric acid in the finished MDF panel. However, those skilled in the art of manufacturing MDF panels will readily recognize that other locations for addition of the boric acid dispersion are possible such as in the blow line between the refiner and the drier. FIG. 4 of U.S. Pat. No. 7,651,591 illustrates a conventional MDF panel forming process and the addition of the dispersion as an example could be added between the refining step 415 and the drying step 430.

To serve as a comparative control, an unfilled MDF panel was also produced. The flame spread properties of the unfilled and boric acid-filled MDF panels (Board Expts. 32A & 32B, respectively) were then determined using the modified ASTM E162 testing protocol previously discussed and described above. The results obtained from this flame spread testing are summarized in Table 5.

The flame front on test board Expt. 32B self-extinguished just prior to the 11:00 min. mark. This board exhibited a maximum flame spread of just 6.7 inches whereas the unfilled test board, board Expt. 32A, reached the end of the 11-inch test length in 10 min. 23 sec. and was subsequently observed to still be burning after the 11:00 min. mark.

The excellent fire resistance properties exhibited by test board Expt. 32B were then subsequently determined by an outside lab to yield a Class A fire rating as determined by ASTM E84 Steiner Tunnel testing. A Class A rating for wood materials are those exhibiting a Flame Spread Index value of 0-25 by E84. In comparison, a typical FSI value reported in the technical literature for a 0.75 inch thick MDF panel is FSI=120 (Class C). Additional details on reported FSI values for various wood products can be found in the American Wood Council publication "Flame Spread Performance of Wood Products used for Interior Finish," copyright 2017. This experiment reveals that the boric acid dispersion can be used to make an MDF panel, which normally has a Class C rating, achieve a Class A rating.

TABLE 5

Flame Spread Determination[a] for MDF Panels[b] Utilizing BA-FPSD

| Inches | Expt. 32A (Control; Unfilled MDF Panel) (min:sec) | Expt. 32B (MDF Test Panel w/15% BA-FPSD[d]) (min:sec) |
|---|---|---|
| 1 | 0:25 | 2:52 |
| 2 | 1:26 | 4:04 |
| 3 | 2:13 | 5:10 |
| 4 | 2:51 | 6:20 |
| 5 | 3:29 | 7:35 |
| 6 | 4:15 | 9:19 |
| 7 | 5:12 | |
| 8 | 6:22 | |
| 9 | 7:25 | |
| 10 | 8:52 | |
| 11 | 10:23 | |
| Self-Extinguishment Observed | No, Still Burning after 11:00 min. | Yes, Stopped Burning just Prior to 11:00 min. Mark. |
| Max. Flame Spread During Test[c], inches | Max FS = 11" | Max FS = 6.7" |

Notes:
[a]Flame spread determinations were conducted using test protocol based on a modified ASTM E162 radiant panel methodology employing 6" × 12" MDF test panels.
[b]Medium Density Fiberboard (MDF) test panels of ³/₄" thickness were produced and tested. The Boric Acid content in MDF test panel Expt. 32B was approximately 15% by weight.
[c]Maximum flame spread is measured after an 11 minute test burn period or stopped after reaching the 11 inch mark or recorded at the point of self-extinguishment of the flame (whichever event comes first).
[d]Test board utilized the fine particle size dispersion of boric acid produced in accordance with Expt. #1.

While the high solids boric acid dispersion herein described provides significant improvements in terms of long term stability, pumpability as well as sprayability for its fire retardant applications directed to engineered wood products, a boric acid/urea dispersion offers additional improvements in terms of a considerably higher total actives content and lower static viscosity values after aging without sacrificing any of the other essential end use performance properties. That is, when the fine particle boric acid dispersion described above includes a urea component, the resultant boric acid/urea dispersion can yield a total actives content that is considerably higher while retaining all the desirable performance characteristics of the boric acid dispersion in terms of long term stability, pumpability, sprayability, and fire retardancy. The observed ability to use some urea in combination with the fine particle boric acid dispersion to yield a higher actives content dispersion than what can be produced by utilizing either one alone is surprising. Solutions of urea are commonly produced at 40-50% actives while the fine particle boric acid dispersion is typically produced at 55-60% solids yet combining these two chemistries has enabled a waterborne boric acid/urea dispersion to be produced that can easily have a total actives content of 75-78% depending on the w/w ratio of boric acid to urea that is employed. Furthermore, the creation of this even higher actives content dispersion that does not adversely affect the other performance properties of the boric acid dispersion is remarkable given that combining the boric acid with urea in water results in the formation of a species (e.g., a 1:1 molar boric acid:urea reaction complex) that exists in solution in equilibrium with the fine particle boric acid fraction. While the formation of a water soluble 1:1 molar boric acid:urea reaction complex may partially account for the observed ability to produce boric acid/urea dispersions of higher actives content the overall magnitude in increase from 55-60% solids for a boric acid dispersion to 75-78% total actives content for the boric acid/urea dispersions was unexpected. These unexpected findings are confirmed with the experiments conducted below.

The boric acid/urea dispersion differs from the boric acid dispersion by the addition of urea in an effective amount to allow the combined boric acid plus urea dispersion product to have a higher % actives content than what is possible to achieve with just the boric acid dispersion. The % actives content and % solids content for the boric acid dispersions are essentially the same since there is a minimal amount of boric acid in solution in relation to the particulate solids content therein hence the boric acid dispersions are described here in terms of their % solids. Whereas the boric acid dispersion had long term stability and pumpability at a solids content of 55-60%, the boric acid/urea dispersion can be made with a % actives content ranging from 60 to 85% without a loss in the properties necessary for transport and pumping of the dispersion for a given application. The % actives content of the aqueous boric acid/urea dispersion is at least 60% by weight but it can be as high as 85% whereby the amount of boric acid therein would range from about 60-95% of the total actives content or more preferably range from about 70-80% of the total actives content. For example, in a highly preferred case where the boric acid/urea dispersion is 3:1 w/w boric acid to urea at a total actives content of 78% then the amount of boric acid in the dispersion product equates to 58.5% of the formula's total weight and the urea equates to 19.5% of the formula's total weight. However, it is important to understand that the boric acid content in such boric acid/urea dispersions is present in two forms as explained below.

The boric acid/urea dispersion has many of the same features or similar features as the boric acid dispersion previously described. The features include actives content, the manner in which the dispersion is made, the use of a viscosity reducing agent to assist in obtaining the desired static and dynamic viscosities, the optional use of an alkali metal base, xanthan gum, and additional surfactants, a resultant boric acid particle size range and ability to use the dispersion in fire retardant applications, including both as a component of the material and a material coating.

More particularly, the boric acid plus urea combination is a high actives content, waterborne fire retardant formulation of about 60-85% total actives whereby the chemical speciation contains varying amounts of a combination of solubilized urea, solubilized boric acid, a soluble 1:1 mole ratio boric acid:urea complex and a significant fraction amount of insoluble boric acid in fine particle size colloidal form. Since the final dispersion product, which utilizes a large excess of boric acid in relation to urea, is put together at finished batch temperatures of around 25° C., it is believed based on the published literature that some amount of a soluble 1:1 mole ratio boric acid:urea complex is most likely formed. The formation of this soluble 1:1 mole ratio boric acid:urea complex may account for the observed ability to produce higher actives content fire retardant formulations than what has been previously possible when dispersing only Technical Grade Boric Acid powders into fine particle aqueous dispersions. The soluble 1:1 mole ratio boric acid:urea complex, $H_3BO_3:CO(NH_2)_2$, is presumably formed through a hydrogen bonding interaction so the 1:1 complex likely exists in equilibrium with the colloidal boric acid particles and with amounts of solubilized boric acid and solubilized urea whose respective concentrations at a given total solids content are temperature dependent. In summary, the waterborne high solids liquid formulations in this boric acid/urea dispersion invention are heterogeneous in form consisting of an aqueous solution phase (containing solubilized amounts of boric acid, urea and 1:1 boric acid/urea complex) and an insoluble phase comprising fine particles of boric acid that are dispersed and stabilized in the aqueous solution. Since a significant fraction of the formulation contains an insoluble fine particle particulate of boric acid, there is consequently still a need to aid the wet-out and dispersion of the boric acid particulate and to subsequently stabilize the resultant colloidal boric acid dispersion, similar to the need existing when only TG boric acid powder is used in producing the dispersion. Details concerning the viscosity reducing agents and stabilizers effectively employed in the inventive boric acid/urea dispersions are summarized in the examples provided below.

The essentials of the boric acid plus urea dispersion process are very similar to the requirements and protocols described above when making the high-shear dispersion of TG boric acid powder with one notable exception. The starting deionized water can be used in a room temperature state and the preferred chilling mode described above when making the boric acid dispersion is not required. The starting deionized water can be ambient in temperature (20-25° C.) since it is recommended that the urea microprills used to provide the urea component of the dispersion be first pre-dissolved in batch water prior to the addition of any TG boric acid powder. Dissolution of the urea is an endothermic process so the starting deionized water will steadily decrease in temperature as the urea dissolves. It is not unusual for the resultant urea solution to end up at or even below 0° C. towards the end of the urea dissolution process. It is desirable to dissolve as much of the urea as possible in the starting water before beginning the boric acid high-shear dispersion process. Having the urea in soluble form seems to help speed up the subsequent dispersion process as it likely facilitates the formation of a soluble 1:1 mole ratio boric acid/urea complex as the boric acid powder is added to the batch. As discussed in the processing sequence for making the boric acid dispersion, the total boric acid powder requirement is preferably added in several increments with each incremental amount being well dispersed before adding in the next increment of boric acid powder.

In analogy to the boric acid dispersion process, the boric acid/urea high-shear dispersion process benefits from the addition of small amounts of KOH base, the employment of a viscosity reducing agent, and the addition of a pre-blend of surfactant plus xanthan gum. The types and quantities of such additives to be employed are similar however the most highly preferred viscosity reducing agent in the boric acid/urea formulations is Arquad 2C-75, which is a cationic surfactant consisting of dicocoalkyldimethyl ammonium chloride. This dialkyldimethyl ammonium based quarternary amine has by far been the best performing viscosity performer and it yields aged Brookfield viscosities considerably lower than anything seen in the previous boric acid dispersions even though the total actives content has been raised from about 60% by wt. to typically about 75-78% by wt. in the preferred boric acid/urea dispersions. This remarkable reduction in aged viscosity is unexpected given the notable increase in total actives content. The stability and low aged Brookfield viscosity of these waterborne boric acid/urea dispersions translates to having liquid fire retardant formulations that are more easily produced, transported, pumped and spray applied onto various wood starting materials for the purposes of making fire retardant engineered wood products such as oriented strand board (OSB), particle board and medium density fiberboard (MDF). The capability of having an effective, higher actives content, liquid fire retardant formulation for spray application onto wood flakes, wood chips or wood fiber is very advantageous from the standpoint of being able to introduce higher additive levels into the engineered wood products while still maintaining adequate moisture control. It is critical to minimize the amount of water being back added to the wood source that is being used in the engineered wood panel manufacturing facility. The moisture content of the wood fiber, chips or flakes has to be carefully controlled within certain limits during the wood panel manufacturing process otherwise panels with defects or performance deficiencies are produced.

A more detailed description of the various aspects of the boric acid/urea dispersion is detailed below.

In terms of total actives content, the % actives content can range from 60.0-85.0% by wt., with a more preferred range being 70.0-80.0% and a most preferred range being 75.0-78.0%. Illustrative examples of their high actives content, a boric acid/urea w/w ratio of 80/20 (4:1) results in a dispersion with a total actives content of about 75% by weight. A boric acid/urea w/w ratio of 75/25 (3:1) results in a dispersion with a total actives content of about 78% by weight.

From an active basis w/w ratio, the ratio of boric acid to urea in the dispersion can range from 95/5 to 60/40 (or 19:1 to 1.5:1). For engineered wood fire retardancy applications a more preferred w/w ratio range of boric acid to urea is 80/20 to 70/30 (or 4:1 to 2.5:1). A most preferred w/w ratio is about 75/25 (or 3:1). In the case of cellulose insulation applications, a preferred w/w ratio of boric acid to urea is 60/40 (1.5:1).

For these aqueous boric acid/urea dispersions, it is appropriate to define the total concentration of all boric acid and urea related species therein in terms of the dispersion's % actives content. For definitional purposes, the % actives content of the boric acid/urea dispersion is the sum of all the boric acid and urea components therein independent of whether these components are solubilized, insoluble particulates or formed into a soluble 1:1 molar complex of boric acid:urea. It should be noted that the relative amounts of these components in a given dispersion will vary as a function of the boric acid/urea w/w ratio and the % actives content to which the dispersion product is produced. Furthermore, the relative distribution of the components for a given boric acid/urea w/w ratio will change depending on the % actives content that is targeted and on the temperature of the dispersion since the aforementioned components are in equilibrium with one another. Temperature, for example, affects the solubility properties of the boric acid which consequently changes the amount of boric acid that is in solution and available to complex with solubilized urea. If a 3:1 w/w boric acid/urea dispersion is therefore produced at a % actives content of 65% versus 78% by wt., then the relative proportions of the various boric acid and urea related species in the dispersion product will be somewhat different.

As with the boric acid dispersion described above, the boric acid/urea dispersion can be free of an alkali base. If used, the alkali base, e.g., KOH or NaOH, usage level (defined on the basis of its alkali metal base/boric acid mole ratio) ranges between 0.001-0.007. A more preferred alkali metal base/boric acid mole ratio range is 0.002-0.006, but a mole range of 0.002 to 0.004 can be employed as well.

Like the boric acid dispersion described above, an amount of xanthan gum can be employed in the boric acid/urea dispersion and a range of usage for this material would be 0.01-0.25 wt. %.

Like the boric acid dispersion described above, an amount of low foaming intermediate HLB nonionic surfactant can be used to aid xanthan gum introduction and this would be in a usage range of 0.01-0.25 wt. %. A preferred intermediate HLB nonionic surfactant is Surfynol 440 (which is an ethoxylated 2,4,7,9-tetramethyl 5 decyn-4,7 diol having a reported HLB value of 8.0).

The pH range for a finished batch of the boric acid/urea dispersion is 4.0-6.0. When the boric acid/urea dispersion employs an alkali base like KOH for pH adjustment purposes and for reducing the viscosity during the dispersion process, a typical pH range is 5.2-5.8.

As with the boric acid dispersion, an effective amount of a viscosity reducing agent is employed in order to yield the desired static and dynamic Brookfield viscosities. For an initial static viscosity, Brookfield at 2 rpm, the desired viscosity range is 5,000-25,000 cPs. A more preferred initial static viscosity ranges between 8,000-20,000 cPs.

For a three week aged static viscosity, the desired Brookfield viscosity at 2 rpm is less than 250,000 cPs. A more preferred three week aged static viscosity is less than 200,000 cPs and a most preferred three week aged static viscosity is less than 125,000 cPs.

Similar to the boric acid dispersion, the dynamic viscosity (Brookfield measured at 20 rpm) for the boric acid/urea dispersion is less than 5,000 cPs. This preferred dynamic viscosity level is applicable to both the boric acid/urea dispersion that is initially produced or to the aged boric acid/urea dispersion that has been subsequently re-agitated by either mechanical stirring or through the shearing action that is imparted while being pumped through various types of pumps.

Like the boric acid dispersion, the boric acid/urea dispersions form a thixotropic gel upon aging and consequently exhibit an aged Thixotropic Index (TI) Value less than or equal to about 8.0. This TI value means that the boric acid/urea dispersions are generally less thixotropic in nature than the boric acid dispersions. In other words, with a decreased Yield Point, the boric acid/urea dispersions are more easily pumped than the counterpart boric acid dispersion that does not have urea. This difference is seen when comparing aged TI values for the two dispersions. For the boric acid dispersions with a 60% solids content, aged TI values were mostly in the 8.0-11.0 range, whereas the aged TI values for the boric acid/urea dispersions of 75-78% total solids content are predominantly less than 8.0 and in the most preferred instance can be less than 5.0.

Many of the same viscosity reducing agents used for the boric acid dispersion are effective for the boric acid/urea dispersions. The viscosity reducing agents include: cationic surfactants, with examples being Tomamine Q-C-15, Tomamine Q-14-2 & Arquad 2C-75; ethoxylated amine surfactants, with examples being Tomamine E-14-2 & Tomamine E-15-5; polymeric dispersants, with an example being an electrosteric anionic dispersants like Zetasperse 3600; nonionic surfactants, with an example being Ethal TDA-5 (which is a poly (5) oxyethylene iso-$C_{13}$ alcohol); anionic surfactants, with an example being ChemWet 75 (which is a NaDOSS); ethoxylated phosphate ester surfactants, with examples being Ethfac 140 & Ethfac 161.

More preferred viscosity reducing agents amongst the types examined were as follows as these agents yielded a three week aged static viscosity less than 125,000 cPs, which is the most preferred rheology for the boric acid/urea dispersions. The more preferred agents include cationic surfactants, with examples being Tomamine Q-C-15, Tomamine Q-14-2 & Arquad 2C-75; ethoxylated amine surfactants, with an example being Tomamine E-14-2, and polymeric dispersants, with an example being an electrosteric anionic dispersant like Zetasperse 3600.

The most preferred viscosity reducing agent for the boric acid/urea dispersions is Arquad 2C-75. Arquad 2C-75 belongs to a family of non-ethoxylated quaternary amine based cationic surfactants known as dialkyldimethyl ammonium chlorides. In the case of Arquad 2C-75, the specific alkyl group that is present is a coconut based alkyl chain however other alkyl chain groups can also be useful in the quaternary amine based viscosity reducing agents that are employed to produce the inventive boric acid/urea dispersions. For example, the viscosity reducing agent Arquad 2C-75 yielded a three week aged static Brookfield viscosity of about 49,400 cPs when it was used to produce a 4:1 w/w BA/urea dispersion at a total actives content of 75% by weight. Similarly, Arquad 2C-75 yielded a three week aged static Brookfield viscosity of about 52,200 cPs when it was used to produce a 3:1 w/w BA/urea dispersion at a total actives content of 78% by weight. In both cases, these are remarkably low three week aged static viscosity values for such high actives content dispersions.

The following three examples are provided to demonstrate the various properties and applications for the boric acid/urea dispersions.

In the following first example, a series of 4:1 w/w boric acid (BA)/urea dispersion batches at 75% total actives content were produced in accordance with the formulary and order of addition process details outlined in Table 6 using a laboratory scale high-shear disperser equipped with a Cowles type dispersion blade.

TABLE 6

| 80/20 (4:1) Boric Acid + Urea Liquid Fire Retardant Formulations at 75% Total Actives Content | | |
|---|---|---|
| Ingredient[a] (listed by sequence of addition) | Lab Batch Amount, g (active basis) | Wt. % in Formula |
| Deionized Water at 25° C. | 464.4 | 24.755 |
| Urea MicroPrill | 279.8 | 14.915 |

TABLE 6-continued

| 80/20 (4:1) Boric Acid + Urea Liquid Fire Retardant Formulations at 75% Total Actives Content | | |
|---|---|---|
| Ingredient[a] (listed by sequence of addition) | Lab Batch Amount, g (active basis) | Wt. % in Formula |
| Boric Acid TG Powder | 750.0 | 39.979 |
| 45% KOH reagent | 2.0 | 0.107 |
| Boric Acid TG Powder | 140.2 | 7.473 |
| 45% KOH reagent | 2.0 | 0.107 |
| Boric Acid TG Powder | 125.0 | 6.663 |
| 45% KOH reagent | 2.0 | 0.107 |
| Boric Acid TG Powder | 104.0 | 5.544 |
| Xanthan Liquid PreBlend: | | |
| a) Surfynol 440 | 2.2 | 0.117% |
| b) Viscosity Reducing Dispersant or Surfactant | 2.2 | 0.117% |
| c) Xanthan Gum | 2.2 | 0.117% |
| Total Batch Wt. = 1,876.0 | | |

Key Batch Parameters:
a) Total Actives = 75.0% by wt.
b) BA/Urea = 4:1 w/w
c) KOH/BA mole ratio = 0.002659
Note:
[a]Urea MicroPrill, PCS Nitrogen - Augusta, GA; Boric Acid TG Powder, National Boraxx - Cleveland, Ohio.

A urea mieroprill was added first to the starting deionized batch water which was at 25° C. and mixing was continued until essentially all of the urea was pre-dissolved. Dissolution of the urea resulted in the batch temperature falling to about 0° C. where after addition of the TG boric acid powder was started. The boric acid powder was added and subsequently high-shear dispersed in increments. In between the latter incremental additions of boric acid, a small amount of 45% active KOH base was added to help lower the process viscosity and to aide dispersion. On an active KOH basis, the amount of alkali metal base utilized translates to utilizing a KOH/BA mole ratio=0.002659. All test batches were the same with respect to their total actives content (75%), their BA/urea w/w ratio (4:1), and their KOH/BA mole ratio (0.002659). The only difference in the test batches was in the viscosity reducing agent that was employed. An equivalent active basis concentration of surfactant or dispersant (0.117% by wt. of total formulation) was utilized for testing comparison purposes. A wide array of different viscosity reducing agents were examined which included cationic surfactants, ethoxylated alkyl amine surfactants (which can be cationic or nonionic depending on the pH), dispersants (nonionic and anionic types), nonionic surfactants, anionic surfactants, amphoteric surfactants and ethoxylated phosphate ester surfactants. The full list of viscosity reducing agents tested in this example is provided in Table 7 which also provides Tradename, activity level and chemical description information on each agent.

TABLE 7

| Description of Dispersant & Surfactant Additives Tested in BA + Urea Dispersion[a] | | | |
|---|---|---|---|
| Chemical Tradename/ Supplier | Chemical or Generic Description | % Activity | Chemical Class & Comments |
| Tomamine Q-C-15/Evonik | coco poly (15) oxyethylene methyl ammonium chloride | 100% | cationic surfactant (ethoxylated quaternary amine) |

TABLE 7-continued

Description of Dispersant & Surfactant Additives Tested in BA + Urea Dispersion[a]

| Chemical Tradename/ Supplier | Chemical or Generic Description | % Activity | Chemical Class & Comments |
|---|---|---|---|
| Tomamine Q-14-2/Evonik | isodecyloxypropyl bis-(2-hydroxy-ethyl) methyl ammonium chloride | 75% | cationic surfactant (ethoxylated quaternary amine) |
| Tomamine Q-17-2/Evonik | isotridecyloxypropyl bis-(2-hydroxyethyl) methyl ammonium chloride | 75% | cationic surfactant (ethoxylated quaternary amine) |
| Arquad 2C-75/ Akzo Nobel | dicocoalkyldimethyl ammonium chloride | 75% | cationic surfactant (quaternary amine but no ethoxylation) |
| Tomamine E-14-2/Evonik | poly (2) oxyethylene isodecyloxypropylamine | 100% | ethoxylated amine surfactant |
| Tomamine E-14-5/Evonik | poly (5) oxyethylene isodecyloxypropylamine | 100% | ethoxylated amine surfactant |
| Tomamine E-17-2/Evonik | poly (2) oxyethylene isotridecyloxypropylamine | 100% | ethoxylated amine surfactant |
| Tomamine E-17-5/Evonik | poly (5) oxyethylene isotridecyloxypropylamine | 100% | ethoxylated amine surfactant |
| Edaplan 397/ Munzing | blend of polyglycol esters | 100% | nonionic polymeric dispersant |
| Edaplan 494/ Munzing | copolymer with pigment affinic groups | 50% | anionic polymeric dispersant |
| Edaplan 490/ Munzing | copolymer with pigment affinic groups | 40% | nonionic polymeric dispersant |
| Zetasperse 3600/ Evonik | electrosteric dispersant & grind aide | 52% | anionic polymeric dispersant |
| Zetasperse 1200/ Evonik | dynamic wetter + anionic dispersant polymer | 45% | nonionic & anionic polymeric dispersant |
| Zetasperse 170/ Evonik | blend of ethoxylated $c_6$-$c_{12}$ alcohols + polyoxyalkylene amine derivative | 100% | nonionic wetting agent & steric stabilizer for acidic pigments |
| Acumer 3100/ Dow Chemical | carboxylate/sulfonate/nonionic functional terpolymer | 40% | polymeric dispersant |
| Flosperse 9000/ SNF | sodium polyacrylate | 40% | anionic polymeric dispersant |
| Tamol SN/ Dow Chemical | sodium naphthalene sulfonate | 94% | anionic dispersing agent |
| E-Sperse 100/ Ethox Chemical | proprietary dispersing agent | 71.5% | anionic dispersing agent |
| T-DET A 91-6/ Harcros | poly (6) oxyethylene $c_9$-$c_{11}$ aliphatic alcohol | 100% | nonionic wetting agent |
| Ethal TDA-5/ Ethox Chemical | poly (5) oxyethylene iso-$c_{13}$ alcohol | 100% | nonionic wetting agent |
| T-DET EPO-62/ Harcros | ethylene oxide/propylene oxide copolymer | 100% | polymeric nonionic wetting agent |
| Lumulse PEG200/ Vantage | polyethylene glycol 200 | 100% | polymeric nonionic wetting agent |
| DeTERIC ODP-LF/ DeForest | sodium octyliminodipropionate | 50% | amphoteric surfactant |
| ChemWet 75/ BYK | butanedioic acid, 2-sulfo-, 1,4-bis(2-ethylhexyl) ester, sodium salt; also known as Na DOSS | 75% | anionic wetting agent |
| Ethfac 140/ Ethox Chemical | oleyl 4(eo) phosphate ester | 100% | phosphate ester wetting agent |
| Ethfac 161/ Ethox Chemical | decyl 6(eo) phosphate ester | 100% | phosphate ester wetting agent |

Note:
[a]All lab dispersion batches of boric acid + urea were made using a high-shear mixing procedure. Surfactants and chemical dispersants listed herein were tested as the viscosity reduction additive. All surfactants and chemical dispersants were utilized on an equivalent active weight basis.

For the above referenced series of viscosity reducing agents, which were used to produce 4:1 w/w BA/urea test batches at 75% total actives content, the physical property testing results on the resultant dispersions were measured periodically over time and are summarized in Table 8. For each test batch, the specific gravity, pH and initial 2 rpm and 20 rpm Brookfield viscosities were determined. The test batches were subsequently allowed to age at about 25° C. over a period of three weeks whereby their pH and Brookfield viscosity properties were rechecked periodically. For boric acid/urea dispersion batches that showed rheological promise the Thixotropic Index (TI) values were also calculated and are shown in Table 8. From a processing perspective, it was desirable to have a dynamic viscosity of <5,000 cPs and have an initial 2 rpm static viscosity <25,000 cPs. However, in order for the initial dispersion to have enough viscosity to inhibit pigment settling or to prevent syneresis during its aging it is desirable for the initial static Brookfield viscosity to be at least 5,000 cPs. In the more preferred case, the initial static viscosity of the boric acid/urea dispersion should range from about 8,000-20,000 cPs. Relative to pumpability considerations after aging for 3 weeks the boric acid/urea dispersions should have a 3-week aged static Brookfield viscosity of <250,000 cPs, but more preferably have a 3-week aged static viscosity of <200,000 cPs. In the most preferred case, select viscosity reducing agents will yield a 3-week aged static viscosity <125,000 cPs for the inventive boric acid/urea dispersions.

TABLE 8 pH and BF Viscosity Tracking Results for 75% Solids Dispersions of Boric Acid + Urea (80/20 ratio)[a]

| Expt. #/ Chemical Tradename/ Supplier | Batch Specific Gravity[c] (g/ml) | Initial pH & BF Visc.[b], cPs | Aged pH & BF Visc.[b], cPs (after 3 days) | Aged pH & BF Visc.[b], cPs (after 1 week) | Aged pH & BF Visc.[b], cPs (after 2 weeks) | Aged pH & BF Visc.[b], cPs (after 3 weeks) | Experimental Observations & Comments |
|---|---|---|---|---|---|---|---|
| *Experiments with Cationic Surfactants* | | | | | | | |
| Tomamine Q-C-15/ Evonik | 1.2763 | Sp #91 2 rpm = 18,500 cPs 20 rpm = 3,790 cPs pH = 5.57 | Sp #91 2 rpm = 58,200 cPs 20 rpm = 9,460 cPs pH = 5.31 | Sp #92 2 rpm = 78,600 cPs 20 rpm = 12,260 cPs pH = 5.41 | Sp #92 2 rpm = 95,000 cPs 20 rpm = 14,380 cPs pH = 5.48 | Sp #92 2 rpm = 115,000 cPs 20 rpm = 16,640 cPs TI Value = 6.9 pH = 5.64 | manageable process viscosity & pumpable after aging |
| Tomamine Q-14-2/ Evonik | 1.2758 | Sp #91 2 rpm = 17,500 cPs 20 rpm = 3,540 cPs pH = 5.55 | Sp #91 2 rpm = 46,000 cPs 20 rpm = 7,510 cPs pH = 5.37 | Sp #92 2 rpm = 73,000 cPs 20 rpm = 10,540 cPs pH = 5.46 | Sp #92 2 rpm = 86,600 cPs 20 rpm = 11,320 cPs pH = 5.46 | Sp #92 2 rpm = 104,000 cPs 20 rpm = 13,840 cPs TI Value = 7.5 pH = 5.56 | manageable process viscosity & pumpable after aging |
| Tomamine Q-17-2/ Evonik | 1.2845 | Sp #91 2 rpm = 13,200 cPs 20 rpm = 2,490 cPs pH = 5.52 | Sp #93 2 rpm = 264,000 cPs 20 rpm = 25,200 cPs pH = 5.27 | Sp #94 2 rpm = 817,000 cPs 20 rpm = 75,100 cPs pH = 5.36 | Tracking Stopped | NA | not stable: ~½" layer of clear syneresis observed after 1 week |
| Arquad 2C-75/ Akzo Nobel | 1.2796 | Sp #91 2 rpm = 14,000 cPs 20 rpm = 3,720 cPs pH = 5.42 | Sp #91 2 rpm = 30,300 cPs 20 rpm = 5,250 cPs pH = 5.27 | Sp #92 2 rpm = 32,600 cPs 20 rpm = 6,300 cPs pH = 5.40 | Sp #92 2 rpm = 41,800 cPs 20 rpm = 7,120 cPs pH = 5.45 | Sp #92 2 rpm = 49,400 cPs 20 rpm = 7,600 cPs TI Value = 6.5 pH = 5.61 | manageable process viscosity & easily pumped after aging; dispersion is stable despite its much lower aged viscosity |
| *Experiments with Ethoxylated Amine Surfactants* | | | | | | | |
| Tomamine E-14-2/ Evonik | 1.2728 | Sp #91 2 rpm = 16,100 cPs 20 rpm = 3,300 cPs pH = 5.51 | Sp #92 2 rpm = 54,000 cPs 20 rpm = 8,820 cPs pH = 5.51 | Sp #92 2 rpm = 62,000 cPs 20 rpm = 9,500 cPs pH = 5.50 | Sp #92 2 rpm = 70,200 cPs 20 rpm = 11,460 cPs pH = 5.57 | Sp #92 2 rpm = 93,200 cPs 20 rpm = 14,040 cPs TI Value = 6.6 pH = 5.66 | manageable process viscosity & pumpable after aging |
| Tomamine E-14-5/ Evonik | 1.2775 | Sp #91 2 rpm = 20,500 cPs 20 rpm = 3,980 cPs pH = 5.65 | Sp #91 2 rpm = 79,600 cPs 20 rpm = 11,100 cPs pH = 5.48 | Sp #92 2 rpm = 107,200 cPs 20 rpm = 14,820 cPs pH = 5.50 | Sp #92 2 rpm = 138,600 cPs 20 rpm = 17,400 cPs pH = 5.66 | Sp #93 2 rpm = 198,500 cPs 20 rpm = 23,450 cPs TI Value = 8.46 pH = 5.49 | manageable process viscosity but only fair pumpability |
| Tomamine E-17-2/ Evonik | 1.2807 | Sp #91 2 rpm = 11,300 cPs 20 rpm = 2,660 cPs pH = 5.69 | Sp #93 2 rpm = 259,500 cPs 20 rpm = 32,850 cPs pH = 5.41 | Tracking Stopped | NA | NA | not stable: ~½" layer of clear syneresis observed after 3 days |
| Tomamine E-17-5/ Evonik | 1.2844 | Sp #91 2 rpm = 8600 cPs 20 rpm = 2120 cPs pH = 5.63 | Sp #91 2 rpm = 29,800 cPs 20 rpm = 6,440 cPs pH = 5.52 | Sp #92 2 rpm = 38,600 cPs 20 rpm = 7,180 cPs pH = 5.55 | Sp #92 2 rpm = 56,200 cPs 20 rpm = 10,480 cPs pH = 5.66 | Sp #92 2 rpm = 97,200 cPs 20 rpm = 12,900 cPs pH = 5.54 | not stable: ~¼" clear syneresis observed after 3 weeks |
| *Experiments with Pigment Dispersants (Anionic & Nonionic types)* | | | | | | | |
| Edaplan 397/ Munzing | 1.2766 | Sp #91 2 rpm = 21,400 cPs 20 rpm = 4,460 cPs pH = 5.55 | Sp #91 2 rpm = 99,400 cPs 20 rpm = 14,600 cPs pH = 5.45 | Sp #92 2 rpm = 139,800 cPs 20 rpm = 18,160 cPs pH = 5.50 | Sp #93 2 rpm = 251,500 cPs 20 rpm = 31,550 cPs pH = 5.64 | Sp #93 2 rpm = 288,500 cPs 20 rpm = 33,750 cPs pH = 5.55 | manageable process viscosity but poor pumpability |

TABLE 8-continued pH and BF Viscosity Tracking Results for 75% Solids Dispersions of Boric Acid + Urea (80/20 ratio)[a]

| Expt. #/ Chemical Tradename/ Supplier | Batch Specific Gravity[c] (g/ml) | Initial pH & BF Visc.[b], cPs | Aged pH & BF Visc.[b], cPs (after 3 days) | Aged pH & BF Visc.[b], cPs (after 1 week) | Aged pH & BF Visc.[b], cPs (after 2 weeks) | Aged pH & BF Visc.[b], cPs (after 3 weeks) | Experimental Observations & Comments |
|---|---|---|---|---|---|---|---|
| Edaplan 494/ Munzing | 1.2967 | Sp #91 2 rpm = 28,600 cPs 20 rpm = 5,500 cPs pH = 5.58 | Sp #91 2 rpm = 129,000 cPs 20 rpm = 17,100 cPs pH = 5.54 | Sp #93 2 rpm = 210,000 cPs 20 rpm = 26,550 cPs pH = 5.63 | Sp #93 2 rpm = 251,500 cPs 20 rpm = 28,200 cPs pH = 5.51 | Sp #93 2 rpm = 296,000 cPs 20 rpm = 32,850 cPs pH = 5.57 | fair processability and poor pumpability |
| Edaplan 490/ Munzing | 1.2906 | Sp #91 2 rpm = 26,400 cPs 20 rpm = 5,170 cPs pH = 5.62 | Sp #92 2 rpm = 124,000 cPs 20 rpm = 17,040 cPs pH = 5.56 | Sp #93 2 rpm = 204,500 cPs 20 rpm = 26,150 cPs pH = 5.59 | Sp #93 2 rpm = 240,500 cPs 20 rpm = 28,200 cPs pH = 5.49 | Sp #93 2 rpm = 289,000 cPs 20 rpm = 32,500 cPs pH = 5.53 | fair processability and poor pumpability |
| Zetasperse 3600/ Evonik | 1.2882 | Sp #91 2 rpm = 22,200 cPs 20 rpm = 4,390 cPs pH = 5.63 | Sp #92 2 rpm = 83,800 cPs 20 rpm = 11,820 cPs pH = 5.53 | Sp #92 2 rpm = 82,200 cPs 20 rpm = 13,400 cPs pH = 5.52 | Sp #92 2 rpm = 127,400 cPs 20 rpm = 15,440 cPs pH = 5.66 | Sp #92 2 rpm = 122,000 cPs 20 rpm = 13,840 cPs TI Value = 8.8 pH = 5.60 | manageable process viscosity & pumpable after aging |
| Zetasperse 1200/ Evonik | 1.2574 | Sp #91 2 rpm = 32,700 cPs 20 rpm = 5,960 cPs pH = 5.64 | Sp #92 2 rpm = 91,400 cPs 20 rpm = 13,260 cPs pH = 5.53 | Sp #92 2 rpm = 112,000 cPs 20 rpm = 15,900 cPs pH = 5.10 | Sp #93 2 rpm = 199,500 cPs 20 rpm = 27,400 cPs pH = 5.60 | Sp #93 2 rpm = 259,500 cPs 20 rpm = 29,650 cPs pH = 5.60 | poor processability and only fair pumpability |
| Zetasperse 170/ Evonik | 1.2573 | Sp #91 2 rpm = 33,200 cPs 20 rpm = 5,720 cPs pH = 5.47 | Sp #93 2 rpm = 174,500 cPs 20 rpm = 22,050 cPs pH = 5.55 | Sp #93 2 rpm = 237,500 cPs 20 rpm = 26,650 cPs pH = 5.43 | Sp #93 2 rpm = 312,500 cPs 20 rpm = 32,800 cPs pH = 5.59 | Sp #93 2 rpm = 380,500 cPs 20 rpm = 36,200 cPs pH = 5.55 | poor processability and not pumpable |
| Acumer 3100/ Dow Chemical | 1.2574 | Sp #91 2 rpm = 66,700 cPs 20 rpm = 9,420 cPs pH = 5.59 | Sp #93 2 rpm = 409,000 cPs 20 rpm = 37,700 cPs pH = 5.44 | Sp #94 2 rpm = 471,500 cPs 20 rpm = 42,100 cPs pH = 5.40 | Sp #94 2 rpm = 743,000 cPs 20 rpm = 62,400 cPs pH = 5.52 | Sp #94 2 rpm = 944,000 cPs 20 rpm = 67,600 cPs pH = 5.52 | poor processability and not pumpable |
| Flosperse 9000/ SNF | 1.2536 | Sp #91 2 rpm = 50,500 cPs 20 rpm = 7,580 cPs pH = 5.72 | Sp #93 2 rpm = 285,000 cPs 20 rpm = 30,000 cPs pH = 5.64 | Sp #93 2 rpm = 417,000 cPs 20 rpm = 39,600 cPs pH = 5.60 | Sp #94 2 rpm = 657,000 cPs 20 rpm = 53,500 cPs pH = 5.73 | Sp #94 2 rpm = 720,000 cPs 20 rpm = 66,800 cPs pH = 5.67 | poor processability and not pumpable |
| Tamol SN/ Dow Chemical | 1.2782 | Sp #91 2 rpm = 50,400 cPs 20 rpm = 7,340 cPs pH = 5.59 | Sp #93 2 rpm = 405,000 cPs 20 rpm = 44,100 cPs pH = 5.44 | Sp #94 2 rpm = 597,000 cPs 20 rpm = 53,200 cPs pH = 5.54 | Sp #94 2 rpm = 835,000 cPs 20 rpm = 66,400 cPs pH = 5.55 | Sp #94 2 rpm = 957,000 cPs 20 rpm = 74,100 cPs pH = 5.67 | poor processability and not pumpable |
| E-Sperse 100/ Ethox Chemical | 1.2806 | Sp #91 2 rpm = 29,200 cPs 20 rpm = 5,170 cPs pH = 5.68 | Sp #92 2 rpm = 140,000 cPs 20 rpm = 17,640 cPs pH = 5.40 | Sp #92 2 rpm = 157,600 cPs 20 rpm = 18,640 cPs pH = 5.54 | Sp #93 2 rpm = 270,000 cPs 20 rpm = 28,950 cPs pH = 5.53 | Sp #93 2 rpm = 324,000 cPs 20 rpm = 33,150 cPs pH = 5.63 | fair processability and not pumpable |
| Experiments with Nonionic, Anionic or Amphoteric type Surfactants | | | | | | | |
| T-DET A 91-6/ Harcros | 1.255 | Sp #91 2 rpm = 27,000 cPs 20 rpm = 5,120 cPs pH = 5.57 | Sp #92 2 rpm = 135,600 cPs 20 rpm = 17,000 cPs pH = 5.48 | Sp #93 2 rpm = 258,000 cPs 20 rpm = 27,000 cPs pH = 5.54 | Sp #94 2 rpm = 390,000 cPs 20 rpm = 34,800 cPs pH = 5.55 | Sp #94 2 rpm = 390,500 cPs 20 rpm = 36,600 cPs pH = 5.57 | fair processability and not pumpable |
| Ethal TDA-5/ Ethox Chemical | 1.2733 | Sp #91 2 rpm = 18,100 cPs 20 rpm = 3,850 cPs pH = 5.55 | Sp #92 2 rpm = 69,800 cPs 20 rpm = 11,560 cPs pH = 5.59 | Sp #92 2 rpm = 98,000 cPs 20 rpm = 15,400 cPs pH = 5.53 | Sp #92 2 rpm = 133,800 cPs 20 rpm = 19,240 cPs pH = 5.49 | Sp #93 2 rpm = 226,500 cPs 20 rpm = 28,900 cPs TI Value = 7.84 pH = 5.61 | manageable process viscosity but only fair pumpability |

TABLE 8-continued pH and BF Viscosity Tracking Results for 75% Solids Dispersions of Boric Acid + Urea (80/20 ratio)[a]

| Expt. #/ Chemical Tradename/ Supplier | Batch Specific Gravity[c] (g/ml) | Initial pH & BF Visc.[b], cPs | Aged pH & BF Visc.[b], cPs (after 3 days) | Aged pH & BF Visc.[b], cPs (after 1 week) | Aged pH & BF Visc.[b], cPs (after 2 weeks) | Aged pH & BF Visc.[b], cPs (after 3 weeks) | Experimental Observations & Comments |
|---|---|---|---|---|---|---|---|
| T-DET EPO-62/ Harcros | 1.2744 | Sp #91 2 rpm = 49,400 cPs 20 rpm = 7,640 cPs pH = 5.55 | Sp #93 2 rpm = 253,500 cPs 20 rpm = 29,100 cPs pH = 5.47 | Sp #93 2 rpm = 387,000 cPs 20 rpm = 41,500 cPs pH = 5.52 | Sp #94 2 rpm = 555,000 cPs 20 rpm = 53,700 cPs pH = 5.52 | Sp #94 2 rpm = 823,000 cPs 20 rpm = 86,900 cPs pH = 5.59 | poor processability and not pumpable |
| Lumulse PEG200/ Vantage | 1.2715 | Sp #91 2 rpm = 52,800 cPs 20 rpm = 7,420 cPs pH = 5.53 | Sp #93 2 rpm = 241,500 cPs 20 rpm = 27,750 cPs pH = 5.42 | Sp #93 2 rpm = 336,000 cPs 20 rpm = 36,350 cPs pH = 5.56 | Sp #93 2 rpm = 392,000 cPs 20 rpm = 39,850 cPs pH = 5.51 | Sp #93 2 rpm = 475,500 cPs 20 rpm = 46,700 cPs pH = 5.57 | poor processability and not pumpable |
| DeTERIC ODP-LF/ DeForest | 1.279 | Sp #91 2 rpm = 51,000 cPs 20 rpm = 7,800 cPs pH = 5.46 | Sp #93 2 rpm = 240,500 cPs 20 rpm = 29,700 cPs pH = 5.58 | Sp #93 2 rpm = 374,500 cPs 20 rpm = 38,400 cPs pH = 5.48 | Sp #94 2 rpm = 470,500 cPs 20 rpm = 47,650 cPs pH = 5.59 | Sp #94 2 rpm = 742,000 cPs 20 rpm = 58,300 cPs pH = 5.55 | poor processability and not pumpable |
| ChemWet 75/BYK | 1.2493 | Sp #91 2 rpm = 18,900 cPs 20 rpm = 4,220 cPs pH = 5.49 | Sp #92 2 rpm = 63,200 cPs 20 rpm = 11,280 cPs pH = 5.52 | Sp #92 2 rpm = 79,200 cPs 20 rpm = 13,920 cPs pH = 5.46 | Sp #93 2 rpm = 152,500 cPs 20 rpm = 23,600 cPs pH = 5.57 | Sp #93 2 rpm = 211,500 cPs 20 rpm = 28,050 cPs TI Value = 7.54 pH = 5.55 | manageable process viscosity but only fair pumpability |
| Experiments with Ethoxylated Phosphate Ester Surfactants ||||||||
| Ethfac 140/ Ethox Chemical | 1.2606 | Sp #91 2 rpm = 15,100 cPs 20 rpm = 3,670 cPs pH = 5.43 | Sp #92 2 rpm = 52,800 cPs 20 rpm = 11,060 cPs pH = 5.53 | Sp #92 2 rpm = 72,200 cPs 20 rpm = 14,580 cPs pH = 5.40 | Sp #93 2 rpm = 147,500 cPs 20 rpm = 24,500 cPs pH = 5.54 | Sp #93 2 rpm = 199,500 cPs 20 rpm = 29,550 cPs TI Value = 6.75 pH = 5.53 | manageable process viscosity but only fair pumpability |
| Ethfac 161/ Ethox Chemical | 1.2506 | Sp #91 2 rpm = 20,100 cPs 20 rpm = 4,190 cPs pH = 5.39 | Sp #92 2 rpm = 70,600 cPs 20 rpm = 12,320 cPs pH = 5.52 | Sp #92 2 rpm = 98,600 cPs 20 rpm = 15,360 cPs pH = 5.43 | Sp #93 2 rpm = 200,000 cPs 20 rpm = 25,850 cPs pH = 5.51 | Sp #93 2 rpm = 242,000 cPs 20 rpm = 29,700 cPs TI Value = 8.15 pH = 5.54 | manageable process viscosity but only fair pumpability |

Note:
[a]Experimental boric acid + urea dispersions were produced using TG boric acid Powder and high-shear mixing conditions in accordance with the dispersion process of this invention. The BA/urea ratio used was 80/20 (or 4:1 w/w) at a total batch actives content of 75%. The variable being explored was the specific surfactant or dispersant chemistry employed for reducing the process viscosity and yielding a stable final dispersion that can be pumped after aging. All BA + urea batches were produced at a KOH/BA mole ratio of 0.002659. Test dispersions were subsequently aged and retested at 25 ± 1° C.
[b]All Brookfield Viscosities were measured using a Brookfield RVDVE Heliopath Viscometer Unit equipped with T-spindles run at 2 rpm and then 20 rpm; T-spindles A (#91) through F (#96) were employed as required. Where reported the aged Thixotropic Index (TI) Values were calculated on the basis of dividing the BF Viscosity reading at 2 rpm by the BF Viscosity reading at 20 rpm.
[c]Specific Gravities were determined using a 100 ml specific gravity cup in accordance with ASTM D1475.

In all cases, it should be understood that the BA/urea dispersions should also be stable and consequently show no signs of pigment settling or syneresis throughout the aging period. Based on these criteria, several of the viscosity reducing agents that were found to be effective are as follows:
  cationic surfactants—Tomamine Q-C-15, Tomamine Q-14-2, and Arquad 2C-75;
  ethoxylated amine surfactants—Tomamine E-14-2 and Tomamine E-15-5;
  anionic, electrosteric polymeric dispersant—Zetasperse 3600;
  nonionic surfactant—Ethal TDA-5 (which is a poly (5) oxyethylene iso-$C_{13}$ alcohol);
  anionic surfactant—ChemWet 75 (which is a NaDOSS); and
  ethoxylated phosphate ester surfactants—Ethfac 140 and Ethfac 161.

The viscosity reducing agents that showed the most promise in limiting the 3-week aged Static Viscosity values to <125,000 cPs were:
  cationic surfactants—Tomamine Q-C-15, Tomamine Q-14-2 and Arquad 2C-75;
  ethoxylated amine surfactant—Tomamine E-14-2; and
  anionic, electrosteric polymeric dispersant—Zetasperse 3600.

Finally, the absolute best overall viscosity reducing agent in this set of dispersion experiments was Arquad 2C-75. It yielded a 3-week aged Static Viscosity of 49,400 cPs. Arquad 2C-75 belongs to a family of non-ethoxylated quaternary amine based cationic surfactants known as dialkyldimethyl ammonium chlorides. In the case of Arquad 2C-75, the alkyl group that is specifically present is a coconut based alkyl chain.

With regards to the cationic and ethoxylated amine surfactants that showed the most promise as viscosity reducing agents by limiting the 3-week aged static viscosity values to less than 125,000 ePs, their resultant Thixotropic Index values are in general lower than those previously observed with the fine particle boric acid dispersions discussed above. The viscosity reducing agent and its associated TI value are shown below:

target board density 42 lbs./ft$^3$. The PB test boards were then cut into 6"×12" panels for subsequent radiant panel fire testing by the modified ASTM E162 flame spread protocol previously discussed above.

The resultant flame spread results from this radiant panel fire testing method are summarized in Table 9.

TABLE 9

Flame Spread Data[a] on Lab Produced Particle Boards[b] using Various BA/Urea Combinations

| Flame Spread Inches | Untreated PB Control (min:sec) | PB w/15% BA-FPSD[d] (min:sec) | PB w/15% 90:10 BA/urea (min:sec) | PB w/15% 85:15 BA/urea (min:sec) | PB w/15% 80:20 BA/urea (min:sec) | PB w/15% 75:25 BA/urea (min:sec) | PB w/15% 70:30 BA/urea (min:sec) |
|---|---|---|---|---|---|---|---|
| 1 | 0:16 | 1:40 | 2:48 | 2:02 | 1:45 | — | 2:07 |
| 2 | 0:43 | 2:15 | 2:58 | 3:15 | 3:10 | — | 2:34 |
| 3 | 1:06 | 2:42 | 3:49 | 3:42 | 3:56 | — | — |
| 4 | 1:30 | 3:17 | 4:44 | 4:13 | 5:25 | — | — |
| 5 | 1:55 | 3:59 | 5:16 | 5:19 | 6:25 | — | — |
| 6 | 2:20 | 4:45 | 5:59 | — | — | — | — |
| 7 | 2:49 | — | — | — | — | — | — |
| 8 | 3:21 | — | — | — | — | — | — |
| 9 | 3:52 | — | — | — | — | — | — |
| 10 | 4:45 | — | — | — | — | — | — |
| 11 | 5:39 | — | — | — | — | — | — |
| Self-Extinguishment Observed | No, Still Burning after 11:00 min. | Yes, Stopped at 6:17 | Yes, Stopped at 6:43 | Yes, Stopped at 6:21 | Yes, Stopped at 7:03 | No Spread; Flame never Progressed Beyond Burner Contact Point | Yes, Stopped at 3:18 |
| Max. Flame Spread during Test[c], inches | Max FS = 11" | Max FS = 6.4" | Max FS = 6.1" | Max FS = 5.5" | Max FS = 5.2" | Max FS = 0.8" | Max FS = 2.3" |

Notes:
[a]All flame spread determinations were carried out using a modified ASTM E162 radiant panel test methodology employing 6" × 12" PB panels.
[b]Particle board panels employed in the study were produced in-house with a 18" × 18" Wabash lab press using all core wood chips that were obtained from Georgia Pacific's Monroeville, AL production facility. All PB test panels, other than the untreated control, utilized a 15% active basis loading of fire retardant additive.
[c]Maximum flame spread is measured after an 11 minute test burn period or stopped after reaching the 11 inch mark or recorded at the point of self-extinguishment of the flame (whichever event comes first).
[d]Fine particle size colloidal dispersion of Boric Acid as disclosed above.

Tomamine Q-C-15, aged TI Value=6.9
Tomamine Q-14-2, aged TI Value=7.5
Arquad 2C-75, aged TI Value=6.5
Tomamine E-14-2, aged TI Value=6.6

In contrast, the aged Thixotropic Index value range associated with the fine particle boric acid dispersions at a solids content of 60% was 7.0-11.5 with most examples falling into the 8.0-11.0 range. This finding indicates that the boric acid/urea dispersions are less thixotropic despite being considerably higher in total % actives content which equates to their improved pumpability and improved sprayability properties onto various wood substrates.

A second example of the invention as it relates to the boric acid/urea dispersions investigates flame spread results for different boric acid dispersions, including one without urea and others with different amounts of urea. In this second example, core wood chips were obtained from Georgia Pacific's particle board mill in Monroeville, Ala. which had a wood moisture content of about 7%. Prior to pressing the particle board (PB) test boards, the core wood chips were physically blended with pMDI adhesive (Huntsman's Rubinate 1840) and with the fire retardant additive (BA-FPSD or a particular BA/urea dispersion). The pMDI and fire retardant additives were added at a finished board content level of 3.0% and 15%, respectively, on a dry wood weight basis. The liquid, waterborne fire retardant additives (BA-FPSD or a BA/urea dispersion) were applied to the core wood chips via spray application. Using these treated wood chips, PB test boards were then produced with an 18"×18" Wabash press with a target dimension of 13.5"×13.5"×0.75" and at a target board density 42 lbs./ft$^3$.

At a 15% active basis loading of fire retardant, the utilization of urea with boric acid was found to further reduce the total flame spread value with the overall degree of improvement (versus BA being used alone) being dependent on the weight ratio of boric acid to urea employed. As the relative amount of urea that was employed in the BA/urea combination was increased, the flame spread value was steadily decreased, as compared to boric acid alone, such that the best flame spread performance was ultimately achieved at a boric acid/urea dispersion w/w ratio of about 75/25 (or 3:1). Further additions of urea beyond that 3:1 w/w level yielded little to no additional benefit in terms of flame spread performance. In summary, useful boric acid/urea dispersion w/w ratios in particle board applications can range from 95/5 to 60/40 (19:1 to 1.5:1). An optimum ratio based on flame spread performance is at about 3:1 w/w when employing a 15% active basis loading of the fire retardant additive. This 15% active basis additive loading of 3:1 boric acid/urea translates to a urea additive level of 3.75% on a dry wood basis which is sufficiently low enough so as not to cause any significant moisture pickup issues in the finished PB product because of urea's hydroscopic nature. On this basis of minimizing moisture pickup, it is a significant advantage that additions of urea beyond about a 3:1 BA/Urea w/w ratio are not really needed to yield optimum flame spread performance in PB.

All the BA/urea dispersions used in this particle board study were produced in the laboratory with a high shear disperser unit in a manner analogous to the preparative details outlined in Table 6 with the following notable exceptions. The employed w/w ratio of BA/urea was varied from 90/10, to 85/15, to 80/20, to 75/25 and finally to 70/30 as per the w/w ratios noted in Table 9. All the BA/urea dispersion batches were produced at 65% total actives content for the sake of wood testing ease even though higher % actives content BA/Urea dispersions can be readily produced when employing greater relative amounts of urea in the formula. Relative to the formulary composition outlined in Table 6, the adjustments in % active content and BA/urea w/w ratio are easily achieved by merely changing the amounts of starting deionized batch water and the relative weight amounts of boric acid and urea used accordingly. All other ingredients remained unchanged in the study. Furthermore, the viscosity reducing agent that was employed in all the BA/urea dispersion batches was Tomamine Q-14-2 which is a cationic, ethoxylated quaternary amine based surfactant consisting of isodecyloxypropyl bis-(2-hydroxy-ethyl) methyl ammonium chloride. All the BA/urea dispersion batches were subsequently allowed to age for at least 1 week prior to testing them as fire retardant additives in the particle board study.

weight. Even though the relative proportions of boric acid and urea related species in the dispersion are known to vary somewhat depending on the % active content to which the boric acid/urea dispersion batch is produced this modest variation in speciation had a negligible effect on the resultant flame spread performance. In summary, the data indicate that the biggest driver of flame spread performance in PB was the overall boric acid/urea w/w ratio employed rather than modest variations in the dispersion's speciation distribution.

A third example is provided that provides information on particle size, viscosity, and flame spread performance. In this third example, a 78% actives content, waterborne dispersion of boric acid and urea at a BA/urea w/w ratio of 3:1 was produced on a production scale using a 50 HP high-shear disperser unit equipped with a Cowles disperser blade. The formulary and order of addition details are summarized in Table 10.

TABLE 10

75/25 (3:1) Boric Acid + Urea Liquid Fire Retardant Formulation at 78% Total Actives Content

| Ingredient[a] (listed by sequence of addition) | Production Batch Amount, lbs. (active basis amount) | Wt. % in Formula |
|---|---|---|
| Deionized Water at 25° C. | 817.0 | 21.755 |
| Urea MicroPrill | 728.0 | 19.385 |
| Boric Acid TG Powder | 1,500.0 | 39.941 |
| 45% KOH reagent | 4.0 (1.8 active amt.) | 0.107 |
| Boric Acid TG Powder | 250.0 | 6.657 |
| 45% KOH reagent | 4.0 (1.8 active amt.) | 0.107 |
| Boric Acid TG Powder | 233.0 | 6.204 |
| 45% KOH reagent | 4.0 (1.8 active amt.) | 0.107 |
| Boric Acid TG Powder | 200.0 | 5.325 |
| Xanthan Liquid PreBlend: | | |
| d) Surfynol 440 | 4.4 | 0.117% |
| e) Arquad 2C-75, 75% | 5.9 (4.42 active amt.) | 0.157% |
| f) Xanthan Gum | 5.2 | 0.138% |
| Total Batch Wt. = | 3755.5 | |

Key Batch Parameters:
d) Total Actives = 78.0% by wt.
e) BA/Urea = 3:1 w/w
f) KOH/BA mole ratio = 0.002726

Note:
[a]Urea MicroPrill, PCS Nitrogen - Augusta, GA; Boric Acid TG Powder, National Boraxx - Cleveland, Ohio.

In follow-up application testing, a 3:1 w/w dispersion of boric acid/urea that had been produced at a % actives content of 78% by wt. was used as the fire retardant additive in PB at a 15% active basis loading. The flame spread properties of this PB test panel were then determined using the same modified ASTM E162 testing protocol used above. The flame spread results were virtually equivalent to those reported in Table 9 where the 3:1 boric acid/dispersion additive had been produced at a % actives content of 65% by In this batch run, Arquad 2C-75, a dicocoalkyldimethyl ammonium chloride, was chosen as the viscosity reducing agent and a small amount of KOH base was also intermittently added to the batch to help cut the process viscosity and aid dispersion such that the total amount of active basis KOH base employed equated to a KOH/BA mole ratio=0.002726. The initial and aged physical properties for this 3:1 w/w BA/Urea dispersion batch produced at 78% total actives content are summarized in Table 11.

TABLE 11

QC Test Properties[a,b] of 75/25 (3:1) Boric Acid + Urea Formulation at 78% Total Actives Content

| Expt'l Batch Description | Batch Specific Gravity (g/ml) | Initial pH & BF Visc., cPs | Aged pH & BF Visc., cPs (after 3 days) | Aged pH & BF Visc., cPs (after 1 week) | Aged pH & BF Visc., cPs (after 2 weeks) | Aged pH & BF Visc., cPs (after 3 weeks) | observations & comments |
|---|---|---|---|---|---|---|---|
| 78% Solids 3:1 BA/Urea | 1.2713 | Sp# 91 2 rpm = | Sp# 91 2 rpm = | Sp# 91 2 rpm = | Sp# 91 2 rpm = | Sp# 91 2 rpm = | easily pumped stable |

TABLE 11-continued

QC Test Properties[a,b] of 75/25 (3:1) Boric Acid + Urea Formulation at 78% Total Actives Content

| Expt'l Batch Description | Batch Specific Gravity (g/ml) | Initial pH & BF Visc., cPs | Aged pH & BF Visc., cPs (after 3 days) | Aged pH & BF Visc., cPs (after 1 week) | Aged pH & BF Visc., cPs (after 2 weeks) | Aged pH & BF Visc., cPs (after 3 weeks) | observations & comments |
|---|---|---|---|---|---|---|---|
| Disp. using Arquad 2C-75 | | 9,800 cPs 20 rpm = 2,770 cPs TI Value = 3.5 pH = 5.44 | 24,300 cPs 20 rpm = 5,930 cPs TI Value = 4.1 pH = 5.32 | 31,400 cPs 20 rpm = 7,050 cPs TI Value = 4.45 pH = 5.37 | 41,100 cPs 20 rpm = 8,760 cPs TI Value = 4.69 pH = 5.34 | 52,200 cPs 20 rpm = 11,000 cPs TI Value = 4.75 pH = 5.40 | dispersion |

Note:
[a] All Brookfield Viscosities were measured using a Brookfield RVDVE Heliopath Viscometer Unit equipped with T-spindles run at 2 rpm and then 20 rpm; T-spindles A (#91) through F (#96) were employed as required. Where reported the Thixotropic Index (TI) Values were calculated on the basis of dividing the BF Viscosity Reading at 2 rpm by the BF Viscosity reading at 20 rpm.
[b] Specific Gravities were determined using a 100 ml specific gravity cup in accordance with ASTM D1475.

Overall, the dispersion batch was easily processed via high-shear mixing given its low dynamic viscosity. Furthermore, the batch aged to a 3-week aged static Brookfield viscosity of about 52,200 cPs which is remarkably low for a liquid fire retardant dispersion of 78% total solids content. Despite this remarkably low 3-week aged static viscosity, the 3:1 w/w BA/urea formulation was found to be very stable and showed no signs of pigment settling or syneresis. The 3:1 w/w boric acid/urea batch exhibited an aged Thixotropic Index Value of about 4.75 which indicates this 78% by wt. actives content formulation is far less thixotropic in nature as compared to the typical 60% solids BA-FPSD dispersions disclosed above. These BA-FPSD dispersions of 60% solids typically exhibited a 3-week aged static viscosity value of about 180,000 cPs with an aged TI value of about 7.9 in the preferred case scenario. This combination of lower aged static viscosity and lower aged TI value translates to the 78% actives content 3:1 w/w BA/urea dispersion formulation exhibiting better slurry pumpability and also improved sprayability properties onto various wood substrates.

Figure 5:
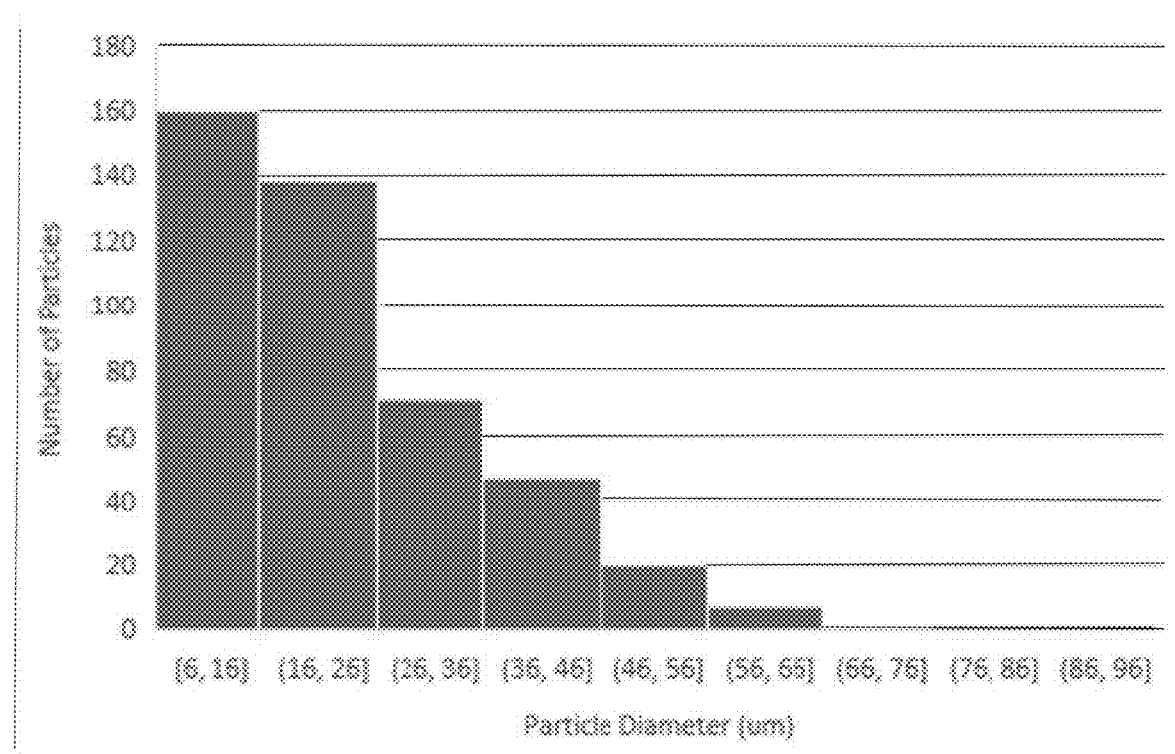
FIG. 5 is a particle size distribution histogram plot for a 3:1 w/w boric acid/urea ratio dispersion from image analysis (median p.s.=20.4 microns).

The dispersion of this third example, was also assessed in terms of its particle size distribution for the boric acid fraction therein that is present in insoluble colloidal particulate form. A representative micrograph image of the 3:1 w/w BA/urea dispersion is shown in FIG. 4 which was obtained by the following procedure. The 78% active 3:1 w/w BA/urea dispersion that was characterized in Table 11 was subsequently diluted using distilled water and further dispersed with a small amount of Arquad 2C-75 surfactant. Approximately 5 ml of distilled water was mixed with 3 drops of the Arquad 2C-75 surfactant. Then 3 drops of the 78% active 3:1 w/w BA/urea dispersion were mixed in with the 5 ml of water-surfactant diluent. Once the 3:1 w/w BA/urea dispersion sample was diluted, several drops of the resultant product dilution were placed between cleaned glass microscopy slides for optical imaging. Optical images were then taken at 200× magnification using a Keyence VHX-600 digital optical microscope and a representative example of which is shown in FIG. 4. The dispersed boric acid particulate fraction which resides within the overall boric acid/urea dispersion was imaged at 200× and then traced and particle sized using ImagePro image analysis software. The image analysis results are shown in FIG. 5 whereby the particle size distribution data are graphed as a histogram plot. Each column in the histogram plot presents the number of particles falling into a particular range of diameters as shown by the paired diameter numbers that are listed in parentheses. For example, column one in the histogram plot has ~160 boric acid particles with particle diameters ranging between 6 and 16 microns in size. On the basis of this analysis protocol, the image analysis software determined that the median particle size of the Boric Acid particulates in the 3:1 w/w boric acid/urea dispersion was about 20.4 microns. This median particle size value is virtually the same as what was observed in the previous boric acid dispersion that was produced at 60% solids (20.4 versus 21 microns, respectively). However, examination of the micrograph photos (FIG. 4 versus FIG. 1) suggests that the boric acid particulates present in the boric acid/urea dispersion are more uniform is shape and overall distribution than the corresponding particulates in the aqueous boric acid dispersion. In particular, for the boric acid/urea dispersion you see virtually no boric acid particles that are greater than 60 microns is size and this observation is substantiated when you compare the two particle size histogram plots. This finding suggests that the incorporation of some urea has improved the boric acid dispersion and particle attrition process. Furthermore, the more uniform boric acid particle shape and particle size distribution associated with the particulates in the boric acid/urea dispersion may contribute to its improved rheological properties.

The 3:1 w/w boric acid/urea dispersion from this third example was also assessed in terms of its flame spread performance. In this testing example, a standard 7/16" thick OSB wood panel using southern yellow pine (SYP) wood flakes was produced using standard commercial operating conditions known in the industry. A finished board density of 45 lb./ft$^3$ was targeted in this OSB study. The OSB panels were produced using a 5% addition of pMDI (Covestro's Mondur 541-Light) as the adhesive. To prepare the OSB test panels employing the 3:1 w/w BA/urea additive, the 78% active 3:1 w/w BA/urea dispersion (from Table 10) was spray applied onto the SYP wood flakes in the blender unit containing wood flakes plus pMDI adhesive so as to ultimately yield either a 15% by wt. or 18% by wt. active basis loading of BA/urea fire retardant in the finished OSB panel. Using the modified ASTM E162 testing protocol described above, the surface flammability results for these OSB test panels as well as the comparative OSB control are summarized in Table 12.

TABLE 12

Flame Spread Data[a] on 7/16" OSB Panels[b] using 75/25 (3:1) BA/Urea Fire Retardant

| Flame Spread Inches | Untreated OSB Control (min:sec) | OSB w/15% 75/25 BA/Urea (min:sec) | OSB w/18% 75/25 BA/Urea (min:sec) |
|---|---|---|---|
| 1 | 1:40 | 2:07 | 3:26 |
| 2 | 2:31 | 2:32 | 3:47 |
| 3 | 2:48 | 3:28 | 4:59 |
| 4 | 3:03 | 5:04 | 5:19 |
| 5 | 3:46 | 5:43 | 5:55 |
| 6 | 4:18 | — | — |
| 7 | 4:53 | — | — |
| 8 | 5:47 | — | — |
| 9 | 7:20 | — | — |
| 10 | 8:11 | — | — |
| 11 | 8:50 | — | — |
| Self-Extinguishment Observed | No, Still Burning after 11:00 min. | Yes, Stopped at 8:02 | Yes, Stopped at 8:14 |
| Max. Flame Spread during Test[c], inches | Max FS = 11" | Max FS = 5.7" | Max FS = 5.3" |

Notes:
[a] All flame spread determinations were carried out using a modified ASTM E162 radiant panel test methodology employing 6" × 12" OSB panels.
[b] OSB test panels were produced with a pilot press employing commercially available SYP wood flakes which targeted a board density of 45 lb./ft³. The OSB test panels, other than the untreated control, utilized either a 15% or 18% loading by wt. of fire retardant additive.
[c] Maximum flame spread is measured after an 11 minute test burn period or stopped after reaching the 11 inch mark or recorded at the point of self-extinguishment of the flame (whichever event comes first).

The flame spread data show that both OSB test panels yielded significantly improved fire retardant properties versus the OSB control panel. For example, at a 3:1 w/w BA/urea additive loading of 15% by wt. the flame spread value was reduced from 11.0" to 5.7" and the flame front also self-extinguished after about 8 minutes. This is a significant level of fire retardant improvement versus the OSB control panel. Similarly, the OSB test panel employing the 3:1 w/w BA/urea fire retardant at an additive loading of 18% by wt. was further improved in its fire retardancy properties as the flame spread value was incrementally reduced to about 5.3" at a similar self-extinguishment time point. The test data in Table 12 clearly show the utility of the BA/urea dispersion products as effective fire retardants in OSB panel applications.

As such, an invention has been disclosed in terms of preferred embodiments thereof which fulfills each and every one of the objects of the present invention as set forth above and provides a new and improved fire retardant additive in the form of a boric acid/urea dispersion, its use in making engineered wood products, and its use in creating coating formulations to coat wood products and coated products from this method.

Of course, various changes, modifications and alterations from the teachings of the present invention may be contemplated by those skilled in the art without departing from the intended spirit and scope thereof. It is intended that the present invention only be limited by the terms of the appended claims.

We claim:

1. An aqueous boric acid/urea dispersion comprising urea and boric acid particles, the boric acid particles having a median particle size range of less than 44 microns that has a total actives content of boric acid plus urea of 60% by weight or greater, the boric acid/urea dispersion further comprising:
a w/w ratio of boric acid to urea in a range of 19:1 to 1.5:1,
an effective amount of at least one viscosity reducing agent such that the boric acid/urea dispersion has an initial static viscosity of about 5,000 to about 25,000 centipoise and a three week aged static viscosity of less than 250,000 centipoise,
an optional amount of an alkali metal base, wherein the alkali metal base/boric acid mole ratio in the boric acid/urea dispersion ranges from zero to about 0.01; and
the balance water,
wherein the initial and aged static viscosities are measured using a Brookfield RVDVE heliopath viscometer unit equipped with T-spindles and are run at 2 rpm and 25 degrees C.

2. The aqueous boric acid/urea dispersion according to claim 1, wherein the boric acid/urea dispersion has a dynamic viscosity of less than 5,000 centipoise, the dynamic viscosity measured using a Brookfield RVDVE heliopath viscometer unit equipped with T-spindles and are run at 20 rpm and 25 degrees C.

3. The aqueous boric acid/urea dispersion according to claim 1, wherein the boric acid/urea dispersion has a thixotropic index value equal to or less than about 8.0.

4. The aqueous boric acid/urea dispersion according to claim wherein the total actives content is equal to or greater than 70% by weight.

5. The aqueous boric acid/urea dispersion according to claim 1, wherein the median particle size is less than about 21 microns or in a range of about 10 to about 30 microns.

6. The aqueous boric acid/urea dispersion according to claim 1, wherein the at least one viscosity-reducing agent is selected from the group consisting of a cationic type surfactant, an ethoxylated amine surfactant, an anionic or nonionic pigment dispersant, a nonionic, anionic or amphoteric surfactant, and an ethoxylated phosphate ester.

7. The aqueous boric acid/urea dispersion according to claim 6, wherein the cationic type surfactant is selected from the group consisting of coco poly (15) oxyethylene methyl ammonium chloride, isodecyloxypropyl bis-(2-hydroxyethyl) methyl ammonium chloride, isotridecyloxypropyl bis-(2-hydroxyethyl) methyl ammonium chloride, and dicocoalkyldimethyl ammonium chloride.

8. The aqueous boric acid/urea dispersion according to claim 6, wherein the ethoxylated amine surfactant is selected from the group consisting of poly (2) oxyethylene isodecyloxypropylamine, poly (5) oxyethylene isodecyloxypropylamine, poly (2) oxyethylene isotridecyloxypropylamine, and poly (5) oxyethylene isotridecyloxypropylamine.

9. The aqueous boric acid/urea dispersion according to claim 6, wherein the anionic or nonionic pigment dispersant is selected from the group consisting of a blend of polyglycol esters, a copolymer with pigment affinic groups, an electrosteric dispersant and grind aid, a dynamic wetter and an anionic dispersant polymer, a blend of ethoxylated $C_6$-$C_{12}$ alcohols and a polyoxyalkylene amine derivative, a carboxylate/sulfonate/nonionic functional terpolymer, sodium polyacrylate, and sodium naphthalene sultanate.

10. The aqueous boric acid/urea dispersion according to claim 6, wherein the nonionic, anionic or amphoteric surfactant is selected from the group consisting of poly (6) oxyethylene $C_9$-$C_{11}$ aliphatic alcohol, poly (5) oxyethylene iso-$C_{13}$ alcohol, ethylene oxide/propylene oxide copolymer, polyethylene glycol 200, sodium octyliminodipropionate, and butanedioic acid, 2-sulfo-, 1,4-bis(2-ethylhexyl) ester, sodium salt.

11. The aqueous boric acid/urea dispersion according to claim 6, wherein the phosphate ester is selected from the group consisting of oleyl 4(EO) phosphate ester and oleyl 6(EO) phosphate ester.

12. The aqueous boric acid/urea dispersion according to claim 6, wherein the at least one viscosity reducing agent is selected from the group consisting of coco poly (15) oxyethylene methyl ammonium chloride, isodecyloxypropyl bis-(2-hydroxy-ethyl) methyl ammonium chloride, dicocoalkyldimethyl ammonium chloride, poly (2) oxyethylene isodecyloxypropylamine, and an electrosteric anionic dispersant and grind aid.

13. The aqueous boric acid/urea dispersion according to claim 1, wherein the alkali metal base is one of NaOH and KOH.

14. The aqueous boric acid/urea dispersion according to claim 1, wherein the alkali metal base/boric acid mole ratio ranges from about 0.001 to about 0.007.

15. The aqueous boric acid/urea dispersion according to claim 1, further comprising at least one of an effective amount of a nonionic surfactant of intermediate HLB value to assist in the ease of introduction of a xanthan gum additive during the manufacture of the boric acid/urea dispersion and an effective amount of the xanthan gum for improving the suspension of the boric acid particles and for improving the adherence between a wood product and boric acid particles used with the wood product to improve fire retardancy thereof.

16. The aqueous boric acid-urea dispersion according to claim 15, wherein the amount of the nonionic surfactant in the boric acid/urea dispersion ranges from about 0.01 to about 0.25 wt % and the amount of the xanthan gum in the boric acid/urea dispersion ranges from 0.01 to about 0.25 wt. %.

17. The aqueous boric acid/urea dispersion according to claim 1, wherein the initial static viscosity ranges between about 8,000 and about 20,000 centipoise and the three week aged static viscosity is 200,000 centipoise or less.

18. A coated wood product having improved fire retardancy comprising:
a wood product and a waterborne coating formulation covering at least one surface of the wood product, the waterborne coating formulation comprising the boric acid/urea dispersion of claim 1,
wherein the waterborne coating formulation also includes a waterborne binder having a minimum film formation temperature of 25° C. or less and a glass transition temperature less than 25° C., the waterborne binder component being about 10-40% by weight based on the total waterborne coating formulation weight.

19. The coated wood product of claim 18, wherein the waterborne coating formulation is an intumescent coating formulation and the boric acid/urea dispersion provides an acid donor as the boric acid of the boric acid/urea dispersion and a blowing agent as the urea of the boric acid/urea dispersion, the waterborne coating formulation having a pH range of 4 to 9.

20. The coated wood product of claim 18, wherein the wood product is one of particle board, oriented strand board, medium density fiberboard and dimensional lumber.

21. A method of coating of a wood product to improve fire retardancy comprising:
a) providing a waterborne coating formulation comprising the boric acid/urea dispersion of claim 1,
wherein the waterborne coating formulation also includes a waterborne binder having a minimum film formation temperature of 25° C. or less and a glass transition temperature less than 25° C., the waterborne binder component being about 10-40% by weight based on the total waterborne coating formulation weight,
b) applying an effective amount of the waterborne coating formulation to at least one surface of the wood product to improve the fire retardancy of the wood product and form a coated wood product; and
c) drying the coated wood product.

22. The method of claim 21, wherein the waterborne coating formulation is an intumescent coating formulation and the boric acid/urea dispersion provides an acid donor as the boric acid of the boric acid/urea dispersion and a blowing agent as the urea of the boric acid/urea dispersion, the waterborne coating formulation having a pH range of 4 to 9.

23. The method of claim 21, wherein the wood product is one of particle board, oriented strand board, medium density fiberboard and dimensional lumber.

24. A method of making a wood product using wood chips, wood fiber or wood flakes and an adhesive to form the wood product comprising:
a) providing the wood chips, fiber or flake and the adhesive;
b) providing the boric acid/urea dispersion of claim 1; and
c) using the boric acid/urea dispersion with the wood chips, fiber or flakes and adhesive to form the wood product and improve the fire retardancy of the wood product.

25. The method of claim 24, wherein the wood product is one of particle board, oriented strand board, and medium density fiberboard.

26. A coated cellulosic material having improved fire retardancy comprising:
a cellulosic material having at least a portion of the cellulosic material coated with at least an effective amount of the boric acid/urea dispersion of claim 1 or a boric acid dispersion comprising boric acid particles having a median particle size range of less than 44 microns and a solids content of boric add particles of 50% or greater, the boric acid dispersion further comprising:
an effective amount of at least one viscosity reducing agent such that the boric acid dispersion has an initial static viscosity of about 5,000 to about 25,000 centipoise and a three week aged static viscosity of less than 250,000 centipoise, an optional amount of an alkali metal base, wherein the alkali metal base/boric acid mole ratio in the boric acid dispersion ranges from zero to about 0.01; and the balance water, wherein the initial and aged static viscosities are measured using a Brookfield RVDVE heliopath viscometer unit equipped with T-spindles and are run at 2 rpm and 25 degrees C., to improve the fire retardancy of the cellulosic material.

27. The coated cellulosic material of claim 26, wherein the cellulosic material comprises papers, cardboards, rayons, cottons, shoddy fabrics, natural fibers, synthetic fibers, linens, wood fibers, plant fibers, liner boards, ground newspaper and a mixture of wood fibers and ground newspaper, or combinations thereof.

28. A method of improving the fire retardancy of a cellulosic material comprising:

providing a cellulosic material, and applying at least an effective amount of the boric acid/urea dispersion of claim 1 or a boric acid dispersion comprising boric acid particles having a median particle size range of less than 44 microns and a solids content of boric add particles of 50% or greater, the boric add dispersion further comprising:

an effective amount of at least one viscosity reducing agent such that the boric add dispersion has an initial static viscosity of about 5,000 to about 25,000 centipoise and a three week aged static viscosity of less than 250,000 centipoise, an optional amount of an alkali metal base, wherein the alkali metal base/boric acid mole ratio in the boric acid dispersion ranges from zero to about 0.01; and the balance water, wherein the initial and aged static viscosities are measured using a Brookfield RVDVE heliopath viscometer unit equipped with T-spindles and are run at 2 rpm and 25 degrees C. to improve the fire retardancy of at least the portion of the cellulosic material and produce a coated cellulosic material.

29. The method of claim 28, wherein the cellulosic material comprises papers, cardboards, rayons, cottons, shoddy fabrics, natural fibers, synthetic fibers, linens, wood fibers, plant fibers, liner boards, ground newspaper and a mixture of wood fibers and ground newspaper, or combinations thereof.

30. The method of claim 29, wherein the cellulosic material is ground newspaper or a mixture of wood fibers and ground newspaper and the coated cellulosic material is placed in a structure for insulating purposes.

31. The method of claim 28, wherein the boric acid/urea dispersion or a boric add dispersion is spray applied to the cellulosic material.

32. The aqueous boric acid/urea dispersion according to claim 4, wherein the total actives content is equal to or greater than 75% by weight.

33. The aqueous boric acid/urea dispersion according to claim 12, wherein the at least one viscosity reducing agent is dicocoalkyldimethyl ammonium chloride.

34. The aqueous boric acid/urea dispersion according to claim 14, wherein the alkali metal base/boric acid mole ratio ranges from about 0.002 to about 0.006.

35. A coated wood product having improved fire retardancy comprising:

a wood product and a waterborne coating formulation covering at least one surface of the wood product, the waterborne coating formulation comprising a boric acid dispersion, wherein the boric acid dispersion comprises boric acid particles having a median particle size range of less than 44 microns and a solids content of boric add particles of 50% or greater, the boric acid dispersion further comprising:

an effective amount of at least one viscosity reducing agent such that the boric add dispersion has an initial static viscosity of about 5,000 to about 25,000 centipoise and a three week aged static viscosity of less than 250,000 centipoise, an optional amount of an alkali metal base, wherein the alkali metal base/boric add mole ratio in the boric acid dispersion ranges from zero to about 0.01; and the balance water, wherein the initial and aged static viscosities are measured using a Brookfield RVDVE heliopath viscometer unit equipped with T-spindles and are run at 2 rpm and 25 degrees C., wherein the waterborne coating formulation also includes a waterborne binder having a minimum film formation temperature of 25° C. or less and a glass transition temperature less than 25° C., the waterborne binder component being about 10-40% by weight based on the total waterborne coating formulation weight, wherein the waterborne coating formulation is an intumescent coating formulation and the boric acid dispersion provides an acid donor as the boric acid of the boric acid dispersion for the intumescent coating formulation, the waterborne coating formulation having a pH range of 4 to 9.

36. A method of coating of a wood product to improve fire retardency comprising:

a) providing a waterborne coating formulation comprising a boric acid dispersion, wherein the boric acid dispersion comprises boric add particles having a median particle size range of less than 44 microns and a solids content of boric acid particles of 50% or greater, the boric add dispersion further comprising:

an effective amount of at least one viscosity reducing agent such that the boric add dispersion has an initial static viscosity of about 5,000 to about 25,000 centipoise and a three week aged static viscosity of less than 250,000 centipoise, an optional amount of an alkali metal base, wherein the alkali metal base/boric acid mole ratio in the boric acid dispersion ranges from zero to about 0.01;

and the balance water, wherein the initial and aged static viscosities are measured using a Brookfield RVDVE heliopath viscometer unit equipped with T-spindles and are run at 2 rpm and 25 degrees C., wherein the waterborne coating formulation also includes a waterborne binder having a minimum film formation temperature of 25° C. or less and a glass transition temperature less than 25° C., the waterborne binder component being about 10-40% by weight based on the total waterborne coating formulation weight, wherein the waterborne coating formulation is an intumescent coating formulation and the boric acid dispersion provides an acid donor as the boric acid of the boric acid dispersion for the intumescent coating formulation, the waterborne coating formulation having a pH range of 4 to 9, b) applying an effective amount of the waterborne coating formulation to at least one surface of the wood product to improve the fire retardancy of the wood product and form a coated wood product; and
c) drying the coated wood product.

\* \* \* \* \*

UNITED STATES PATENT AND TRADEMARK OFFICE
CERTIFICATE OF CORRECTION

PATENT NO. : 11,015,081 B2
APPLICATION NO. : 16/794810
DATED : May 25, 2021
INVENTOR(S) : Gary M. Freeman et al.

Page 1 of 1

It is certified that error appears in the above-identified patent and that said Letters Patent is hereby corrected as shown below:

In the Claims

Column 66, Line 50:
"claim wherein the total actives content is equal to or greater"
Should read:
"claim 1, wherein the total actives content is equal to or greater"

Signed and Sealed this
Ninth Day of August, 2022

Katherine Kelly Vidal
*Director of the United States Patent and Trademark Office*